(12) United States Patent
Kapadekar et al.

(10) Patent No.: US 8,893,110 B2
(45) Date of Patent: Nov. 18, 2014

(54) DEVICE MANAGEMENT IN A NETWORK

(75) Inventors: Vivek Kapadekar, San Diego, CA (US); Bindu Rama Rao, Laguna Niguel, CA (US)

(73) Assignee: QUALCOMM Incorporated, San Diego, CA (US)

( * ) Notice: Subject to any disclaimer, the term of this patent is extended or adjusted under 35 U.S.C. 154(b) by 139 days.

(21) Appl. No.: 13/456,752

(22) Filed: Apr. 26, 2012

(65) Prior Publication Data

US 2012/0210315 A1 Aug. 16, 2012

Related U.S. Application Data

(62) Division of application No. 11/810,575, filed on Jun. 6, 2007, now Pat. No. 8,209,676.

(60) Provisional application No. 60/812,376, filed on Jun. 8, 2006.

(51) Int. Cl.
*G06F 9/44* (2006.01)

(52) U.S. Cl.
USPC .......................................... 717/171

(58) Field of Classification Search
USPC ................................. 717/168–172
See application file for complete search history.

(56) References Cited

U.S. PATENT DOCUMENTS

| | | |
|---|---|---|
| 4,337,376 A | 6/1982 | Gruenberg |
| 4,344,091 A | 8/1982 | Gardner et al. |
| 4,429,387 A | 1/1984 | Kaminski |
| 4,493,083 A | 1/1985 | Kinoshita |
| 4,645,916 A | 2/1987 | Raisleger |
| 4,783,841 A | 11/1988 | Crayson |
| 4,807,182 A | 2/1989 | Queen |
| 4,809,170 A | 2/1989 | Leblang et al. |
| 5,084,816 A | 1/1992 | Boese et al. |
| 5,155,847 A | 10/1992 | Kirouac et al. |
| 5,204,960 A | 4/1993 | Smith et al. |
| 5,261,055 A | 11/1993 | Moran et al. |
| 5,274,823 A | 12/1993 | Brenner et al. |
| 5,325,531 A | 6/1994 | McKeeman et al. |
| 5,333,320 A | 7/1994 | Seki |
| 5,392,353 A | 2/1995 | Morales |
| 5,394,534 A | 2/1995 | Kulakowski et al. |

(Continued)

FOREIGN PATENT DOCUMENTS

| | | |
|---|---|---|
| CA | 2339923 | 3/2000 |
| CA | 2414281 | 5/2002 |

(Continued)

OTHER PUBLICATIONS

Communication pursuant to Article 94(3) EPC received in EP Application No. 01991949.7, mailed May 7, 2013, 8 pg.

(Continued)

*Primary Examiner* — Anna Deng
(74) *Attorney, Agent, or Firm* — Kilpatrick Townsend & Stockton LLP

(57) ABSTRACT

Methods and devices supporting the management of a plurality of electronic devices and processing of update information for updating software and/or firmware in the electronic devices. Prompting of users may be made using a language associated with the electronic device, and authorization to update an electronic device may be secured using a subscriber identity module.

13 Claims, 11 Drawing Sheets

(56) References Cited

U.S. PATENT DOCUMENTS

| | | |
|---|---|---|
| 5,410,703 A | 4/1995 | Nilsson et al. |
| 5,418,837 A | 5/1995 | Johansson et al. |
| 5,420,616 A | 5/1995 | Suemitsu et al. |
| 5,421,006 A | 5/1995 | Jablon et al. |
| 5,442,771 A | 8/1995 | Filepp et al. |
| 5,444,765 A | 8/1995 | Marui et al. |
| 5,450,589 A | 9/1995 | Maebayashi et al. |
| 5,455,576 A | 10/1995 | Clark, II et al. |
| 5,463,766 A | 10/1995 | Schieve et al. |
| 5,471,592 A | 11/1995 | Gove et al. |
| 5,479,637 A | 12/1995 | Lisimaque et al. |
| 5,479,654 A | 12/1995 | Squibb |
| 5,481,713 A | 1/1996 | Wetmore et al. |
| 5,491,807 A | 2/1996 | Freeman et al. |
| 5,491,821 A | 2/1996 | Kilis |
| 5,535,357 A | 7/1996 | Moran et al. |
| 5,537,483 A | 7/1996 | Stapleton et al. |
| 5,563,931 A | 10/1996 | Bishop et al. |
| 5,579,522 A | 11/1996 | Christeson et al. |
| 5,586,304 A | 12/1996 | Stupek, Jr. et al. |
| 5,586,328 A | 12/1996 | Caron et al. |
| 5,590,277 A | 12/1996 | Fuchs et al. |
| 5,594,903 A | 1/1997 | Bunnell et al. |
| 5,596,738 A | 1/1997 | Pope |
| 5,598,531 A | 1/1997 | Hill |
| 5,598,534 A | 1/1997 | Haas |
| 5,600,844 A | 2/1997 | Shaw et al. |
| 5,606,693 A | 2/1997 | Nilsen et al. |
| 5,608,910 A | 3/1997 | Shimakura |
| 5,623,604 A | 4/1997 | Russell et al. |
| 5,628,016 A | 5/1997 | Kukol |
| 5,638,066 A | 6/1997 | Horiuchi et al. |
| 5,649,112 A | 7/1997 | Yeager et al. |
| 5,649,200 A | 7/1997 | Leblang et al. |
| 5,666,293 A | 9/1997 | Metz et al. |
| 5,666,364 A | 9/1997 | Pierce et al. |
| 5,675,628 A | 10/1997 | Hokkanen |
| 5,677,708 A | 10/1997 | Matthews, III |
| 5,684,944 A | 11/1997 | Lubbers |
| 5,689,712 A | 11/1997 | Heisch |
| 5,694,538 A | 12/1997 | Okazaki et al. |
| 5,699,275 A | 12/1997 | Kennedy, III et al. |
| 5,699,548 A | 12/1997 | Choudhury et al. |
| 5,704,031 A | 12/1997 | Mikami et al. |
| 5,708,709 A | 1/1998 | Rose |
| 5,708,776 A | 1/1998 | Kikinis |
| 5,715,462 A | 2/1998 | Iwamoto et al. |
| 5,717,737 A | 2/1998 | Doviak et al. |
| 5,721,824 A | 2/1998 | Taylor |
| 5,724,526 A | 3/1998 | Kunita |
| 5,727,202 A | 3/1998 | Kucala |
| 5,729,735 A | 3/1998 | Meyering |
| 5,751,231 A | 5/1998 | Iverson |
| 5,752,039 A | 5/1998 | Tanimura |
| 5,752,042 A | 5/1998 | Cole et al. |
| 5,764,658 A | 6/1998 | Sekiguchi et al. |
| 5,765,211 A | 6/1998 | Luck |
| 5,768,382 A | 6/1998 | Schneier et al. |
| 5,774,715 A | 6/1998 | Madany et al. |
| 5,778,440 A | 7/1998 | Yiu et al. |
| 5,781,921 A | 7/1998 | Nichols |
| 5,790,800 A | 8/1998 | Gauvin et al. |
| 5,790,860 A | 8/1998 | Wetmore et al. |
| 5,790,974 A | 8/1998 | Tognazzini |
| 5,794,254 A | 8/1998 | McClain |
| 5,802,338 A | 9/1998 | Rechtschaffen et al. |
| 5,802,554 A | 9/1998 | Caceres et al. |
| 5,805,899 A | 9/1998 | Evans et al. |
| 5,809,251 A | 9/1998 | May et al. |
| 5,812,753 A | 9/1998 | Chiariotti |
| 5,812,768 A | 9/1998 | Page et al. |
| 5,815,722 A | 9/1998 | Kalwitz et al. |
| 5,822,578 A | 10/1998 | Frank et al. |
| 5,822,692 A | 10/1998 | Krishan et al. |
| 5,826,012 A | 10/1998 | Lettvin |
| 5,832,000 A | 11/1998 | Lin et al. |
| 5,832,520 A | 11/1998 | Miller |
| 5,835,777 A | 11/1998 | Staelin |
| 5,835,911 A | 11/1998 | Nakagawa et al. |
| 5,838,981 A | 11/1998 | Gotoh |
| 5,845,077 A | 12/1998 | Fawcett |
| 5,848,064 A | 12/1998 | Cowan |
| 5,864,681 A | 1/1999 | Proctor et al. |
| 5,875,404 A | 2/1999 | Messiet |
| 5,878,124 A | 3/1999 | Griesmer et al. |
| 5,878,256 A | 3/1999 | Bealkowski et al. |
| 5,881,292 A | 3/1999 | Sigal et al. |
| 5,887,253 A | 3/1999 | O'Neil et al. |
| 5,896,566 A | 4/1999 | Averbuch et al. |
| 5,901,310 A | 5/1999 | Rahman et al. |
| 5,901,330 A | 5/1999 | Sun et al. |
| 5,903,669 A | 5/1999 | Hirabayashi |
| 5,909,581 A | 6/1999 | Park |
| 5,913,021 A | 6/1999 | Masubuchi |
| 5,913,027 A | 6/1999 | Matsuda et al. |
| 5,919,247 A | 7/1999 | Van Hoff et al. |
| 5,930,504 A | 7/1999 | Gabel |
| 5,931,909 A | 8/1999 | Taylor |
| 5,933,498 A | 8/1999 | Schneck et al. |
| 5,933,604 A | 8/1999 | Inakoshi |
| 5,937,019 A | 8/1999 | Padovani |
| 5,943,406 A | 8/1999 | Leta et al. |
| 5,944,839 A | 8/1999 | Isenberg |
| 5,946,686 A | 8/1999 | Schmuck et al. |
| 5,950,199 A | 9/1999 | Schmuck et al. |
| 5,953,653 A | 9/1999 | Josenhans et al. |
| 5,954,817 A | 9/1999 | Janssen et al. |
| 5,960,189 A | 9/1999 | Stupek, Jr. et al. |
| 5,960,445 A | 9/1999 | Tamori et al. |
| 5,968,182 A | 10/1999 | Chen et al. |
| 5,973,626 A | 10/1999 | Berger et al. |
| 5,974,179 A | 10/1999 | Caklovic |
| 5,974,250 A | 10/1999 | Angelo et al. |
| 5,974,311 A | 10/1999 | Lipsit |
| 5,974,312 A | 10/1999 | Hayes, Jr. et al. |
| 5,974,454 A | 10/1999 | Apfel et al. |
| 5,974,574 A | 10/1999 | Lennie et al. |
| 5,983,289 A | 11/1999 | Ishikawa et al. |
| 5,987,325 A | 11/1999 | Tayloe |
| 5,987,477 A | 11/1999 | Schmuck et al. |
| 5,987,506 A | 11/1999 | Carter et al. |
| 5,999,740 A | 12/1999 | Rowley |
| 5,999,978 A | 12/1999 | Angal et al. |
| 6,006,034 A | 12/1999 | Heath et al. |
| 6,009,274 A | 12/1999 | Fletcher et al. |
| 6,009,497 A | 12/1999 | Wells et al. |
| 6,011,973 A | 1/2000 | Valentine et al. |
| 6,014,561 A | 1/2000 | Molne |
| 6,018,747 A | 1/2000 | Burns et al. |
| 6,021,275 A | 2/2000 | Horwat |
| 6,021,415 A | 2/2000 | Cannon et al. |
| 6,021,428 A | 2/2000 | Miloslavsky |
| 6,029,004 A | 2/2000 | Bortnikov et al. |
| 6,029,065 A | 2/2000 | Shah |
| 6,029,196 A | 2/2000 | Lenz |
| 6,031,830 A | 2/2000 | Cowan |
| 6,032,044 A | 2/2000 | Shannon et al. |
| 6,032,216 A | 2/2000 | Schmuck et al. |
| 6,038,636 A | 3/2000 | Brown, III et al. |
| 6,040,781 A | 3/2000 | Murray |
| 6,041,333 A | 3/2000 | Bretschneider et al. |
| 6,044,270 A | 3/2000 | Raith |
| 6,044,403 A | 3/2000 | Gerszberg |
| 6,047,071 A | 4/2000 | Shah |
| 6,047,242 A | 4/2000 | Benson |
| 6,047,279 A | 4/2000 | Barrack et al. |
| 6,052,531 A | 4/2000 | Waldin et al. |
| 6,052,600 A | 4/2000 | Fette et al. |
| 6,058,435 A | 5/2000 | Sassin et al. |
| 6,064,814 A | 5/2000 | Capriles et al. |
| 6,070,012 A | 5/2000 | Eitner et al. |
| 6,070,142 A | 5/2000 | McDonough et al. |
| 6,073,206 A | 6/2000 | Piwonka et al. |
| 6,073,214 A | 6/2000 | Fawcett |

(56) References Cited

U.S. PATENT DOCUMENTS

| | | |
|---|---|---|
| 6,077,315 A | 6/2000 | Greenbaum et al. |
| 6,080,207 A | 6/2000 | Kroening et al. |
| 6,081,518 A | 6/2000 | Bowman-Amuah |
| 6,081,731 A | 6/2000 | Boltz et al. |
| 6,088,759 A | 7/2000 | Hasbun et al. |
| 6,097,942 A | 8/2000 | Laiho |
| 6,097,966 A | 8/2000 | Hanley |
| 6,104,506 A | 8/2000 | Hirokawa |
| 6,105,063 A | 8/2000 | Hayes, Jr. |
| 6,106,570 A | 8/2000 | Mizuhara |
| 6,112,024 A | 8/2000 | Almond et al. |
| 6,112,197 A | 8/2000 | Chatterjee et al. |
| 6,115,693 A | 9/2000 | McDonough et al. |
| 6,115,737 A | 9/2000 | Ely et al. |
| 6,117,187 A | 9/2000 | Staelin |
| 6,123,737 A | 9/2000 | Sadowsky |
| 6,126,327 A | 10/2000 | Bi et al. |
| 6,128,695 A | 10/2000 | Estakhri et al. |
| 6,128,713 A | 10/2000 | Eisler et al. |
| 6,131,096 A | 10/2000 | Ng et al. |
| 6,134,530 A | 10/2000 | Bunting et al. |
| 6,138,002 A | 10/2000 | Alperovich et al. |
| 6,138,239 A | 10/2000 | Veil |
| 6,138,249 A | 10/2000 | Nolet |
| 6,141,564 A | 10/2000 | Bruner et al. |
| 6,144,849 A | 11/2000 | Nodoushani et al. |
| 6,145,012 A | 11/2000 | Small |
| 6,148,192 A | 11/2000 | Ahvenainen |
| 6,148,441 A | 11/2000 | Woodward |
| 6,151,643 A | 11/2000 | Cheng et al. |
| 6,157,559 A | 12/2000 | Yoo |
| 6,163,274 A | 12/2000 | Lindgren |
| 6,167,567 A | 12/2000 | Chiles et al. |
| 6,178,452 B1 | 1/2001 | Miyamoto |
| 6,189,096 B1 | 2/2001 | Haverty |
| 6,195,546 B1 | 2/2001 | Leung et al. |
| 6,195,946 B1 | 3/2001 | Lott et al. |
| 6,198,946 B1 | 3/2001 | Shin et al. |
| 6,199,203 B1 | 3/2001 | Saboff |
| 6,199,204 B1 | 3/2001 | Donohue |
| 6,202,207 B1 | 3/2001 | Donohue |
| 6,202,208 B1 | 3/2001 | Holiday |
| 6,209,111 B1 | 3/2001 | Kadyk et al. |
| 6,209,127 B1 | 3/2001 | Mori et al. |
| 6,212,281 B1 | 4/2001 | Vanstone |
| 6,212,489 B1 | 4/2001 | Klein et al. |
| 6,212,557 B1 | 4/2001 | Oran |
| 6,212,659 B1 | 4/2001 | Zehavi |
| 6,223,039 B1 | 4/2001 | Holm et al. |
| 6,223,301 B1 | 4/2001 | Santeler et al. |
| 6,223,343 B1 | 4/2001 | Hopwood et al. |
| 6,230,190 B1 | 5/2001 | Edmonds et al. |
| 6,230,319 B1 | 5/2001 | Britt, Jr. et al. |
| 6,233,332 B1 | 5/2001 | Anderson et al. |
| 6,247,168 B1 | 6/2001 | Green |
| 6,249,817 B1 | 6/2001 | Nakabayashi et al. |
| 6,256,497 B1 | 7/2001 | Chambers |
| 6,260,156 B1 | 7/2001 | Garvin et al. |
| 6,262,973 B1 | 7/2001 | Shiraishi et al. |
| 6,263,214 B1 | 7/2001 | Yazaki et al. |
| 6,266,513 B1 | 7/2001 | Briancon |
| 6,266,809 B1 | 7/2001 | Craig et al. |
| 6,266,810 B1 | 7/2001 | Tanaka et al. |
| 6,272,333 B1 | 8/2001 | Smith |
| 6,272,545 B1 | 8/2001 | Flanagin et al. |
| 6,278,449 B1 | 8/2001 | Sugiarto et al. |
| 6,279,153 B1 | 8/2001 | Bi et al. |
| 6,282,709 B1 | 8/2001 | Reha et al. |
| 6,289,509 B1 | 9/2001 | Kryloff |
| 6,292,492 B1 | 9/2001 | Bonomi et al. |
| 6,292,934 B1 | 9/2001 | Davidson et al. |
| 6,301,710 B1 | 10/2001 | Fujiwara |
| 6,308,061 B1 | 10/2001 | Criss et al. |
| 6,311,322 B1 | 10/2001 | Ikeda et al. |
| 6,314,425 B1 | 11/2001 | Serbinis et al. |
| 6,317,872 B1 | 11/2001 | Gee et al. |
| 6,317,880 B1 | 11/2001 | Chamberlain et al. |
| 6,321,263 B1 | 11/2001 | Luzzi et al. |
| 6,321,348 B1 | 11/2001 | Kobata |
| 6,324,402 B1 | 11/2001 | Waugh et al. |
| 6,324,693 B1 | 11/2001 | Brodersen et al. |
| 6,330,715 B1 | 12/2001 | Razzaghe |
| 6,333,980 B1 | 12/2001 | Hollatz et al. |
| 6,334,212 B1 | 12/2001 | Nakajima |
| 6,343,379 B1 | 1/2002 | Ozawa et al. |
| 6,345,288 B1 | 2/2002 | Reed et al. |
| 6,347,331 B1 | 2/2002 | Dutcher et al. |
| 6,349,205 B1 | 2/2002 | Fang et al. |
| 6,353,737 B1 | 3/2002 | Herzog |
| 6,357,021 B1 | 3/2002 | Kitagawa et al. |
| 6,360,362 B1 | 3/2002 | Fichtner et al. |
| 6,360,366 B1 | 3/2002 | Heath et al. |
| 6,363,524 B1 | 3/2002 | Loy |
| 6,366,584 B1 | 4/2002 | Gulliford et al. |
| 6,366,777 B1 | 4/2002 | Uusitalo |
| 6,367,072 B1 | 4/2002 | Justice et al. |
| 6,374,250 B2 | 4/2002 | Ajtai et al. |
| 6,381,456 B1 | 4/2002 | Ko |
| 6,381,740 B1 | 4/2002 | Miller et al. |
| 6,381,742 B2 | 4/2002 | Forbes et al. |
| 6,389,464 B1 | 5/2002 | Krishnamurthy et al. |
| 6,389,592 B1 | 5/2002 | Ayres et al. |
| 6,393,018 B2 | 5/2002 | Miloslavsky |
| 6,393,585 B1 | 5/2002 | Houha et al. |
| 6,397,385 B1 | 5/2002 | Kravitz |
| 6,400,965 B1 | 6/2002 | Phillips et al. |
| 6,405,364 B1 | 6/2002 | Bowman-Amuah |
| 6,408,175 B1 | 6/2002 | Park |
| 6,408,434 B1 | 6/2002 | Fujiwara |
| 6,412,079 B1 | 6/2002 | Edmonds et al. |
| 6,418,311 B1 | 7/2002 | Chmaytelli et al. |
| 6,421,325 B1 | 7/2002 | Kikinis |
| 6,421,776 B1 | 7/2002 | Hillis et al. |
| 6,424,966 B1 | 7/2002 | Meyerzon et al. |
| 6,425,125 B1 | 7/2002 | Fries et al. |
| 6,426,955 B1 | 7/2002 | Gossett-Dalton, Jr. et al. |
| 6,434,537 B1 | 8/2002 | Grimes |
| 6,434,695 B1 | 8/2002 | Esfahani et al. |
| 6,438,585 B2 | 8/2002 | Mousseau et al. |
| 6,442,358 B1 | 8/2002 | Regelsberger et al. |
| 6,442,660 B1 | 8/2002 | Henerlau et al. |
| 6,442,754 B1 | 8/2002 | Curtis |
| 6,445,914 B1 | 9/2002 | Findikli et al. |
| 6,446,206 B1 | 9/2002 | Feldbaum |
| 6,449,270 B1 | 9/2002 | Miloslavsky |
| 6,452,602 B1 | 9/2002 | Morein |
| 6,456,732 B1 | 9/2002 | Kimbell et al. |
| 6,456,843 B1 | 9/2002 | Daly |
| 6,457,175 B1 | 9/2002 | Lerche |
| 6,463,300 B1 | 10/2002 | Oshima |
| 6,466,999 B1 | 10/2002 | Sliger et al. |
| 6,467,087 B1 | 10/2002 | Yang |
| 6,470,496 B1 | 10/2002 | Kato et al. |
| 6,477,531 B1 | 11/2002 | Sullivan et al. |
| 6,477,703 B1 | 11/2002 | Smith et al. |
| 6,487,403 B2 | 11/2002 | Carroll |
| 6,487,717 B1 | 11/2002 | Brunemann et al. |
| 6,487,723 B1 | 11/2002 | MacInnis |
| 6,493,871 B1 | 12/2002 | McGuire et al. |
| 6,496,875 B2 | 12/2002 | Cheng et al. |
| 6,496,978 B1 | 12/2002 | Ito |
| 6,496,979 B1 | 12/2002 | Chen et al. |
| 6,502,193 B1 | 12/2002 | Barber |
| 6,504,932 B1 | 1/2003 | Vasnier et al. |
| 6,505,228 B1 | 1/2003 | Schoening et al. |
| 6,512,919 B2 | 1/2003 | Ogasawara |
| 6,526,574 B1 | 2/2003 | Jones |
| 6,529,729 B1 | 3/2003 | Nodoushani et al. |
| 6,530,036 B1 | 3/2003 | Frey, Jr. |
| 6,535,894 B1 | 3/2003 | Schmidt et al. |
| 6,536,038 B1 | 3/2003 | Ewertz et al. |
| 6,542,504 B1 | 4/2003 | Mahler et al. |
| 6,542,906 B2 | 4/2003 | Korn |
| 6,546,243 B2 | 4/2003 | Tiedemann, Jr. et al. |

(56) References Cited

U.S. PATENT DOCUMENTS

| | | |
|---|---|---|
| 6,546,419 B1 | 4/2003 | Humpleman et al. |
| 6,546,492 B1 | 4/2003 | Walker et al. |
| 6,546,552 B1 | 4/2003 | Peleg |
| 6,549,770 B1 | 4/2003 | Marran |
| 6,553,113 B1 | 4/2003 | Dhir et al. |
| 6,553,375 B1 | 4/2003 | Huang et al. |
| 6,553,490 B1 | 4/2003 | Kottapurath et al. |
| 6,556,842 B1 | 4/2003 | Ericsson |
| 6,564,055 B1 | 5/2003 | Hronek et al. |
| 6,564,369 B1 | 5/2003 | Hove et al. |
| 6,564,371 B1 | 5/2003 | Goldman et al. |
| 6,571,244 B1 | 5/2003 | Larson |
| 6,574,657 B1 | 6/2003 | Dickinson |
| 6,577,229 B1 | 6/2003 | Bonneau et al. |
| 6,581,105 B2 | 6/2003 | Miloslavsky et al. |
| 6,587,684 B1 | 7/2003 | Hsu et al. |
| 6,587,685 B2 | 7/2003 | Mittal et al. |
| 6,591,095 B1 | 7/2003 | Palaniswamy et al. |
| 6,591,098 B1 | 7/2003 | Shieh et al. |
| 6,594,723 B1 | 7/2003 | Chapman et al. |
| 6,594,822 B1 | 7/2003 | Schweitz et al. |
| 6,595,856 B1 | 7/2003 | Ginsburg et al. |
| 6,601,153 B1 | 7/2003 | Engelbrecht et al. |
| 6,601,212 B1 | 7/2003 | Guha et al. |
| 6,603,854 B1 | 8/2003 | Judkins et al. |
| 6,603,968 B2 | 8/2003 | Anvekar et al. |
| 6,606,744 B1 | 8/2003 | Mikurak |
| 6,615,038 B1 | 9/2003 | Moles et al. |
| 6,615,240 B1 | 9/2003 | Sullivan et al. |
| 6,615,404 B1 | 9/2003 | Garfunkel et al. |
| 6,615,405 B1 | 9/2003 | Goldman et al. |
| 6,622,017 B1 | 9/2003 | Hoffman |
| 6,625,451 B1 | 9/2003 | La Medica et al. |
| 6,625,641 B1 | 9/2003 | Hare et al. |
| 6,636,958 B2 | 10/2003 | Abboud et al. |
| 6,640,334 B1 | 10/2003 | Rasmussen |
| 6,643,506 B1 | 11/2003 | Criss et al. |
| 6,643,697 B1 | 11/2003 | Eves |
| 6,647,260 B2 | 11/2003 | Dusse et al. |
| 6,647,480 B1 | 11/2003 | Bolan et al. |
| 6,651,249 B2 | 11/2003 | Waldin et al. |
| 6,658,090 B1 | 12/2003 | Harjunen et al. |
| 6,659,345 B2 | 12/2003 | Sukeda et al. |
| 6,665,376 B1 | 12/2003 | Brown |
| 6,665,861 B1 | 12/2003 | Francis et al. |
| 6,668,049 B1 | 12/2003 | Koch et al. |
| 6,668,336 B2 | 12/2003 | Lasser |
| 6,671,265 B1 | 12/2003 | Hwang et al. |
| 6,671,703 B2 | 12/2003 | Thompson et al. |
| 6,671,818 B1 | 12/2003 | Mikurak |
| 6,675,201 B1 | 1/2004 | Parkkinen |
| 6,675,382 B1 | 1/2004 | Foster |
| 6,683,993 B1 | 1/2004 | Mead |
| 6,684,396 B1 | 1/2004 | Brittain et al. |
| 6,687,341 B1 | 2/2004 | Koch et al. |
| 6,687,901 B1 | 2/2004 | Imamatsu |
| 6,690,390 B1 | 2/2004 | Walters et al. |
| 6,690,788 B1 | 2/2004 | Bauer et al. |
| 6,694,314 B1 | 2/2004 | Sullivan et al. |
| 6,694,336 B1 | 2/2004 | Multer et al. |
| 6,697,808 B1 | 2/2004 | Hurwood et al. |
| 6,697,969 B1 | 2/2004 | Merriam |
| 6,698,013 B1 | 2/2004 | Bertero et al. |
| 6,701,521 B1 | 3/2004 | McLlroy et al. |
| 6,704,303 B1 | 3/2004 | Bowman-Amuah |
| 6,704,864 B1 | 3/2004 | Philyaw |
| 6,711,520 B2 | 3/2004 | Arnaout et al. |
| 6,714,642 B2 | 3/2004 | Dhir et al. |
| 6,721,713 B1 | 4/2004 | Guheen et al. |
| 6,721,946 B1 | 4/2004 | Fogarty et al. |
| 6,725,048 B2 | 4/2004 | Mao et al. |
| 6,725,056 B1 | 4/2004 | Moles et al. |
| 6,725,268 B1 | 4/2004 | Jackel et al. |
| 6,725,392 B1 | 4/2004 | Frey et al. |
| 6,728,531 B1 | 4/2004 | Lee et al. |
| 6,728,950 B2 | 4/2004 | Davis et al. |
| 6,730,027 B2 | 5/2004 | Iliff |
| 6,731,932 B1 | 5/2004 | Rune et al. |
| 6,735,434 B2 | 5/2004 | Criss et al. |
| 6,738,803 B1 | 5/2004 | Dodrill et al. |
| 6,741,848 B2 | 5/2004 | Timonen et al. |
| 6,741,934 B2 | 5/2004 | Chen et al. |
| 6,741,980 B1 | 5/2004 | Langseth et al. |
| 6,742,025 B2 | 5/2004 | Jennery et al. |
| 6,748,209 B2 | 6/2004 | Lipsit |
| 6,754,181 B1 | 6/2004 | Elliott et al. |
| 6,754,714 B1 | 6/2004 | Chebrolu |
| 6,754,722 B2 | 6/2004 | Herzi |
| 6,754,723 B2 | 6/2004 | Kato |
| 6,754,894 B1 | 6/2004 | Costello et al. |
| 6,754,895 B1 | 6/2004 | Bartel et al. |
| 6,754,896 B2 | 6/2004 | Mishra et al. |
| 6,757,263 B1 | 6/2004 | Olds |
| 6,757,893 B1 | 6/2004 | Haikin |
| 6,760,730 B1 | 7/2004 | Kataoka |
| 6,760,908 B2 | 7/2004 | Ren |
| 6,763,104 B1 | 7/2004 | Judkins et al. |
| 6,763,403 B2 | 7/2004 | Cheng et al. |
| 6,772,338 B1 | 8/2004 | Hull |
| 6,775,267 B1 | 8/2004 | Kung et al. |
| 6,775,423 B2 | 8/2004 | Kulkarni et al. |
| 6,779,177 B1 | 8/2004 | Bahrs et al. |
| 6,785,834 B2 | 8/2004 | Chefalas et al. |
| 6,789,110 B1 | 9/2004 | Short et al. |
| 6,789,158 B2 | 9/2004 | Takahashi |
| 6,789,215 B1 | 9/2004 | Rupp et al. |
| 6,789,255 B1 | 9/2004 | Pedrizetti et al. |
| 6,791,877 B2 | 9/2004 | Miura et al. |
| 6,798,876 B1 | 9/2004 | Bala |
| 6,799,155 B1 | 9/2004 | Lindemann et al. |
| 6,802,061 B1 | 10/2004 | Parthasarathy et al. |
| 6,807,558 B1 | 10/2004 | Hassett et al. |
| 6,807,574 B1 | 10/2004 | Partovi et al. |
| 6,813,571 B2 | 11/2004 | Lightbody et al. |
| 6,816,719 B1 | 11/2004 | Heinonen et al. |
| 6,820,214 B1 | 11/2004 | Cabrera et al. |
| 6,820,259 B1 | 11/2004 | Kawamata et al. |
| 6,823,432 B2 | 11/2004 | Ruffle et al. |
| 6,832,373 B2 | 12/2004 | O'Neill |
| 6,836,657 B2 | 12/2004 | Ji et al. |
| 6,836,859 B2 | 12/2004 | Berg et al. |
| 6,839,841 B1 | 1/2005 | Medvinsky et al. |
| 6,842,628 B1 | 1/2005 | Arnold et al. |
| 6,845,370 B2 | 1/2005 | Burkey et al. |
| 6,845,434 B2 | 1/2005 | Lin |
| 6,847,970 B2 | 1/2005 | Kar et al. |
| 6,850,533 B2 | 2/2005 | Gerszberg et al. |
| 6,850,614 B1 | 2/2005 | Collins |
| 6,856,676 B1 | 2/2005 | Pirot et al. |
| 6,865,387 B2 | 3/2005 | Bucknell et al. |
| 6,873,988 B2 | 3/2005 | Herrmann et al. |
| 6,879,685 B1 | 4/2005 | Peterson et al. |
| 6,880,051 B2 | 4/2005 | Timpanaro-Perrotta |
| 6,883,168 B1 | 4/2005 | James et al. |
| 6,885,862 B1 | 4/2005 | Pearson |
| 6,889,054 B2 | 5/2005 | Himmel et al. |
| 6,892,207 B2 | 5/2005 | McKay et al. |
| 6,895,387 B1 | 5/2005 | Roberts et al. |
| 6,904,405 B2 | 6/2005 | Suominen |
| 6,907,478 B2 | 6/2005 | Li et al. |
| 6,912,591 B2 | 6/2005 | Lash |
| 6,915,265 B1 | 7/2005 | Johnson |
| 6,915,325 B1 | 7/2005 | Lee et al. |
| 6,915,452 B2 | 7/2005 | Froehlich et al. |
| 6,918,112 B2 | 7/2005 | Bourke-Dunphy et al. |
| 6,922,722 B1 | 7/2005 | Mann et al. |
| 6,925,300 B2 | 8/2005 | Horne |
| 6,925,467 B2 | 8/2005 | Gu et al. |
| 6,928,108 B2 | 8/2005 | Nelson et al. |
| 6,928,468 B2 | 8/2005 | Leermakers |
| 6,934,028 B2 | 8/2005 | Ho et al. |
| 6,938,076 B2 | 8/2005 | Meyer et al. |
| 6,938,109 B1 | 8/2005 | Sliger et al. |
| 6,941,129 B2 | 9/2005 | Marce et al. |

(56) References Cited

U.S. PATENT DOCUMENTS

| | | |
|---|---|---|
| 6,941,136 B2 | 9/2005 | Study et al. |
| 6,941,453 B2 | 9/2005 | Rao |
| 6,944,621 B1 | 9/2005 | Collart |
| 6,948,099 B1 | 9/2005 | Tallam |
| 6,948,104 B2 | 9/2005 | Herley et al. |
| 6,950,660 B1 | 9/2005 | Hsu et al. |
| 6,952,823 B2 | 10/2005 | Kryloff et al. |
| 6,956,846 B2 | 10/2005 | Lewis et al. |
| 6,957,041 B2 | 10/2005 | Christensen et al. |
| 6,957,062 B2 | 10/2005 | Castrogiovanni et al. |
| 6,957,066 B1 | 10/2005 | Stammers et al. |
| 6,959,436 B2 | 10/2005 | Peng |
| 6,961,417 B2 | 11/2005 | Koch |
| 6,966,058 B2 | 11/2005 | Earl et al. |
| 6,968,179 B1 | 11/2005 | De Vries |
| 6,968,184 B2 | 11/2005 | Criss et al. |
| 6,968,543 B2 | 11/2005 | Takahara et al. |
| 6,970,181 B1 | 11/2005 | Fadel |
| 6,970,189 B1 | 11/2005 | Bernstein et al. |
| 6,970,917 B1 | 11/2005 | Kushwaha et al. |
| 6,976,058 B1 | 12/2005 | Brown et al. |
| 6,976,251 B2 | 12/2005 | Meyerson |
| 6,978,453 B2 | 12/2005 | Rao et al. |
| 6,979,253 B2 | 12/2005 | Thyssen |
| 6,981,020 B2 | 12/2005 | Miloslavsky et al. |
| 6,983,458 B1 | 1/2006 | Honda |
| 6,986,133 B2 | 1/2006 | O'Brien et al. |
| 6,988,182 B2 | 1/2006 | Teachman et al. |
| 6,990,656 B2 | 1/2006 | Ersek et al. |
| 6,990,659 B1 | 1/2006 | Imai |
| 6,990,660 B2 | 1/2006 | Moshir et al. |
| 6,996,603 B1 | 2/2006 | Srinivasan |
| 6,996,818 B2 | 2/2006 | Jacobi et al. |
| 6,999,976 B2 | 2/2006 | Abdallah et al. |
| 6,999,990 B1 | 2/2006 | Sullivan et al. |
| 7,002,919 B1 | 2/2006 | El-Sayed |
| 7,003,534 B2 | 2/2006 | Peng |
| 7,007,049 B2 | 2/2006 | Peng |
| 7,007,083 B1 | 2/2006 | Chesley |
| 7,010,303 B2 | 3/2006 | Lewis et al. |
| 7,024,557 B1 | 4/2006 | Moles et al. |
| 7,027,586 B2 | 4/2006 | Bushey et al. |
| 7,031,972 B2 | 4/2006 | Ren et al. |
| 7,032,033 B1 | 4/2006 | Ledoux et al. |
| 7,039,594 B1 | 5/2006 | Gersting |
| 7,039,796 B2 | 5/2006 | Ballard |
| 7,047,448 B2 | 5/2006 | Rao et al. |
| 7,050,566 B2 | 5/2006 | Becerra et al. |
| 7,055,098 B2 | 5/2006 | Hull et al. |
| 7,055,148 B2 | 5/2006 | Marsh et al. |
| 7,058,849 B2 | 6/2006 | Erstad |
| 7,058,860 B2 | 6/2006 | Miller et al. |
| 7,058,941 B1 | 6/2006 | Venkatesan |
| 7,058,978 B2 | 6/2006 | Feuerstein et al. |
| 7,061,891 B1 | 6/2006 | Kilfoyle et al. |
| 7,062,031 B2 | 6/2006 | Becerra et al. |
| 7,065,347 B1 | 6/2006 | Vikse et al. |
| 7,069,452 B1 | 6/2006 | Hind et al. |
| 7,069,545 B2 | 6/2006 | Wang et al. |
| 7,069,578 B1 | 6/2006 | Prus et al. |
| 7,073,017 B2 | 7/2006 | Yamamoto |
| 7,073,172 B2 | 7/2006 | Chamberlain |
| 7,076,051 B2 | 7/2006 | Brown et al. |
| 7,080,371 B2 | 7/2006 | Arnaiz et al. |
| 7,080,372 B1 | 7/2006 | Cole |
| 7,082,549 B2 | 7/2006 | Rao et al. |
| 7,086,049 B2 | 8/2006 | Goodman |
| 7,089,036 B2 | 8/2006 | Prise |
| 7,089,259 B1 | 8/2006 | Kouznetsov et al. |
| 7,089,549 B2 | 8/2006 | Venkiteswaran |
| 7,089,550 B2 | 8/2006 | Bakke et al. |
| 7,092,734 B2 | 8/2006 | Herle et al. |
| 7,093,244 B2 | 8/2006 | Lajoie et al. |
| 7,096,311 B2 | 8/2006 | Chiang |
| 7,099,896 B2 | 8/2006 | Fields et al. |
| 7,100,083 B2 | 8/2006 | Little et al. |
| 7,103,172 B2 | 9/2006 | Brown et al. |
| 7,103,779 B2 | 9/2006 | Kiehtreiber et al. |
| 7,106,843 B1 | 9/2006 | Gainsboro et al. |
| 7,107,329 B1 | 9/2006 | Schroder et al. |
| 7,110,525 B1 | 9/2006 | Heller et al. |
| 7,111,201 B2 | 9/2006 | Largman et al. |
| 7,111,292 B2 | 9/2006 | Bonnett et al. |
| 7,117,172 B1 | 10/2006 | Black |
| 7,117,195 B2 | 10/2006 | Chantrain et al. |
| 7,120,909 B1 | 10/2006 | Shibuya |
| 7,127,250 B2 | 10/2006 | Gallagher et al. |
| 7,130,807 B1 | 10/2006 | Mikurak |
| 7,130,896 B2 | 10/2006 | Engel et al. |
| 7,134,050 B2 | 11/2006 | Wenzel |
| 7,136,857 B2 | 11/2006 | Chen et al. |
| 7,137,034 B2 | 11/2006 | Largman et al. |
| 7,143,115 B2 | 11/2006 | Jones et al. |
| 7,143,153 B1 | 11/2006 | Black et al. |
| 7,143,405 B2 | 11/2006 | Liu et al. |
| 7,145,898 B1 | 12/2006 | Elliott |
| 7,146,002 B1 | 12/2006 | Smith et al. |
| 7,146,609 B2 | 12/2006 | Thurston et al. |
| 7,149,508 B2 | 12/2006 | Herle |
| 7,150,015 B2 | 12/2006 | Pace et al. |
| 7,165,109 B2 | 1/2007 | Chiloyan et al. |
| 7,165,173 B1 | 1/2007 | Herle |
| 7,171,660 B2 | 1/2007 | McCaleb et al. |
| 7,178,141 B2 | 2/2007 | Piazza |
| 7,181,731 B2 | 2/2007 | Pace et al. |
| 7,188,214 B1 | 3/2007 | Kasriel et al. |
| 7,194,728 B1 | 3/2007 | Sirota et al. |
| 7,200,390 B1 | 4/2007 | Henager et al. |
| 7,203,723 B2 | 4/2007 | Ogawa |
| 7,206,576 B2 | 4/2007 | Jain et al. |
| 7,210,010 B2 | 4/2007 | Ogle |
| 7,215,961 B2 | 5/2007 | Gallagher et al. |
| 7,216,343 B2 | 5/2007 | Das et al. |
| 7,222,340 B2 | 5/2007 | Willis, II |
| 7,230,951 B2 | 6/2007 | Mizell et al. |
| 7,231,411 B1 | 6/2007 | Lu |
| 7,240,102 B1 | 7/2007 | Kouznetsov et al. |
| 7,240,356 B2 | 7/2007 | Iki et al. |
| 7,242,929 B2 | 7/2007 | Draluk et al. |
| 7,247,671 B2 | 7/2007 | Overbeek et al. |
| 7,251,697 B2 | 7/2007 | Piotrowski |
| 7,263,379 B1 | 8/2007 | Parkulo et al. |
| 7,266,371 B1 | 9/2007 | Amin et al. |
| 7,269,821 B2 | 9/2007 | Sahinoja et al. |
| 7,272,711 B2 | 9/2007 | Suda et al. |
| 7,274,911 B2 | 9/2007 | Li |
| 7,275,243 B2 | 9/2007 | Gibbons et al. |
| 7,277,529 B1 | 10/2007 | Wuthnow et al. |
| 7,287,068 B1 | 10/2007 | Eriksson et al. |
| 7,292,846 B2 | 11/2007 | Mittal |
| 7,293,115 B2 | 11/2007 | DaCosta et al. |
| 7,310,720 B2 | 12/2007 | Cornett |
| 7,310,801 B2 | 12/2007 | Burkhardt et al. |
| 7,313,791 B1 | 12/2007 | Chen et al. |
| 7,324,514 B1 | 1/2008 | Haq et al. |
| 7,324,815 B2 | 1/2008 | Ross et al. |
| 7,325,233 B2 | 1/2008 | Kuck et al. |
| 7,346,683 B2 | 3/2008 | Inoue |
| 7,349,695 B2 | 3/2008 | Oommen et al. |
| 7,350,205 B2 | 3/2008 | Ji |
| 7,353,533 B2 | 4/2008 | Wright et al. |
| 7,367,027 B1 | 4/2008 | Chen et al. |
| 7,369,851 B2 | 5/2008 | Okonnen et al. |
| 7,373,109 B2 | 5/2008 | Pohja et al. |
| 7,376,711 B2 | 5/2008 | Du et al. |
| 7,376,944 B2 | 5/2008 | Crisan et al. |
| 7,386,846 B2 | 6/2008 | Rajaram |
| 7,405,537 B2 | 7/2008 | Hoffman et al. |
| 7,409,685 B2 | 8/2008 | Chen et al. |
| 7,415,706 B1 | 8/2008 | Raju et al. |
| 7,433,936 B2 | 10/2008 | Zhu et al. |
| 7,461,294 B2 | 12/2008 | Sano |
| 7,469,306 B2 | 12/2008 | Ng |
| 7,480,907 B1 | 1/2009 | Marolia et al. |

(56) References Cited

U.S. PATENT DOCUMENTS

| | | |
|---|---|---|
| 7,493,128 B2 | 2/2009 | Tang et al. |
| 7,500,143 B2 | 3/2009 | Buia et al. |
| 7,509,496 B2 | 3/2009 | Skog et al. |
| 7,509,652 B2 | 3/2009 | Niemi |
| 7,518,504 B2 | 4/2009 | Peeters |
| 7,523,155 B2 | 4/2009 | Hayes, Jr. |
| 7,526,563 B2 | 4/2009 | Ingimundarson et al. |
| 7,555,750 B1 | 6/2009 | Lilley |
| 7,577,722 B1 | 8/2009 | Khandekar et al. |
| 7,584,466 B1 | 9/2009 | Rao |
| 7,644,404 B2 | 1/2010 | Rao et al. |
| 7,657,884 B2 | 2/2010 | Okonnen et al. |
| 7,657,886 B1 | 2/2010 | Chen et al. |
| 7,664,923 B2 | 2/2010 | Kim et al. |
| 7,673,300 B2 | 3/2010 | Herle et al. |
| 7,673,325 B2 | 3/2010 | Vincent et al. |
| 7,680,828 B2 | 3/2010 | Gorelik |
| 7,689,981 B1 | 3/2010 | Gustafson |
| 7,698,698 B2 | 4/2010 | Skan |
| 7,707,570 B2 | 4/2010 | Yoshimura et al. |
| 7,711,782 B2 | 5/2010 | Kim et al. |
| 7,725,889 B2 | 5/2010 | Gustafson et al. |
| 7,739,679 B2 | 6/2010 | Qumei |
| 7,784,065 B2 | 8/2010 | Polivy et al. |
| 7,797,693 B1 | 9/2010 | Gustafson et al. |
| 7,797,695 B2 | 9/2010 | Motta |
| 7,810,088 B2 | 10/2010 | Herle et al. |
| 7,818,556 B2 | 10/2010 | Lima et al. |
| 7,823,148 B2 | 10/2010 | Deshpande et al. |
| 7,823,155 B2 | 10/2010 | Misra et al. |
| 7,844,964 B2 | 11/2010 | Marolia |
| 7,864,700 B2 * | 1/2011 | Shepard et al. ............... 370/254 |
| 7,873,714 B2 | 1/2011 | Kaappa et al. |
| 7,889,869 B2 | 2/2011 | Ypya et al. |
| 8,063,929 B2 | 11/2011 | Kurtz et al. |
| 8,099,078 B2 | 1/2012 | Lazaridis |
| 8,209,676 B2 | 6/2012 | Kapadekar et al. |
| 2001/0008024 A1 | 7/2001 | Inaba |
| 2001/0018673 A1 | 8/2001 | Goldband et al. |
| 2001/0029178 A1 | 10/2001 | Criss et al. |
| 2001/0041556 A1 | 11/2001 | Laursen et al. |
| 2001/0042112 A1 | 11/2001 | Slivka et al. |
| 2001/0044934 A1 | 11/2001 | Hirai et al. |
| 2001/0047363 A1 | 11/2001 | Peng |
| 2001/0047441 A1 | 11/2001 | Robertson |
| 2001/0048728 A1 | 12/2001 | Peng |
| 2001/0049263 A1 | 12/2001 | Zhang |
| 2001/0052052 A1 | 12/2001 | Peng |
| 2001/0052066 A1 | 12/2001 | Lee et al. |
| 2001/0053688 A1 | 12/2001 | Rignell et al. |
| 2001/0055414 A1 | 12/2001 | Thieme |
| 2001/0056348 A1 | 12/2001 | Hyde-Thomson et al. |
| 2002/0010702 A1 | 1/2002 | Ajtai et al. |
| 2002/0013831 A1 | 1/2002 | Astala et al. |
| 2002/0023258 A1 | 2/2002 | Elwahab et al. |
| 2002/0028673 A1 | 3/2002 | Chang et al. |
| 2002/0030634 A1 | 3/2002 | Noda et al. |
| 2002/0039394 A1 | 4/2002 | Buchwald et al. |
| 2002/0046400 A1 | 4/2002 | Burch |
| 2002/0052938 A1 | 5/2002 | Kanemitsu |
| 2002/0053044 A1 | 5/2002 | Gold et al. |
| 2002/0059526 A1 | 5/2002 | Dillon et al. |
| 2002/0065950 A1 | 5/2002 | Katz et al. |
| 2002/0069259 A1 | 6/2002 | Kushwaha et al. |
| 2002/0072359 A1 | 6/2002 | Moles et al. |
| 2002/0073304 A1 | 6/2002 | Marsh et al. |
| 2002/0073309 A1 | 6/2002 | Kurn et al. |
| 2002/0075824 A1 | 6/2002 | Willekes et al. |
| 2002/0077094 A1 | 6/2002 | Leppanen |
| 2002/0078142 A1 | 6/2002 | Moore et al. |
| 2002/0078185 A1 | 6/2002 | Swerup et al. |
| 2002/0078209 A1 | 6/2002 | Peng |
| 2002/0085704 A1 | 7/2002 | Shires |
| 2002/0087668 A1 | 7/2002 | San Martin et al. |
| 2002/0090934 A1 | 7/2002 | Mitchelmore |
| 2002/0091568 A1 | 7/2002 | Kraft et al. |
| 2002/0091807 A1 | 7/2002 | Goodman |
| 2002/0091815 A1 | 7/2002 | Anderson et al. |
| 2002/0092008 A1 | 7/2002 | Kehne et al. |
| 2002/0092010 A1 | 7/2002 | Fiske |
| 2002/0092011 A1 | 7/2002 | Liu et al. |
| 2002/0095501 A1 | 7/2002 | Chiloyan et al. |
| 2002/0095615 A1 | 7/2002 | Hastings et al. |
| 2002/0099726 A1 | 7/2002 | Crudele et al. |
| 2002/0099950 A1 | 7/2002 | Smith |
| 2002/0100028 A1 | 7/2002 | Kosaka et al. |
| 2002/0100036 A1 | 7/2002 | Moshir et al. |
| 2002/0107795 A1 | 8/2002 | Minear et al. |
| 2002/0112046 A1 | 8/2002 | Kushwaha et al. |
| 2002/0112047 A1 | 8/2002 | Kushwaha et al. |
| 2002/0114384 A1 | 8/2002 | Nelson et al. |
| 2002/0116261 A1 | 8/2002 | Moskowitz et al. |
| 2002/0116665 A1 | 8/2002 | Pickover et al. |
| 2002/0120776 A1 | 8/2002 | Eggebraaten et al. |
| 2002/0120810 A1 | 8/2002 | Brouwer |
| 2002/0123335 A1 | 9/2002 | Luna et al. |
| 2002/0123359 A1 | 9/2002 | Wei et al. |
| 2002/0123934 A1 | 9/2002 | Tanaka et al. |
| 2002/0124007 A1 | 9/2002 | Zhao |
| 2002/0124209 A1 | 9/2002 | Faust et al. |
| 2002/0129355 A1 | 9/2002 | Velten et al. |
| 2002/0131404 A1 | 9/2002 | Mehta et al. |
| 2002/0138567 A1 | 9/2002 | Ogawa |
| 2002/0144005 A1 | 10/2002 | Mae et al. |
| 2002/0144254 A1 | 10/2002 | Owada |
| 2002/0152005 A1 | 10/2002 | Bagnordi |
| 2002/0156863 A1 | 10/2002 | Peng |
| 2002/0157089 A1 | 10/2002 | Patel |
| 2002/0157090 A1 | 10/2002 | Anton, Jr. |
| 2002/0159479 A1 | 10/2002 | Watanuki et al. |
| 2002/0161658 A1 | 10/2002 | Sussman |
| 2002/0162098 A1 | 10/2002 | Suzuki |
| 2002/0166001 A1 | 11/2002 | Cheng et al. |
| 2002/0166027 A1 | 11/2002 | Shirasawa et al. |
| 2002/0170052 A1 | 11/2002 | Radatti |
| 2002/0174338 A1 | 11/2002 | Tomita et al. |
| 2002/0174422 A1 | 11/2002 | Kelley et al. |
| 2002/0178241 A1 | 11/2002 | Eriksson |
| 2002/0184208 A1 | 12/2002 | Kato |
| 2002/0184619 A1 | 12/2002 | Meyerson |
| 2002/0188886 A1 | 12/2002 | Liu et al. |
| 2002/0193100 A1 | 12/2002 | Riffe et al. |
| 2002/0194532 A1 | 12/2002 | Nagasawa |
| 2002/0197991 A1 | 12/2002 | Anvekar et al. |
| 2002/0198971 A1 | 12/2002 | Resnick et al. |
| 2002/0198976 A1 | 12/2002 | Davenport |
| 2003/0005108 A1 | 1/2003 | Bartley et al. |
| 2003/0005362 A1 | 1/2003 | Miller et al. |
| 2003/0005426 A1 | 1/2003 | Scholtens et al. |
| 2003/0009752 A1 | 1/2003 | Gupta |
| 2003/0009753 A1 | 1/2003 | Brodersen et al. |
| 2003/0013434 A1 | 1/2003 | Rosenberg et al. |
| 2003/0018524 A1 | 1/2003 | Fishman et al. |
| 2003/0018764 A1 | 1/2003 | Shell et al. |
| 2003/0018810 A1 | 1/2003 | Karagiannis et al. |
| 2003/0018889 A1 | 1/2003 | Burnett et al. |
| 2003/0022657 A1 | 1/2003 | Herschberg et al. |
| 2003/0022663 A1 | 1/2003 | Rajaram et al. |
| 2003/0023573 A1 | 1/2003 | Chan et al. |
| 2003/0023849 A1 | 1/2003 | Martin, Jr. et al. |
| 2003/0023964 A1 | 1/2003 | Rajaram et al. |
| 2003/0027563 A1 | 2/2003 | Herle et al. |
| 2003/0027581 A1 | 2/2003 | Jokinen et al. |
| 2003/0031306 A1 | 2/2003 | Pederson et al. |
| 2003/0033358 A1 | 2/2003 | Tran et al. |
| 2003/0033525 A1 | 2/2003 | Rajaram |
| 2003/0033599 A1 | 2/2003 | Rajaram et al. |
| 2003/0036919 A1 | 2/2003 | Felt et al. |
| 2003/0037075 A1 | 2/2003 | Hannigan et al. |
| 2003/0041125 A1 | 2/2003 | Salomon |
| 2003/0041127 A1 | 2/2003 | Turnbull |
| 2003/0043180 A1 | 3/2003 | Gusler et al. |
| 2003/0044086 A1 | 3/2003 | Jia et al. |
| 2003/0046485 A1 | 3/2003 | Zitlaw |

(56) References Cited

U.S. PATENT DOCUMENTS

| | | |
|---|---|---|
| 2003/0046524 A1 | 3/2003 | Zimmer et al. |
| 2003/0046680 A1 | 3/2003 | Gentry |
| 2003/0054811 A1 | 3/2003 | Han et al. |
| 2003/0055919 A1 | 3/2003 | Fong et al. |
| 2003/0055931 A1 | 3/2003 | Cravo De Almeida et al. |
| 2003/0061323 A1 | 3/2003 | East et al. |
| 2003/0061384 A1 | 3/2003 | Nakatani |
| 2003/0065738 A1 | 4/2003 | Yang et al. |
| 2003/0066062 A1 | 4/2003 | Brannock et al. |
| 2003/0068162 A1 | 4/2003 | Tsai et al. |
| 2003/0074658 A1 | 4/2003 | Kim |
| 2003/0074672 A1 | 4/2003 | Daniels |
| 2003/0081557 A1 | 5/2003 | Mettala et al. |
| 2003/0081786 A1 | 5/2003 | Nakano et al. |
| 2003/0084138 A1 | 5/2003 | Tavis et al. |
| 2003/0084177 A1 | 5/2003 | Mulligan |
| 2003/0084283 A1 | 5/2003 | Pixton |
| 2003/0084434 A1 | 5/2003 | Ren et al. |
| 2003/0084435 A1 | 5/2003 | Messer et al. |
| 2003/0088868 A1 | 5/2003 | Chang et al. |
| 2003/0092438 A1 | 5/2003 | Moore et al. |
| 2003/0093545 A1 | 5/2003 | Liu et al. |
| 2003/0095648 A1 | 5/2003 | Kaib et al. |
| 2003/0097431 A1 | 5/2003 | Dill |
| 2003/0100303 A1 | 5/2003 | Armbruster et al. |
| 2003/0101246 A1 | 5/2003 | Lahti |
| 2003/0101446 A1 | 5/2003 | McManus et al. |
| 2003/0103484 A1 | 6/2003 | Oommen et al. |
| 2003/0110412 A1 | 6/2003 | Neville |
| 2003/0110484 A1 | 6/2003 | Famolari |
| 2003/0112752 A1 | 6/2003 | Irifune et al. |
| 2003/0117956 A1 | 6/2003 | Lee |
| 2003/0121032 A1 | 6/2003 | Cho et al. |
| 2003/0131087 A1 | 7/2003 | Shippy et al. |
| 2003/0131226 A1 | 7/2003 | Spencer et al. |
| 2003/0133552 A1 | 7/2003 | Pillai et al. |
| 2003/0143991 A1 | 7/2003 | Minear et al. |
| 2003/0149735 A1 | 8/2003 | Stark et al. |
| 2003/0154471 A1 | 8/2003 | Teachman et al. |
| 2003/0156719 A1 | 8/2003 | Cronce |
| 2003/0158973 A1 | 8/2003 | Tsukada |
| 2003/0162533 A1 | 8/2003 | Moles et al. |
| 2003/0163508 A1 | 8/2003 | Goodman |
| 2003/0163551 A1 | 8/2003 | Riordan |
| 2003/0163805 A1 | 8/2003 | Hata et al. |
| 2003/0172094 A1 | 9/2003 | Lauria et al. |
| 2003/0172138 A1 | 9/2003 | McCormack et al. |
| 2003/0172175 A1 | 9/2003 | McCormack et al. |
| 2003/0177255 A1 | 9/2003 | Yun |
| 2003/0177485 A1 | 9/2003 | Waldin et al. |
| 2003/0182414 A1 | 9/2003 | O'Neill |
| 2003/0186689 A1 | 10/2003 | Herle et al. |
| 2003/0186695 A1 | 10/2003 | Bridges et al. |
| 2003/0186722 A1 | 10/2003 | Weiner |
| 2003/0188120 A1 | 10/2003 | Maeda |
| 2003/0188156 A1 | 10/2003 | Yasala et al. |
| 2003/0191955 A1 | 10/2003 | Wagner et al. |
| 2003/0194033 A1 | 10/2003 | Tiedemann et al. |
| 2003/0195110 A1 | 10/2003 | Moody et al. |
| 2003/0195753 A1 | 10/2003 | Homuth |
| 2003/0195951 A1 | 10/2003 | Wittel et al. |
| 2003/0196110 A1 | 10/2003 | Lampson et al. |
| 2003/0198282 A1 | 10/2003 | Tujkovic et al. |
| 2003/0204640 A1 | 10/2003 | Sahinoja et al. |
| 2003/0212742 A1 | 11/2003 | Hochmuth et al. |
| 2003/0214919 A1 | 11/2003 | Kilfoyle et al. |
| 2003/0217193 A1 | 11/2003 | Thurston et al. |
| 2003/0217358 A1 | 11/2003 | Thurston et al. |
| 2003/0221190 A1 | 11/2003 | Deshpande et al. |
| 2003/0224761 A1 | 12/2003 | Goto |
| 2003/0226030 A1 | 12/2003 | Hurst et al. |
| 2003/0226137 A1 | 12/2003 | Nagao |
| 2003/0233649 A1 | 12/2003 | Reimert |
| 2004/0002943 A1 | 1/2004 | Merrill et al. |
| 2004/0003266 A1 | 1/2004 | Moshir et al. |
| 2004/0005906 A1 | 1/2004 | Okumura et al. |
| 2004/0006723 A1 | 1/2004 | Erstad |
| 2004/0006760 A1 | 1/2004 | Gove et al. |
| 2004/0008113 A1 | 1/2004 | Pradhan et al. |
| 2004/0015521 A1* | 1/2004 | Hudicka ................. 707/200 |
| 2004/0015857 A1 | 1/2004 | Cornelius et al. |
| 2004/0015940 A1 | 1/2004 | Heisey et al. |
| 2004/0015952 A1 | 1/2004 | Lajoie et al. |
| 2004/0017831 A1 | 1/2004 | Shen et al. |
| 2004/0018831 A1 | 1/2004 | Majmundar et al. |
| 2004/0026008 A1 | 2/2004 | Delisle |
| 2004/0031027 A1 | 2/2004 | Hiltgen |
| 2004/0031029 A1 | 2/2004 | Lee et al. |
| 2004/0031030 A1 | 2/2004 | Kidder et al. |
| 2004/0031031 A1 | 2/2004 | Rudelic |
| 2004/0034765 A1 | 2/2004 | James |
| 2004/0034850 A1 | 2/2004 | Burkhardt et al. |
| 2004/0034853 A1 | 2/2004 | Gibbons et al. |
| 2004/0038692 A1 | 2/2004 | Muzaffar |
| 2004/0039801 A9 | 2/2004 | Srinivasan et al. |
| 2004/0040020 A1 | 2/2004 | Yang |
| 2004/0041800 A1 | 3/2004 | Daniels |
| 2004/0043788 A1 | 3/2004 | Mittal |
| 2004/0049394 A1 | 3/2004 | Burger et al. |
| 2004/0049609 A1 | 3/2004 | Simonson et al. |
| 2004/0054764 A1 | 3/2004 | Aderton et al. |
| 2004/0054995 A1 | 3/2004 | Lee |
| 2004/0058651 A1 | 3/2004 | Ross et al. |
| 2004/0058652 A1 | 3/2004 | McGregor et al. |
| 2004/0059725 A1 | 3/2004 | Sharangpani et al. |
| 2004/0062130 A1 | 4/2004 | Chiang |
| 2004/0068363 A1 | 4/2004 | Goto |
| 2004/0068721 A1 | 4/2004 | O'Neill et al. |
| 2004/0068724 A1 | 4/2004 | Gardner et al. |
| 2004/0072578 A1 | 4/2004 | Keutmann et al. |
| 2004/0073901 A1 | 4/2004 | Imamatsu |
| 2004/0073912 A1 | 4/2004 | Meza |
| 2004/0078427 A1 | 4/2004 | Gil et al. |
| 2004/0078455 A1 | 4/2004 | Eide et al. |
| 2004/0082346 A1 | 4/2004 | Skytt et al. |
| 2004/0083469 A1 | 4/2004 | Chen et al. |
| 2004/0083472 A1 | 4/2004 | Rao et al. |
| 2004/0088281 A1 | 5/2004 | Matsuishi |
| 2004/0088473 A1 | 5/2004 | Ogle |
| 2004/0088694 A1 | 5/2004 | Ho |
| 2004/0092255 A1 | 5/2004 | Ji et al. |
| 2004/0093342 A1 | 5/2004 | Arbo et al. |
| 2004/0093421 A1 | 5/2004 | Peng et al. |
| 2004/0093523 A1 | 5/2004 | Matsuzaki et al. |
| 2004/0093557 A1 | 5/2004 | Kawatani |
| 2004/0093597 A1 | 5/2004 | Rao et al. |
| 2004/0095457 A1 | 5/2004 | Pokorny et al. |
| 2004/0098413 A1 | 5/2004 | Peng |
| 2004/0098421 A1 | 5/2004 | Peng |
| 2004/0098427 A1 | 5/2004 | Peng |
| 2004/0098715 A1 | 5/2004 | Aghera et al. |
| 2004/0103214 A1 | 5/2004 | Adwankar et al. |
| 2004/0103340 A1 | 5/2004 | Sundareson et al. |
| 2004/0103347 A1 | 5/2004 | Sneed et al. |
| 2004/0107416 A1 | 6/2004 | Buban et al. |
| 2004/0110497 A1 | 6/2004 | Little |
| 2004/0111582 A1 | 6/2004 | Maeda et al. |
| 2004/0111702 A1 | 6/2004 | Chan |
| 2004/0111723 A1 | 6/2004 | Moles et al. |
| 2004/0117322 A1 | 6/2004 | Bjorksten et al. |
| 2004/0117760 A1 | 6/2004 | McFarling |
| 2004/0117785 A1 | 6/2004 | Kincaid |
| 2004/0123153 A1 | 6/2004 | Wright et al. |
| 2004/0123188 A1 | 6/2004 | Srinivasan et al. |
| 2004/0123270 A1 | 6/2004 | Zhuang et al. |
| 2004/0123282 A1 | 6/2004 | Rao |
| 2004/0126803 A1 | 7/2004 | Cash et al. |
| 2004/0133887 A1 | 7/2004 | Herle et al. |
| 2004/0143573 A1 | 7/2004 | Burkey et al. |
| 2004/0143828 A1 | 7/2004 | Liu et al. |
| 2004/0143836 A1 | 7/2004 | McCormack et al. |
| 2004/0148379 A1 | 7/2004 | Ogura |
| 2004/0150519 A1 | 8/2004 | Husain et al. |
| 2004/0152455 A1 | 8/2004 | Herle et al. |

(56) References Cited

U.S. PATENT DOCUMENTS

| | | |
|---|---|---|
| 2004/0153327 A1 | 8/2004 | Liu et al. |
| 2004/0153356 A1 | 8/2004 | Lockwood et al. |
| 2004/0153549 A1 | 8/2004 | Naito et al. |
| 2004/0158583 A1 | 8/2004 | Kaappa |
| 2004/0158817 A1 | 8/2004 | Okachi et al. |
| 2004/0158829 A1 | 8/2004 | Beresin et al. |
| 2004/0166839 A1 | 8/2004 | Okkonen et al. |
| 2004/0168165 A1 | 8/2004 | Kokkinen |
| 2004/0174264 A1 | 9/2004 | Reisman et al. |
| 2004/0180676 A1 | 9/2004 | Haumont et al. |
| 2004/0190693 A1 | 9/2004 | Beiermeister |
| 2004/0192280 A1 | 9/2004 | Dalton et al. |
| 2004/0192299 A1 | 9/2004 | Wilson et al. |
| 2004/0192306 A1 | 9/2004 | Elkarat et al. |
| 2004/0194081 A1 | 9/2004 | Qumei et al. |
| 2004/0198447 A1 | 10/2004 | Larsson |
| 2004/0203593 A1 | 10/2004 | Whelan et al. |
| 2004/0203655 A1 | 10/2004 | Sinnarajah et al. |
| 2004/0204117 A1 | 10/2004 | Weiner |
| 2004/0205709 A1 | 10/2004 | Hiltgen et al. |
| 2004/0208182 A1 | 10/2004 | Boles et al. |
| 2004/0210608 A1 | 10/2004 | Lee et al. |
| 2004/0215702 A1 | 10/2004 | Hamasaki et al. |
| 2004/0215755 A1 | 10/2004 | O'Neill |
| 2004/0215830 A1 | 10/2004 | Shenfield |
| 2004/0218034 A1 | 11/2004 | Wang et al. |
| 2004/0224679 A1 | 11/2004 | Okoro et al. |
| 2004/0226008 A1 | 11/2004 | Jacobi et al. |
| 2004/0229684 A1 | 11/2004 | Blackburn et al. |
| 2004/0230963 A1 | 11/2004 | Rothman et al. |
| 2004/0230965 A1 | 11/2004 | Okkonen |
| 2004/0237079 A1 | 11/2004 | Cox et al. |
| 2004/0237081 A1 | 11/2004 | Homiller |
| 2004/0237083 A1 | 11/2004 | Alcazar et al. |
| 2004/0239975 A1 | 12/2004 | Kawaura et al. |
| 2004/0242286 A1 | 12/2004 | Benco et al. |
| 2004/0243991 A1 | 12/2004 | Gustafson et al. |
| 2004/0243992 A1 | 12/2004 | Gustafson et al. |
| 2004/0243993 A1 | 12/2004 | Okonnen et al. |
| 2004/0244008 A1 | 12/2004 | Lee |
| 2004/0250245 A1 | 12/2004 | Rao et al. |
| 2004/0250294 A1 | 12/2004 | Kim |
| 2004/0255191 A1 | 12/2004 | Fox et al. |
| 2004/0255291 A1 | 12/2004 | Sierer et al. |
| 2004/0257208 A1 | 12/2004 | Huang et al. |
| 2004/0260734 A1 | 12/2004 | Ren et al. |
| 2004/0261072 A1 | 12/2004 | Herle et al. |
| 2004/0261073 A1 | 12/2004 | Herle et al. |
| 2004/0267481 A1 | 12/2004 | Resnick et al. |
| 2004/0267833 A1 | 12/2004 | Meller et al. |
| 2004/0268041 A1 | 12/2004 | Smith |
| 2005/0005268 A1 | 1/2005 | Zilavy et al. |
| 2005/0010552 A1 | 1/2005 | Kaappa et al. |
| 2005/0010576 A1 | 1/2005 | Ren et al. |
| 2005/0010585 A1 | 1/2005 | Sahinoja et al. |
| 2005/0022175 A1 | 1/2005 | Sliger et al. |
| 2005/0027867 A1 | 2/2005 | Mueller et al. |
| 2005/0033774 A1 | 2/2005 | Brentano et al. |
| 2005/0033829 A1 | 2/2005 | Oommen |
| 2005/0037762 A1 | 2/2005 | Gurbani et al. |
| 2005/0038916 A1 | 2/2005 | Nguyen |
| 2005/0038955 A1 | 2/2005 | Chen |
| 2005/0039178 A1 | 2/2005 | Marolia et al. |
| 2005/0050538 A1 | 3/2005 | Kawamata et al. |
| 2005/0055397 A1 | 3/2005 | Zhu et al. |
| 2005/0055453 A1 | 3/2005 | Zhu |
| 2005/0055595 A1 | 3/2005 | Frazer et al. |
| 2005/0055684 A1 | 3/2005 | Rao et al. |
| 2005/0060361 A1 | 3/2005 | Chatrath et al. |
| 2005/0060699 A1 | 3/2005 | Kim et al. |
| 2005/0060711 A1 | 3/2005 | Ericsson et al. |
| 2005/0063242 A1 | 3/2005 | Ren |
| 2005/0066019 A1 | 3/2005 | Egan et al. |
| 2005/0071385 A1 | 3/2005 | Rao |
| 2005/0073438 A1 | 4/2005 | Rodgers et al. |
| 2005/0079863 A1 | 4/2005 | Macaluso |
| 2005/0084079 A1 | 4/2005 | Lang |
| 2005/0086328 A1 | 4/2005 | Landram et al. |
| 2005/0091367 A1 | 4/2005 | Pyhalammi et al. |
| 2005/0091501 A1 | 4/2005 | Osthoff et al. |
| 2005/0096025 A1 | 5/2005 | Qumei et al. |
| 2005/0097544 A1 | 5/2005 | Kim |
| 2005/0102615 A1 | 5/2005 | Roman et al. |
| 2005/0102660 A1 | 5/2005 | Chen et al. |
| 2005/0114493 A1 | 5/2005 | Mandato et al. |
| 2005/0114504 A1 | 5/2005 | Marolia et al. |
| 2005/0114852 A1 | 5/2005 | Chen et al. |
| 2005/0132179 A1 | 6/2005 | Glaum et al. |
| 2005/0132349 A1 | 6/2005 | Roberts et al. |
| 2005/0132351 A1 | 6/2005 | Randall et al. |
| 2005/0135286 A1 | 6/2005 | Nurminen et al. |
| 2005/0136942 A1 | 6/2005 | Timiri et al. |
| 2005/0138232 A1 | 6/2005 | Tamura et al. |
| 2005/0144609 A1 | 6/2005 | Rothman et al. |
| 2005/0144612 A1 | 6/2005 | Wang et al. |
| 2005/0148323 A1 | 7/2005 | Little et al. |
| 2005/0148359 A1 | 7/2005 | Joeressen |
| 2005/0149335 A1 | 7/2005 | Mesbah et al. |
| 2005/0153741 A1 | 7/2005 | Chen et al. |
| 2005/0160195 A1 | 7/2005 | Bruner et al. |
| 2005/0165706 A1 | 7/2005 | Giacchetti |
| 2005/0170863 A1 | 8/2005 | Shostak |
| 2005/0172117 A1 | 8/2005 | Aura |
| 2005/0172141 A1 | 8/2005 | Gayde et al. |
| 2005/0182697 A1 | 8/2005 | Rao |
| 2005/0198062 A1 | 9/2005 | Shapiro |
| 2005/0198379 A1 | 9/2005 | Panasyuk et al. |
| 2005/0204068 A1 | 9/2005 | Zhu et al. |
| 2005/0204353 A1 | 9/2005 | Ji |
| 2005/0210458 A1 | 9/2005 | Moriyama et al. |
| 2005/0216718 A1 | 9/2005 | Rao |
| 2005/0216902 A1 | 9/2005 | Schaefer |
| 2005/0216903 A1 | 9/2005 | Schaefer |
| 2005/0220079 A1 | 10/2005 | Asokan |
| 2005/0227677 A1 | 10/2005 | Kallio |
| 2005/0227683 A1 | 10/2005 | Draluk et al. |
| 2005/0228847 A1 | 10/2005 | Hayes, Jr. |
| 2005/0228874 A1 | 10/2005 | Edgett et al. |
| 2005/0233733 A1 | 10/2005 | Roundtree et al. |
| 2005/0234967 A1 | 10/2005 | Draluk et al. |
| 2005/0234997 A1 | 10/2005 | Gu et al. |
| 2005/0239447 A1 | 10/2005 | Holzman et al. |
| 2005/0246703 A1 | 11/2005 | Ahonen |
| 2005/0251848 A1 | 11/2005 | Al-Janabi |
| 2005/0257214 A1 | 11/2005 | Moshir et al. |
| 2005/0264404 A1 | 12/2005 | Franczyk et al. |
| 2005/0268296 A1 | 12/2005 | Marolia et al. |
| 2005/0272455 A1 | 12/2005 | Oommen |
| 2005/0278399 A1 | 12/2005 | Herle et al. |
| 2005/0278715 A1 | 12/2005 | Herle et al. |
| 2005/0282533 A1 | 12/2005 | Draluk et al. |
| 2005/0289533 A1 | 12/2005 | Wang et al. |
| 2006/0007901 A1 | 1/2006 | Roskowski et al. |
| 2006/0010437 A1 | 1/2006 | Marolia |
| 2006/0015626 A1 | 1/2006 | Hallamaa et al. |
| 2006/0015860 A1 | 1/2006 | Liu et al. |
| 2006/0020947 A1 | 1/2006 | Hallamaa et al. |
| 2006/0026228 A1 | 2/2006 | Kim |
| 2006/0031449 A1 | 2/2006 | Hallamaa et al. |
| 2006/0036493 A1 | 2/2006 | Aufricht et al. |
| 2006/0036874 A1 | 2/2006 | Cockerille et al. |
| 2006/0036941 A1 | 2/2006 | Neil |
| 2006/0039313 A1 | 2/2006 | Chou et al. |
| 2006/0039561 A1 | 2/2006 | Ypya et al. |
| 2006/0052089 A1 | 3/2006 | Khurana et al. |
| 2006/0053066 A1 | 3/2006 | Sherr et al. |
| 2006/0059481 A1 | 3/2006 | Smith et al. |
| 2006/0068786 A1 | 3/2006 | Florence |
| 2006/0072847 A1 | 4/2006 | Chor et al. |
| 2006/0079224 A1 | 4/2006 | Welnick et al. |
| 2006/0080635 A1 | 4/2006 | Anwar et al. |
| 2006/0080650 A1 | 4/2006 | Winters et al. |
| 2006/0080659 A1 | 4/2006 | Ganji |
| 2006/0080681 A1 | 4/2006 | Anwar et al. |

(56) References Cited

U.S. PATENT DOCUMENTS

| | | |
|---|---|---|
| 2006/0087982 A1 | 4/2006 | Kuure et al. |
| 2006/0089999 A1 | 4/2006 | Xiang et al. |
| 2006/0100928 A1 | 5/2006 | Walczak et al. |
| 2006/0101040 A1 | 5/2006 | Ren et al. |
| 2006/0106806 A1 | 5/2006 | Sperling et al. |
| 2006/0106888 A1 | 5/2006 | Iida et al. |
| 2006/0129414 A1 | 6/2006 | Hallamaa et al. |
| 2006/0130046 A1 | 6/2006 | O'Neill |
| 2006/0158510 A1 | 7/2006 | Lia et al. |
| 2006/0160533 A1 | 7/2006 | Chou et al. |
| 2006/0161599 A1 | 7/2006 | Rosen |
| 2006/0172742 A1 | 8/2006 | Chou et al. |
| 2006/0173976 A1 | 8/2006 | Vincent et al. |
| 2006/0174242 A1 | 8/2006 | Zhu et al. |
| 2006/0176397 A1 | 8/2006 | Panabaker |
| 2006/0181553 A1 | 8/2006 | Choe et al. |
| 2006/0190608 A1 | 8/2006 | Sahinoja et al. |
| 2006/0190939 A1 | 8/2006 | Chen et al. |
| 2006/0193337 A1 | 8/2006 | Paila et al. |
| 2006/0200658 A1 | 9/2006 | Penkethman |
| 2006/0200814 A1 | 9/2006 | Kontinen et al. |
| 2006/0203722 A1 | 9/2006 | Oommen |
| 2006/0203738 A1 | 9/2006 | Fok et al. |
| 2006/0212561 A1 | 9/2006 | Feng |
| 2006/0212937 A1 | 9/2006 | Natarajan |
| 2006/0217111 A1 | 9/2006 | Marolia et al. |
| 2006/0223528 A1 | 10/2006 | Smith |
| 2006/0224712 A1 | 10/2006 | Aho |
| 2006/0236325 A1 | 10/2006 | Rao et al. |
| 2006/0242305 A1 | 10/2006 | Alnas |
| 2006/0246922 A1 | 11/2006 | Gasbarro et al. |
| 2006/0248172 A1 | 11/2006 | Zurawka et al. |
| 2006/0258344 A1 | 11/2006 | Chen |
| 2006/0271659 A1 | 11/2006 | Mittal et al. |
| 2006/0277590 A1 | 12/2006 | Limont et al. |
| 2006/0282834 A1 | 12/2006 | Cheng et al. |
| 2007/0014243 A1 | 1/2007 | Meyer et al. |
| 2007/0028226 A1 | 2/2007 | Chen et al. |
| 2007/0036294 A1 | 2/2007 | Chaudhuri et al. |
| 2007/0041545 A1 | 2/2007 | Gainsboro |
| 2007/0043849 A1 | 2/2007 | Lill et al. |
| 2007/0049265 A1 | 3/2007 | Kaimal et al. |
| 2007/0067765 A1 | 3/2007 | Motta et al. |
| 2007/0088701 A1 | 4/2007 | Rao |
| 2007/0089108 A1 | 4/2007 | Chen et al. |
| 2007/0093243 A1 | 4/2007 | Kapadekar et al. |
| 2007/0100585 A1 | 5/2007 | Dulberg et al. |
| 2007/0106806 A1 | 5/2007 | Tu et al. |
| 2007/0132774 A1* | 6/2007 | Fan et al. ............... 345/564 |
| 2007/0133484 A1 | 6/2007 | Albal et al. |
| 2007/0150444 A1 | 6/2007 | Chesnais et al. |
| 2007/0150524 A1 | 6/2007 | Eker et al. |
| 2007/0169073 A1 | 7/2007 | O'Neill et al. |
| 2007/0169075 A1 | 7/2007 | Lill et al. |
| 2007/0169089 A1 | 7/2007 | Bantz et al. |
| 2007/0169099 A1 | 7/2007 | Rao et al. |
| 2007/0186108 A1 | 8/2007 | Passarella et al. |
| 2007/0190939 A1 | 8/2007 | Abel |
| 2007/0192158 A1 | 8/2007 | Kim |
| 2007/0192453 A1 | 8/2007 | Copeland et al. |
| 2007/0200713 A1 | 8/2007 | Weber et al. |
| 2007/0220504 A1 | 9/2007 | Eker |
| 2007/0226805 A1 | 9/2007 | Jeal et al. |
| 2007/0259633 A1 | 11/2007 | Rao |
| 2007/0277169 A1 | 11/2007 | Rao et al. |
| 2007/0282621 A1 | 12/2007 | Altman et al. |
| 2007/0283003 A1 | 12/2007 | Broyles et al. |
| 2007/0294684 A1 | 12/2007 | Kumashiro et al. |
| 2008/0032763 A1 | 2/2008 | Giobbi |
| 2008/0043726 A1 | 2/2008 | Herrero-Veron et al. |
| 2008/0046583 A1 | 2/2008 | Rao |
| 2008/0062900 A1 | 3/2008 | Rao |
| 2008/0062926 A1 | 3/2008 | Oba |
| 2008/0108321 A1 | 5/2008 | Taaghol et al. |
| 2008/0114925 A1 | 5/2008 | Yang |
| 2008/0127320 A1 | 5/2008 | De Lutiis et al. |
| 2008/0144590 A1 | 6/2008 | Rantanen et al. |
| 2008/0154633 A1 | 6/2008 | Ishibashi et al. |
| 2008/0160983 A1 | 7/2008 | Poplett et al. |
| 2008/0184220 A1 | 7/2008 | Chen et al. |
| 2008/0196019 A1 | 8/2008 | Meller et al. |
| 2008/0205419 A1 | 8/2008 | Shin et al. |
| 2008/0208928 A1 | 8/2008 | Hernandez |
| 2008/0244049 A1 | 10/2008 | Normark et al. |
| 2008/0271023 A1 | 10/2008 | Bone et al. |
| 2009/0030965 A1 | 1/2009 | Hayes, Jr. |
| 2009/0064341 A1 | 3/2009 | Hartung et al. |
| 2009/0113386 A1 | 4/2009 | Eker et al. |
| 2009/0190757 A1 | 7/2009 | Chen et al. |
| 2009/0204845 A1 | 8/2009 | Herscovitz et al. |
| 2009/0219848 A1 | 9/2009 | Lohmar et al. |
| 2009/0328099 A1 | 12/2009 | Praden et al. |
| 2010/0185727 A1 | 7/2010 | Mittal |
| 2010/0275010 A1 | 10/2010 | Ghirardi |
| 2010/0279733 A1 | 11/2010 | Karsten et al. |
| 2010/0287308 A1 | 11/2010 | Robbin et al. |
| 2011/0022948 A1 | 1/2011 | Brown et al. |
| 2011/0209055 A1 | 8/2011 | Plestid et al. |

FOREIGN PATENT DOCUMENTS

| | | |
|---|---|---|
| CN | 1864429 | 11/2006 |
| CN | 1906574 | 1/2007 |
| CN | 101043372 | 9/2007 |
| CN | 101543016 | 9/2009 |
| CN | 101595469 | 12/2009 |
| CN | 101904105 | 12/2010 |
| DE | 10115729 | 10/2001 |
| DE | 112007002863 | 10/2009 |
| DE | 112008002767 | 10/2010 |
| EP | 0717353 | 6/1996 |
| EP | 0803812 | 10/1997 |
| EP | 0811942 | 12/1997 |
| EP | 1049346 | 11/2000 |
| EP | 1052571 | 11/2000 |
| EP | 1077407 | 2/2001 |
| EP | 1152338 | 11/2001 |
| EP | 1176840 | 1/2002 |
| EP | 1184785 | 3/2002 |
| EP | 1256865 | 11/2002 |
| EP | 1282989 A1 | 2/2003 |
| EP | 1333375 | 6/2003 |
| EP | 1331833 | 7/2003 |
| EP | 1584005 | 7/2004 |
| EP | 1597668 | 8/2004 |
| EP | 1654640 | 12/2004 |
| EP | 1639435 | 1/2005 |
| EP | 1652100 | 1/2005 |
| EP | 1652075 | 2/2005 |
| EP | 1513317 | 3/2005 |
| EP | 1515571 | 3/2005 |
| EP | 1519600 | 3/2005 |
| EP | 1660996 | 3/2005 |
| EP | 1665041 | 4/2005 |
| EP | 1668951 | 6/2005 |
| EP | 1563436 | 8/2005 |
| EP | 1584016 | 10/2005 |
| EP | 1691282 | 8/2006 |
| EP | 1705832 | 9/2006 |
| EP | 1732037 | 12/2006 |
| EP | 2024850 | 2/2009 |
| EP | 2025095 | 2/2009 |
| EP | 2047420 | 4/2009 |
| EP | 2087644 | 8/2009 |
| EP | 2104992 | 9/2009 |
| EP | 1614034 | 1/2012 |
| GB | 2426151 | 11/2006 |
| GB | 2458047 | 9/2009 |
| GB | 2468225 | 9/2010 |
| JP | 61173360 | 8/1986 |
| JP | 07160490 | 6/1995 |
| JP | 07219780 | 8/1995 |
| JP | 08202626 | 8/1996 |
| JP | 11003223 | 1/1999 |

(56) References Cited

FOREIGN PATENT DOCUMENTS

| | | |
|---|---|---|
| JP | 11161479 | 6/1999 |
| JP | 11272454 | 10/1999 |
| JP | 11345127 | 12/1999 |
| JP | 2001233353 | 2/2003 |
| KR | 19990050594 | 11/1999 |
| KR | 20010046714 | 6/2001 |
| KR | 20010076555 | 8/2001 |
| KR | 20010100328 | 11/2001 |
| KR | 20020034228 | 5/2002 |
| KR | 100506785 | 8/2005 |
| KR | 1020050088193 | 9/2005 |
| KR | 1020080008425 | 3/2006 |
| KR | 1020060064660 | 6/2006 |
| KR | 1020060064663 | 6/2006 |
| KR | 1020060089229 | 8/2006 |
| KR | 20090035044 | 4/2009 |
| KR | 100986487 | 10/2010 |
| KR | 101085987 | 11/2011 |
| TW | 090107418 | 1/2003 |
| WO | WO9632679 | 10/1996 |
| WO | WO9838823 | 9/1998 |
| WO | WO9856149 | 12/1998 |
| WO | WO9921382 | 4/1999 |
| WO | WO9957900 | 11/1999 |
| WO | WO0001187 | 1/2000 |
| WO | WO0002358 | 1/2000 |
| WO | WO0022860 | 4/2000 |
| WO | WO0106798 | 1/2001 |
| WO | WO0186985 | 11/2001 |
| WO | WO0223925 | 3/2002 |
| WO | WO0225438 | 3/2002 |
| WO | WO0241147 | 5/2002 |
| WO | WO03010656 | 2/2003 |
| WO | WO03012574 | 2/2003 |
| WO | WO03025742 | 3/2003 |
| WO | WO03034765 | 4/2003 |
| WO | WO03049381 | 6/2003 |
| WO | WO2004031889 | 4/2004 |
| WO | WO2004038546 | 5/2004 |
| WO | WO2004042538 | 5/2004 |
| WO | 2004049314 | 6/2004 |
| WO | WO2004049104 | 6/2004 |
| WO | WO2004049115 | 6/2004 |
| WO | WO2004049314 | 6/2004 |
| WO | WO2004059956 | 7/2004 |
| WO | WO2004061551 | 7/2004 |
| WO | WO2004061615 | 7/2004 |
| WO | WO2004063899 | 7/2004 |
| WO | WO2004066091 | 8/2004 |
| WO | WO2004070571 | 8/2004 |
| WO | WO2004072773 | 8/2004 |
| WO | WO2004086196 | 10/2004 |
| WO | WO2004095457 | 11/2004 |
| WO | WO2004109510 | 12/2004 |
| WO | 2005008940 | 1/2005 |
| WO | WO2005001665 | 1/2005 |
| WO | WO2005004395 | 1/2005 |
| WO | WO2005008940 | 1/2005 |
| WO | WO2005013123 | 2/2005 |
| WO | WO2005015343 | 2/2005 |
| WO | WO2005024628 | 3/2005 |
| WO | WO2005031570 | 4/2005 |
| WO | WO2005036916 | 4/2005 |
| WO | WO2005041459 | 5/2005 |
| WO | WO2005079334 | 9/2005 |
| WO | WO2006003254 | 1/2006 |
| WO | WO2007112108 | 10/2007 |
| WO | WO2007117514 | 10/2007 |
| WO | WO2007146710 | 12/2007 |
| WO | WO2008003081 | 1/2008 |
| WO | WO2008008880 | 1/2008 |
| WO | WO2008014454 | 1/2008 |
| WO | WO2008022195 | 2/2008 |
| WO | WO2008022198 | 2/2008 |
| WO | WO2008028072 | 3/2008 |
| WO | WO2008033962 | 3/2008 |
| WO | WO2008045700 | 4/2008 |
| WO | WO2008048905 | 4/2008 |
| WO | WO2008067446 | 6/2008 |
| WO | WO2009051760 | 4/2009 |

OTHER PUBLICATIONS

Final Office Action received in U.S. Appl. No. 10/411,835, mailed May 2, 2013, 165 pg.
Bettini, L., "Software Update via Mobile Agent Based Programming," Proc. ACM SAC, Jan. 1, 2002, pp. 32-36.
Bitfone Corp., CA Office Action Jun. 8, 2007, CA App. No. 2,414,281, 4 p.
Bitfone Corp., CN Office Action Jun. 5, 2009, CN App. No. 200610067641.4, 12 p.
Bitfone Corp., CN Office Action Dec. 20, 2010, CN App. No. 200610067641.4, 3 p.
Bitfone Corp., EP Office Action Mar. 16, 2010, EP App. No. EP04777313.0, 8 p.
Bitfone Corp., EP Search Report Mar. 22, 2012, EP App. No. 06251423.7, 6 p.
Bitfone Corp., EP Office Action Mar. 26, 2010, EP App. No. 04785381.7, 5 p.
Bitfone Corp., EP Office Action May 11, 2012, EP App. No. 04777313.0, 9 p.
Bitfone Corp., EP Search Report Jan. 18, 2008, EP App No. 04759830.5, 5 p.
Bitfone Corp., EP Search Report Mar. 30, 2011, EP App. No. 06251423.7, 7 p.
Bitfone Corp., EP Search Report Jul. 1, 2011, EP App. No. 06251423.7, 11 p.
Bitfone Corp., EP Search Report Jul. 4, 2006, EP App. No. EP06250739.7, 7 p.
Bitfone Corp., EP Search Report Jul. 19, 2006, EP App. No. 06251512.7, 8 p.
Bitfone Corp., EP Search Report Nov. 26, 2009, EP App. No. EP04777313.0, 3 p.
Bitfone Corp., Int'l Prelim Rpt Jan. 9, 2006, PCT App. No. PCT/US2004/022598, 7 p.
Bitfone Corp., Int'l Prelim Rpt Jan. 30, 2006, PCT App. No. PCT/US2004/024876, 8 p.
Bitfone Corp., Int'l Prelim Rpt Mar. 6, 2006, PCT App. No. PCT/US2004/028433, 8 p.
Bitfone Corp., Int'l Prelim Rpt Mar. 13, 2006, PCT App. No. PCT/US2004/021037, 7 p.
Bitfone Corp., Int'l Prelim Rpt Mar. 27, 2006, PCT App. No. PCT/US2004/031547, 9 p.
Bitfone Corp., Int'l Prelim Rpt Aug. 5, 2005, PCT App No. PCT/US2004/002950, 6 p.
Bitfone Corp., Int'l Prelim Rpt Aug. 12, 2005, PCT App. No. PCT/US2004/002084, 4 p.
Bitfone Corp., Int'l Prelim Rpt Sep. 30, 2008, PCT App. No. PCT/US2007/007489, 4 p.
Bitfone Corp., Int'l Prelim Rpt Oct. 1, 2005, PCT App. No. PCT/US2004/008918, 4 p.
Bitfone Corp., Int'l Prelim Rpt Oct. 28, 2008, PCT App. No. PCT/US2004/000694, 4 p.
Bitfone Corp., Int'l Prelim Rpt Nov. 7, 2006, PCT App. No. PCT/US2005/004520, 4 p.
Bitfone Corp., Int'l Prelim Rpt Dec. 8, 2005, PCT App. No. PCT/US2004/017731, 8 p.
Bitfone Corp., Int'l Prelim Rpt Dec. 10, 2008, PCT App. No. PCT/US2007/070534, 9 p.
Bitfone Corp., Int'l Prelim Rpt, Apr. 3, 2006, PCT App. No. PCT/US2004/033071, 9 p.
Bitfone Corp., Int'l Search Report & Written Opinion Jan. 4, 2005, PCT App. No. PCT/US2004/002084, 8 p.
Bitfone Corp., Int'l Search Report & Written Opinion Jan. 14, 2005, PCT App. No. PCT/US2004/011219, 9 p.
Bitfone Corp., Int'l Search Report & Written Opinion Jul. 14, 2008, PCT App. No. PCT/US2004/001574, 16 p.

(56) References Cited

OTHER PUBLICATIONS

Bitfone Corp., Int'l Search Report Jan. 10, 2005, PCT App. No. PCT/US2003/033241, 3 p.
Bitfone Corp., Int'l Search Report Jan. 19, 2005, PCT App. No. PCT/US2004/024876, 1 p.
Bitfone Corp., Int'l Search Report Jan. 25, 2005, PCT App. No. PCT/US2003/037265, 3 p.
Bitfone Corp., Int'l Search Report Jan. 25, 2005, PCT App. No. PCT/US2004/033071, 3 p.
Bitfone Corp., Int'l Search Report Jan. 30, 2006, PCT App. No. PCT/US2004/021037, 3 p.
Bitfone Corp., Int', Search Report Feb. 10, 2005, PCT App. No. PCT/US2004/031547, 3 p.
Bitfone Corp., Int'l Search Report Mar. 7, 2005, PCT App. No. PCT/US2004/002950, 4 p.
Bitfone Corp., Int'l Search Report Mar. 16, 2005, PCT App. No. PCT/US2004/008918, 3 p.
Bitfone Corp., Int'l Search Report Apr. 12, 2008, PCT App. No. PCT/US2004/063899, 3 p.
Bitfone Corp., Int'l Search Report Apr. 22, 2004, PCT App. No. PCT/US2003/027620, 4 p.
Bitfone Corp., Int'l Search Report Apr. 23, 2008, PCT App. No. PCT/US2007/007489, 3 p.
Bitfone Corp., Int'l Search Report May 26, 2005, PCT App. No. PCT/US2004/028433, 7 p.
Bitfone Corp., Int'l Search Report Jun. 22, 2005, PCT App. No. PCT/US2003/041555, 3 p.
Bitfone Corp., Int'l Search Report Jul. 20, 2005, PCT App. No. PCT/US2004/022598, 3 p.
Bitfone Corp., Int'l Search Report Jul. 27, 2005, PCT App No. PCT/US2003/035934, 3 p.
Bitfone Corp., Int'l Search Report Aug. 23, 2005, PCT App. No. PCT/US2004/017731, 6 p.
Bitfone Corp., Int'l Search Report Oct. 3, 2006, PCT App. No. PCT/US2005/004520, 3 p.
Bitfone Corp., Int'l Search Report Oct. 3, 2008, PCT App. No. PCT/US2004/000694, 3 p.
Bitfone Corp., Int'l Search Report Oct. 14, 2004, PCT App. No. PCT/US2003/035377, 4 p.
Bitfone Corp., Int'l Search Report Dec. 3, 2004, PCT App. No. PCT/US2003/036995, 4 p.
Bitfone Corp., Int'l Search Report,Jul. 20, 2006, PCT App. No. PCT/US2003/027727, 8 p.
Bitfone Corp., JP Final Office Action Jun. 6, 2006, Jap. App. No. 2002-543291, 10 p.
Bitfone Corp., JP Office Action Nov. 8, 2005, JP App. No. 2002-543291, 13 p.
Bitfone Corp., KR Office Action Feb. 16, 2011, KR App. No. KR-10-2006-7006350, 4 p.
Bitfone Corp., KR Office Action Apr. 10, 2008, KR App. No. KR10-2006-7004343, 7 p.
Bitfone Corp., KR Office Action May 21, 2008, KR App. No. KR10-2006-7004488, 8 p.
Bitfone Corp., KR Office Action Aug. 21, 2007, KR App. No. KR10-2006-7004343, 5 p.
Bitfone Corp., KR Office Action Aug. 21, 2007, KR App. No. KR10-2006-7004488, 5 p.
Bitfone Corp., Written Opinion Jan. 19, 2005, PCT App. No. PCT/US2004/017731, 7 p.
Bitfone Corp., Written Opinion Jan. 30, 2006, PCT App. No. PCT/US2004/021037, 6 p.
Bitfone Corp., Written Opinion Mar. 26, 2006, PCT App. No. PCT/US2004/031547, 8 p.
Bitfone Corp., Written Opinion Jul. 20, 2005, PCT App. No. PCT/US2004/022598, 6 p.
Bitfone Corp., Written Opinion Dec. 4, 2005, PCT App. No. PCT/US2004/017731, 7 p.
Burns et al., "In-Place Reconstruction of Version Differences," IEEE Transactions on Knowledge and Data Engineering, Vo. 15. No. 4, Jul./Aug. 2003, pp. 973-984.
Ciancarini et al., "Using a Coordination Language to Specify and Analyze Systems Containing Modile Components," ACM Transactions, vol. 9. No. 2, Apr. 2000, pp. 167-198.
Claise et al., "IPFIX Protocol Specification", IPFIX Working Group, Jun. 2003, retrieved from: http://tools.ietf.org/html/draft-ietf-ipfix-protocol-00.
CRC Press LLC., "Overview of Cryptography," Copyright 1997 CRC Press LLC, 48 p.
Fasbender et al., "Any Network, Any Terminal, Anywhere," IEEE Personal Communications, Apr. 1999, pp. 22-30, IEEE Press. 1999.
Hadjiefthymiades et al., "ESW4: Enhanced Scheme for WWW Computing in Wireless Communication Environments," ACM SIGCOMM Computer Communication Review, vol. 29, Issue 5, pp. 24-35, ACM Press, Oct. 1999.
Hoffmeyer et al., "Radio Software Download for Commercial Wireless Reconfigurable Devices," IEEE Communications Magazine, IEEE Service Center, New York NY, US. vol. 42, No. 3, Mar. 2004, pp. S26-S32.
HPC, Int'l Search Report Sep. 5, 2007, PCT App. No. PCT/US2007/008415, 2 p.
HPDC, CN Office Action Sep. 22, 2011, CN App. No. 200780044370.3, 9 p.
HPDC, EP Office Action Jan. 22, 2010, EP App. No. 04701739.7, 7 p.
HPDC, EP Office Action Feb. 4, 2011, EP App. No. 07843502.1, 4 p.
HPDC, EP Office Action Feb. 9, 2011, EP App. No. 04759830.5, 3 p.
HPDC, EP Office Action Mar. 4, 2011, EP App. No. 07813468.1, 9 p.
HPDC, EP Office Action Mar. 23, 2010, EP App. No. 04705590.0, 10 p.
HPDC, EP Office Action Apr. 3, 2009, EP App. No. 04779823.6, 7 p.
HPDC, EP Office Action Apr. 11, 2008, EP App. No. 04759830.5, 5 p.
HPDC, EP Office Action Apr. 23, 2009, EP App. No. 04701739.7, 7 p.
HPDC, EP Office Action May 4, 2011, EP App. No. 04759830.5, 3 p.
HPDC, EP Office Action May 11, 2010, EP App. No. 03759224.3, 6 p.
HPDC, EP Office Action Jun. 3, 2009, EP App. No. 01991949.7, 7p.
HPDC, EP Office Action Jun. 30, 2009, EP App. No. 07798184.3, 5 p.
HPDC, EP Office Action Jul. 27, 2011, EP App. No. 07844241.5, 6 p.
HPDC, EP Office Action Aug. 12, 2011, Ep App. No. 04759830.5. 56 p.
HPDC, EP Office Action Aug. 30, 2011, EP App. No. 04779823.6, 6 p.
HPDC, EP Office Action Sep. 2, 2010, EP App. No. 04759830.5, 4 p.
HPDC, EP Office Action Sep. 7, 2009, EP App. No. 07844241.5, 3 p.
HPDC, EP Office Action Sep. 18, 2009, EP App. No. 07843502.1, 2 p.
HPDC, EP Office Action Oct. 15, 2009, EP App. No. 04785067.2, 6 p.
HPDC, EP Office Action Oct. 27, 2009, EP App. No. 04782849.6, 3 p.
HPDC, EP Office Action Nov. 10, 2009, EP App. No. 07798184.3, 4 p.
HPDC, EP Supp. Search Report Feb. 6, 2009, EP App. No. 04701739, 3 p.
HPDC, EP Search Report Feb. 23, 2010, EP App. No. 03789910.1, 5 p.
HPDC, EP Search Report Mar. 6, 2009, EP App. No. 01991949.7, 7 p.
HPDC, EP Search Report Jun. 3, 2009, EP App. No. 01991949.7, 7 p.
HPDC, EP Search Report Aug. 9, 2010, EP App. No. 03789910.1, 6 p.
HPDC, EP Search Report Oct. 19, 2009, EP App. No. 07813468.1, 10 p.
HPDC, EP Search Report Nov. 13, 2009, EP App. No. 04756990.0, 4 p.
HPDC, EP Search Report Nov. 24, 2008, EP App. No. 04779823.6, 3 p.
HPDC, EP Search Report Nov. 25, 2009, EP App. No. 04705590.0, 6 p.

(56) References Cited

OTHER PUBLICATIONS

HPDC, EP Supp. Search Report Feb. 6, 2009, EP App. No. 004701739.7, 3 p.
HPDC, EP Supp. Search Report Jan. 26, 2010, EP App. No. 03759224.3, 3 p.
HPDC, EP Supp. Search Report Dec. 22, 2009, EP App. No. 03789910.1, 7 p.
HPDC, GB Office Action Feb. 25, 2011, GB App. No. 0910190.8, 6 p.
HPDC, GB Office Action Jul. 26, 2011, GB App. No. 0910190.8, 1 p.
HPDC, GB Office Action Sep. 20, 2011, GB App. No. 1007372.4, 3 p.
HPDC, GB Office Action Dec. 22, 2011, GB App. No. 1007372.4, 2 p.
HPDC, Int'l Prelim Rpt Jan. 6, 2009, PCT App. No. PCT/US2007/072493, 8 p.
HPDC, Int'l Prelim Rpt Jan. 13, 2009, PCT App. No. PCT/US2007/073340, 8 p.
HPDC, Int'l Prelim Rpt Jan. 27, 2009, PCT App. No. PCT/US2007/074586, 5 p.
HPDC,,Int'l Prelim Rpt Feb. 17, 2009, PCT App. No. PCT/US2007/076001, 7 p.
HPDC, Int'l Prelim Rpt Feb. 17, 2009, PCT App. No. PCT/US2007/076006, 7 p.
HPDC, Int'l Prelim Rpt Mar. 3, 2009, PCT App. No. PCT/US2007/077288, 7 p.
HPDC, Int'l Prelim Rpt Mar. 17, 2009, PCT App. No. PCT/US2007/078326, 7 p.
HPDC, Int'l Prelim Rpt Apr. 7, 2009, PCT App. No. PCT/US2007/079920, 8 p.
HPDC, Int'l Prelim Rpt Apr. 20, 2010, PCT App. No. PCT/US2008/011824, 6 p.
HPDC, Int'l Prelim Rpt Apr. 22, 2009, PCT App. No. PCT/US2007/081273, 8 p.
HPDC, Int'l Prelim Rpt Jun. 3, 2009, PCT App. No. PCT/US2007/085903, 6 p.
HPDC, Int'l Prelim Rpt Sep. 30, 2008, PCT App. No. PCT/US2007/008415, 7 p.
HPDC, Int'l Search Report Jan. 3, 2008, PCT App. No. US2007/073340, 5 p.
HPDC, Int'l Search Report Jan. 31, 2008, PCT App. No. PCT/US2007/076001, 3 p.
HPDC, Int'l Search Report Feb. 14, 2008, PCT App. No. PCT/US2007/072493, 5 p.
HPDC, Int'l Search Report Mar. 5, 2008, PCT App. No. PCT/US2007/078326, 5 p.
HPDC, Int'l Search Report Mar. 25, 2009, PCT App. No. PCT/US2008/011824, 2p.
HPDC, Int'l Search Report Mar. 27, 2008, PCT App. No. PCT/US2007/079920, 3 p.
HPDC, Intel Search Report Apr. 10, 2008, PCT App No. PCT/US2007/070534, 7 p.
HPDC, Int'l Search Report Jun. 26, 2008, PCT App. No. PCT/US2007/076006, 5 p.
HPDC, Intel Search Report Jul. 18, 2008, PCT App. No. PCT/US2007/077288, 5 p.
HPDC, Int'l Search Report Aug. 13, 2008, PCT App. No. PCT/US2007/085903, 3 p.
HPDC, Int'l Search Report Sep. 2, 2008, PCT App. No. PCT/US2007/081273, 5 p.
HPDC, Int'l Search Report Oct. 24, 2008, PCT App. No. PCT/US2007/074586, 3 p.
HPDC, JP Office Action Nov. 8, 2005, JP App. No. 2002-543291, 13 p.
HPDC, KR Office Action May 6, 2010, KR App. No. 10-2009-7005363, 3 p.
HPDC, KR Office Action Nov. 11, 2009, KR App. No. 10-2009-7005363, 2 p.
HPDC, Written Opinion Apr. 17, 2010, PCT App. No. PCT/US2008/011824, 4 p.
IBM, "System Firmware Update Method Before Rebooting the Operating System," Research Disclosure, Mason Publications, vol. 425, No. 86, Sep. 1, 1999, 2 p.
Jing et al., "Client Server Computing in Mobile Environments," ACM Computing Surveys, vol. 31, No. 2, Jun. 1999, pp. 117-157.
Jones, F., "Jambala-Intelligence beyond digital wireless," Ericsson Review No. 3, 1998, pp. 126-131.
Klein et al., "Compressed Delta Encoding for LZSS Encoded Files," 2007 Data Compression Conference (DCC'07) IEEE Computer Society, 10 p.
Koenig et al., "Re: ext2—available+used not equal to total," Dec. 31, 1998, accessed on Oct. 9, 2007 from <http://www.uwsgiu.edu/hypermail/linux/kerne1/9901.0/0270.html>, Linux Kernel Archive, 2 p.
Lindholm et al., "Fast and Simple XML Tree Dfferencing by Sequence Alignment," DocEng '06, Oct. 10-13, 2006, Amsterdam, The Netherlands, Copyright 2006 ACM, pp. 75-84.
Memorymanagement.Org, http://web.archive.org/web/20020313115607/http://www.memorymanagement.org/glossary, 3 p. 2003.
Meng et al., "Schema-Guided Wrapper Maintenance for Web-Data Extraction," WIDM'03, Nov. 7-8, 2003, pp. 1-8.
Meyers, W. J., "Design of a Microcode Link Editor," Proceedings of the 13th Annual Workshop on Microprogramming, pp. 165-170.
Microsoft, "Computer Dictionary," Microsoft Press, 2002, pp. 372, 373, 380, 423 and 565.
Oommen, P., "A Framework for Integrated Management of Mobile-Stations Over-the-Air," Integrated Network Management Proceedings, 2001 IEEE/IFIP International Symposium on May 14-18, 2001, pp. 247-256.
Oommen, P., "Over the Air Handset Management," Emerging Technologies Symposium; Broadband, Wireless Internet Access, 2000 IEEE Apr. 10-11, 2000, 4 p.
Open Mobile Alliance, "Device Management Protocol, Candidate," Ver 1.2, Jun. 2, 2006.
Open Mobile Alliance, "Generic Content Download Over the Air Specification," Version 1.0, Sep. 12, 2002, 42 p.
Pant et al., Software Reliability Predictions for Distributed Software, IEEE, 1998, pp. 11-21.
Park et al., "A Low-cost Memory Architecture with NAND XIP for Mobile Embedded Systems," CODES+ISSS'03, Oct. 1-3, 2003, pp. 138-143.
Pedram, M., "Power Optimization and Management in Embedded Systems," Jan. 2001, pp. 239-244.
Peymandoust et al., "Low Power Embedded Software Optimization Using Symbolic Algebra," Mar. 2002, pp. 1-7.
Raskar et al., "Image Fusion for Context Enhancement and Video Surrealism," Proceedings of the Third Int'l. Symposium on Non-Photorealistic Animation and Rendering (NPAR2004), Jun. 7-9, 2004, 9 p.
Satoh et al., Experiment of Component-Based Software Development on Multiple Distributed Object Environments, IEEE, 1998, 8 p.
Sevanto et al., "Introducing Quality-of-Service and Traffic Classes into Wireless Mobile Networks," WOWMOM 98 Dallas, Texas, USA, Copyright ACM 1998 pp. 21-30.
Symborski, C. W., "Updating Softwaare and Configuration Data in a Distributed Communications Nev.'Vork". 1988 Computer NetworKing Symposium, 8 p.
Varshney et al., "Emerging Mobile and Wireless Networks," Communications of the ACM Jun. 2000, vol. 43, No. 6, pp. 73-81.
W3C, XML Signature Syntax and Processing, (2nd edition), Jun. 10, 2008, 1 p. [Online] http://www.w3.org/TR/xmldsig-core/.
White, Ron, "How Computers Work," Millennium Ed., Que Corporation, Indianapolis, in, 1999, 284 p.
Yergeau, F., "UTF-8, a transformation format of ISO 10646," Jan. 1998, Alis Technologies, 10 p.
Yoshimura et al., "Mobile Streaming Media CDN Enabled by Dynamic SMIL," WWW2003, May 7-11, 2002, Honolulu, Hawaii, ACM, pp. 651-661.
Wheatley, Office Action Dec. 27, 2011, U.S. Appl. No. 12/057,044, filed Mar. 27, 2008, 6 p.
Rao, Office Action Nov. 14, 2008, U.S. Appl. No. 11/057,361, filed Feb. 14, 2005, 8 p.

(56) References Cited

OTHER PUBLICATIONS

Insun, Office Action Feb. 3, 2010, U.S. Appl. No. 11/111,276, filed Apr. 21, 2005, 10 p.
Insun, Office Action Jul. 12, 2010, U.S. Appl. No. 11/111,276, filed Apr. 21, 2005, 11 p.
Iyad, Office Action Jan. 28, 2008, U.S. Appl. No. 11/100,305, filed Apr. 6, 2005, 20 p.
Iyad, Final Office Action Jul. 22, 2008, U.S. Appl. No. 11/100,305, filed Apr. 6, 2005, 11 p.
Iyad, Office Action Jan. 21, 2009, U.S. Appl. No. 11/100,305, filed Apr. 6, 2005, 7 p.
Iyad, Final Office Action Jul. 8, 2009, U.S. Appl. No. 11/100,305, filed Apr. 6, 2005, 25 p.
Shao-Chun, Office Action Dec. 11, 2008, U.S. Appl. No. 11/120,556, filed May 3, 2005, 28 p.
Shao-Chun, Final Office Action May 26, 2009, U.S. Appl. No. 11/120,556, filed May 3, 2005, 30 p.
Shao-Chun, Office Action Oct. 28, 2009, U.S. Appl. No. 11/120,556, filed May 3, 2005, 31 p.
Shao-Chun, Final Office Action May 13, 2010, U.S. Appl. No. 11/120,556, filed May 3, 2005 32 p.
Shao-Chun, Office Action Nov. 29, 2010, U.S. Appl. No. 11/120,556, May 3, 2005, 26 p.
Shao-Chun, Office Action Oct. 29, 2008, U.S. Appl. No. 11/124,866, filed May 9, 2005, 13 p.
Shao-Chun, Office Action May 5, 2009, U.S. Appl. No. 11/124,866, filed May 9, 2005, 14 p.
Shao-Chun, Office Action Nov. 12, 2008, U.S. Appl. No. 11/144,537, filed Jun. 3, 2005, 16 p.
Shao-Chun, Final Office Action Apr. 29, 2009, U.S. Appl. No. 11/144,537, filed Jun. 3, 2005, 22 p.
Sunil, Office Action Aug. 20, 2008, U.S. Appl. No. 11/189,344, filed Jul. 26, 2005, 12 p.
Sunil, Final Office Action Feb. 19, 2009, U.S. Appl. No. 11/189,344, filed Jul. 26, 2005, 13 p.
Sunil, Office Action Aug. 19, 2009, U.S. Appl. No. 11/189,344, filed Jul. 26, 2005, 10 p.
Sunil, Office Action Sep. 4, 2008, U.S. Appl. No. 11/226,032, filed Sep. 14, 2005, 17 p.
Sunil, Final Office Action Jul. 6, 2009, U.S. Appl. No. 11/226,032, filed Sep. 14, 2005, 17 p.
Sunil, Office Action Dec. 14, 2009, U.S. Appl. No. 11/226,032, filed Sep. 14, 2005, 23 p.
Sunil, Final Office Action Apr. 29, 2010, U.S. Appl. No. 11/226,032, filed Sep. 14, 2005, 16 p.
Rao, Office Action Aug. 21, 2009, U.S. Appl. No. 11/247,463, filed Oct. 11, 2005, 18 p.
Rao, Final Office Action Jul. 13, 2010, U.S. Appl. No. 11/247,463, filed Oct. 11, 2005, 19 p.
Rao, Office Action Mar. 8, 2011, U.S. Appl. No. 11/247,463, filed Oct. 11, 2005, 20 p.
Rao, Final Office Action Aug. 30, 2011, U.S. Appl. No. 11/247,463, filed Oct. 11, 2005, 20 p.
Shao-Chun, Office Action Jul. 8, 2009, U.S. Appl. No. 11/316,291, filed Dec. 21, 2005, 18 p.
Shao-Chun, Final Office Action Dec. 2, 2009, U.S. Appl. No. 11/316,291, filed Dec. 21, 2005, 18 p.
Giovanni, Office Action Jul. 8, 2009, U.S. Appl. No. 11/316,292, filed Dec. 21, 2005, 8 p.
Giovanni, Office Action Jan. 25, 2010, U.S. Appl. No. 11/316,292, filed Dec. 21, 2005, 7 p.
Shao-Chun, Office Action May 27, 2009, U.S. Appl. No. 11/352,813, filed Feb. 13, 2006, 31 p.
Sunil, Office Action Jun. 10, 2008, U.S. Appl. No. 11/352,702, filed Feb. 13, 2006, 8 p.
Sunil, Final Office Action Mar. 30, 2009, U.S. Appl. No. 11/352,702, filed Feb. 13, 2006, 11 p.
Sunil, Office Action Sep. 28, 2009, U.S. Appl. No. 11/352,702, filed Feb. 13, 2006, 9 p.
Sunil, Final Office Action Mar. 16, 2010, U.S. Appl. No. 11/352,702, filed Feb. 13, 2006, 11 p.
Rao, Office Action Feb. 17, 2009, U.S. Appl. No. 11/374,481, filed Mar. 9, 2006, 17 p.
Rao, Final Office Action Jul. 21, 2009, U.S. Appl. No.11/374,481, filed Mar. 9, 2006, 18 p.
Rao, Office Action Jan. 4, 2010, U.S. Appl. No. 11/374,481, filed Mar. 9, 2006, 10 p.
Jason, Office Action Oct. 16, 2008, U.S. Appl. No. 11/369,561, filed Mar. 7, 2006, 13 p.
Jason, Final Office Action May 8, 2009, U.S. Appl. No. 11/369,561, filed Mar. 7, 2006, 14 p.
Rao, Office Action Mar. 12, 2009, U.S. Appl. No. 11/385,162, filed Mar. 21, 2006, 6 p.
Rao, Office Action Sep. 25, 2009, U.S. Appl. No. 11/385,162, filed Mar. 21, 2006, 8 p.
Rao, Final Office Action May 4, 2010, U.S. Appl. No. 11/385,162, filed Mar. 21, 2006, 8 p.
Sunil, Office Action Nov. 13, 2008, U.S. Appl. No. 11/189,944, filed Jul. 26, 2005, 19 p.
Sunil, Final Office Action Apr. 27, 2009, U.S. Appl. No. 11/189,944, filed Jul. 26, 2005, 21 p.
Glenn, Office Action May 29, 2009, U.S. Appl. No. 11/478,108, filed Jun. 28, 2006, 19 p.
Glenn, Office Action Dec. 18, 2009, U.S. Appl. No. 11/478,108, filed Jun. 28, 2006, 17 p.
Glenn, Final Office Action Apr. 27, 2010, U.S. Appl. No. 11/478,108, filed Jun. 28, 2006, 17 p.
Glenn, Office Action Sep. 2, 2010, U.S. Appl. No. 11/478,108, filed Jun. 28, 2006, 21 p.
Glenn, Office Action Dec. 29, 2010, U.S. Appl. No. 11/478,108, filed Jun. 28, 2006, 16 p.
Rao, Office Action Apr. 6, 2010, U.S. Appl. No. 11/397,187, filed Apr. 4, 2006, 12 p.
Giovanni, Office Action May 26, 2010, U.S. Appl. No. 11/500,754, filed Aug. 7, 2006, 12 p.
Giovanni, Final Office Action Sep. 2, 2010, U.S. Appl. No. 11/500,754, filed Aug. 7, 2006, 17 p.
Uma, Office Action Oct. 6, 2009, U.S. Appl. No. 11/707,505, filed Feb. 16, 2007, 16 p.
Uma, Final Office Action Mar. 8, 2010, U.S. Appl. No. 11/707,505, filed Feb. 16, 2007 17 p.
Uma, Office Action Dec. 10, 2010, U.S. Appl. No. 11/707,505, filed Feb. 16, 2007 12 p.
Sunil, Office Action Oct. 7, 2010, U.S. Appl. No. 11/824,344, filed Jun. 29, 2007, 7 p.
Marko, Office Action Apr. 6, 2009, U.S. Appl. No. 11/732,267, filed Apr. 2, 2007, 23 p.
Marko, Final Office Action Oct. 19, 2009, U.S. Appl. No. 11/732,267, filed Apr. 2, 2007, 10 p.
Rao, Office Action Oct. 19, 2009, U.S. Appl. No. 11/799,586, filed May 2, 2007, 18 p.
Rao, Final Office Action Mar. 8, 2010, U.S. Appl. No. 11/799,586, filed May 2, 2007, 18 p.
Rao, Office Action Aug. 18, 2010, U.S. Appl. No. 11/799,586, filed May 2, 2007, 19 p.
Rao, Office Action Mar. 21, 2008, U.S. Appl. No. 11/728,517, filed Mar. 26, 2007, 17 p.
Rao, Office Action Oct. 20, 2008, U.S. Appl. No. 11/728,517, filed Mar. 26, 2007, 21 p.
Rao, Office Action Apr. 13, 2009, U.S. Appl. No. 11/728,517, filed Mar. 26, 2007, 23 p.
Rao, Office Action Dec. 3, 2009, U.S. Appl. No. 11/728,517, filed Mar. 26, 2007, 19 p.
Rao, Final Office Action Jun. 24, 1970, U.S. Appl. No. 11/728,517, filed Mar. 26, 2007, 25 p.
Marolia, Office Action Jul. 28, 2009, U.S. Appl. No. 11/827,583, filed Jul. 12, 2007, 18 p.
Rao, Office Action Jun. 16, 2009, U.S. Appl. No. 11/839,143, filed Aug. 15, 2007, 11 p.
Rao, Final Office Action Jan. 8, 2010, U.S. Appl. No. 11/839,143, filed Aug. 15, 2007, 15 p.

(56) References Cited

OTHER PUBLICATIONS

Rao, Office Action Aug. 4, 2010, U.S. Appl. No. 11/839,143, filed Aug. 15, 2007, 16 p.
Rao, Final Office Action Oct. 5, 2011, U.S. Appl. No. 11/839,143, filed Aug. 15, 2007, 20 p.
Rao, Office Action May 13, 2011, U.S. Appl. No. 11/839,143, filed Aug. 15, 2007, 17 p.
Rao, Final Office Action Aug. 23, 2011, U.S. Appl. No. 11/839,143, filed Aug. 15, 2007, 17 p.
Rao, Office Action Sep. 17, 2009, U.S. Appl. No. 11/847,658, filed Aug. 30, 2007, 10 p.
Rao, Office Action Mar. 25, 2010, U.S. Appl. No. 11/847,658, filed Aug. 30, 2007, 11 p.
Rao, Office Action Aug. 25, 2010, U.S. Appl. No. 11/847,658, filed Aug. 30, 2007, 13 p.
Rao, Office Action Nov. 18, 2010, U.S. Appl. No. 11/847,658, filed Aug. 30, 2007, 11 p.
Rao, Office Action Aug. 24, 2010, U.S. Appl. No. 11/854,414, filed Sep. 12, 2007, 14 p.
Rao, Office Action Nov. 17, 2009, U.S. Appl. No. 11/947,322, filed Nov. 29, 2007, 15 p.
Rao, Final Office Action May 14, 2010, U.S. Appl. No. 11/947,322, filed Nov. 29, 2007, 22 p.
Rao, Office Action Dec. 27, 2010, U.S. Appl. No. 11/947,322, filed Nov. 29, 2007, 43 p.
Rao, Final Office Action May 26, 2011, U.S. Appl. No. 11/947,322, filed Nov. 29, 2007, 40 p.
Rao, Office Action Jan. 9, 2012, U.S. Appl. No. 11/947,322, filed Nov. 29, 2007, 40 p.
Brunet, Office Action Jan. 25, 2006, U.S. Appl. No. 10/822,092, filed Apr. 9, 2004, 14 p.
Brunet, Final Office Action Aug. 23, 2006, U.S. Appl. No. 10/822,092, filed Apr. 9, 2004, 13 p.
Brunet, Office Action Feb. 22, 2007, U.S. Appl. No. 10/822,092, filed Apr. 9, 2004, 19 p.
Brunet, Final Office Action Nov. 15, 2007, U.S. Appl. No. 10/822,092, filed Apr, 9, 2004, 22 p.
Brunet, Office Action Apr. 4, 2008, U.S. Appl. No. 10/822,092, filed Apr. 9, 2004, 27 p.
Brunet, Final Office Action Sep. 23, 2008, U.S. Appl. No. 10/822,092, filed Apr. 9, 2004, 28 p.
Brunet, Office Action Mar. 8, 2007, U.S. Appl. No. 10/889,693, filed Jul. 12, 2004, 17 p.
Brunet, Final Office Action Nov. 28, 2007, U.S. Appl. No. 10/889,693, filed Jul. 12, 2004, 19 p.
Brunet, Office Action Jun. 25, 2008, U.S. Appl. No. 10/889,693, filed Jul. 12, 2004, 69 p.
Brunet, Final Office Action Dec. 23, 2008, U.S. Appl. No. 10/889,693, filed Jul. 12, 2004, 23 p.
Brunet, Office Action Jun. 29, 2006, U.S. Appl. No. 10/999,606, filed Nov. 29, 2004, 9 p.
Brunet, Final Office Action Mar. 7, 2007, U.S. Appl. No. 10/999,606, filed Nov. 9, 2004, 10 p.
Brunet, Office Action Apr. 18, 2008, U.S. Appl. No. 10/999,606, filed Nov. 29, 2004, 6 p.
Brunet, Office Action Apr. 24, 2009, U.S. Appl. No. 10/999,606, filed Nov. 29, 2004, 12 p.
Brunet, Final Office Action Aug. 20, 2009, U.S. Appl. No. 10/999,606, filed Nov. 29, 2004, 16 p.
Brunet, Office Action Nov. 10, 2009, U.S. Appl. No. 10/999,606, filed Nov. 29, 2004, 16 p.
Brunet, Final Office Action Feb. 18, 2010, U.S. Appl. No. 10/999,606, filed Nov. 29, 2004, 16 p.
Shao-Chun, Office Action Jun. 6, 2007, U.S. Appl. No. 11/125,974, filed May 9, 2005, 9 p.
Shao-Chun, Office Action Jan. 17, 2008, U.S. Appl. No. 11/125,974, filed May 9, 2005, 9 p.
Shao-Chun, Final Office Action Aug. 18, 2008, U.S. Appl. No. 11/125,974, filed May 9, 2005, 13 p.
Jeffrey, Office Action Jul. 26, 2006, U.S. Appl. No. 11/247,459, filed Oct. 11, 2005, 9 p.
Jeffrey, Office Action May 15, 2007, U.S. Appl. No. 11/247,459, filed Oct. 11, 2005, 10 p.
Jeffrey, Office Action Oct. 31, 20707, U.S. Appl. No. 11/247,459, filed Oct. 11, 2005, 26 p.
O'Neill, Office Action Aug. 25, 2006, U.S. Appl. No. 10/311,462, filed May 13, 2003, 24 p.
O'Neill, Office Action Mar. 5, 2010, U.S. Appl. No. 10/311,462, filed May 13, 2003, 23 p.
O'Neill, Final Office Action Jul. 23, 2010, U.S. Appl. No. 10/311,462, filed May 13, 2003, 24 p.
O'Neill, Office Action Nov. 18, 2009, U.S. Appl. No. 11/335,312, filed Jan. 19, 2006, 12 p.
O'Neill, Office Action Mar. 12, 2004, U.S. Appl. No. 10/404,601, filed Apr. 1, 2003, 28 p.
Shao-Chun, Final Office Action Jul. 25, 2006, U.S. Appl. No. 10/411,784, filed Apr. 11, 2003, 22 p.
Shao-Chun, Office Action Mar. 27, 2007, U.S. Appl. No. 10/411,784, filed Apr. 11, 2003, 16 p.
Shao-Chun, Final Office Action Oct. 18, 2007, U.S. Appl. No. 10/411,784, filed Apr. 11, 2003, 15 p.
Rao, Examiner's Answer Dec. 6, 2011, U.S. Appl. No. 11/427,635, filed Jan. 24, 2005, 19 p.
Rao, Final Office Action Jun. 10, 2011, U.S. Appl. No. 11/427,635, filed Jan. 24, 2005, 18 p.
Rao, Office Action Dec. 27, 2010, U.S. Appl. No. 11/427,635 filed Jan. 24, 2005, 13 p.
Rao, Office Action Mar. 31, 2010, U.S. Appl. No. 11/427,635 filed Jan. 24, 2005, 14 p.
Rao, Office Action Oct. 15, 2009, U.S. Appl. No. 11/427,635, filed Jan. 24, 2005, 11 p.
Rao, Final Office Action Apr. 30, 2009, U.S. Appl. No. 11/427,635, filed Jan. 24, 2005, 13 p.
Rao, Office Action Nov. 26, 2008, U.S. Appl. No. 11/427,635, filed Jan. 24, 2005, 15 p.
Rao, Examiner's Answer Mar. 16, 2011, U.S. Appl. No. 11/043,813, filed Jan. 26, 2005, 16 p.
Rao, Final Office Action Aug. 20, 2010, U.S. Appl. No. 11/043,813, filed Jan. 26, 2005, 16 p.
Rao, Office Action Mar. 9, 2010, U.S. Appl. No. 11/043,813, filed Jan. 26, 2005, 14 p.
Rao, Final Office Action Nov. 13, 2009, U.S. Appl. No. 11/043,813, filed Jan. 26, 2005, 15 p.
Rao, Office Action Mar. 3, 2009, U.S. Appl. No. 11/043,813, filed Jan. 26, 2005, 11 p.
Rao, Office Action Oct. 3, 2008, U.S. Appl. No. 11/043,813, filed Jan. 26, 2005, 23 p.
Chen, Examiner's Answer Aug. 16, 2012, U.S. Appl. No. 11/099,870, filed Apr. 6, 2005, 12 p.
Chen, Final Office Action Dec. 23, 2011, U.S. Appl. No. 11/099,870, filed Apr. 6, 2005, 12 p.
Chen, Office Action Jul. 6, 2011, U.S. Appl. No. 11/099,870, filed Apr. 6, 2005, 13 p.
Chen, Final Office Action Nov. 26, 2010, U.S. Appl. No. 11/099,870, filed Apr. 6, 2005, 9 p.
Chen, Office Action Jun. 24, 2010, U.S. Appl. No. 11/099,870, filed Apr. 6, 2005, 7 p.
Chen, Office Action Nov. 30, 2009, U.S. Appl. No. 11/099,870, filed Apr. 6, 2005, 8 p.
Chen, Final Office Action Apr. 14, 2009, U.S. Appl. No. 11/099,870, filed Apr. 6, 2005, 19 p.
Chen, Office Action Sep. 24, 2008, U.S. Appl. No. 11/099,870, filed Apr. 6, 2005, 7 p.
Chen, Office Action Apr. 25, 2008, U.S. Appl. No. 11/099,870, filed Apr. 6, 2005, 5 p.
Chen, Final Office Action Oct. 11, 2007, U.S. Appl. No. 11/099,870, filed Apr. 6, 2005, 16 p.
Chen, Office Action Aug. 24, 2006, U.S. Appl. No. 11/099,870, filed Apr. 6, 2005, 15 p.
Zhu, Examiner's Answer Aug. 16, 2012, U.S. Appl. No. 11/386,560, filed Mar. 22, 2006, 9 p.

(56) References Cited

OTHER PUBLICATIONS

Zhu, Final Office Action Feb. 16, 2012, U.S. Appl. No. 11/386,560, filed Mar. 22, 2006, 23 p.
Zhu, Office Action Sep. 30, 2011, U.S. Appl. No. 11/386,560, filed Mar. 22, 2006, 19 p.
Zhu, Final Office Action Mar. 3, 2011, U.S. Appl. No. 11/386,560, filed Mar. 22, 2006, 24 p.
Zhu, Office Action Sep. 15, 2010, U.S. Appl. No. 11/386,560, filed Mar. 22, 2006, 21 p.
Zhu, Office Action Mar. 31, 2010, U.S. Appl. No. 11/386,560, filed Mar. 22, 2006, 17 p.
Chen, Decision on Appeal Jun. 29, 2012, U.S. Appl. No. 11/637,550, filed Dec. 12, 2006, 9 p.
Chen, Examiner's Answer Mar. 30, 2009, U.S. Appl. No. 11/637,550, filed Dec. 12, 2006, 18 p.
Chen, Final Office Action May 22, 2008, U.S. Appl. No. 11/637,550, filed Dec. 12, 2006, 18 p.
Chen, Office Action Oct. 5, 2007, U.S. Appl. No. 11/637,550, filed Dec. 12, 2006, 20 p.
Chen, Final Office Action Jul. 27, 2012, U.S. Appl. No. 12/057,067, filed Mar. 27, 2008, 20 p.
Chen, Office Action Feb. 2, 2012, U.S. Appl. No. 12/057,067, filed Mar. 27, 2008, 18 p.
Chen, Final Office Action Jul. 28, 2011, U.S. Appl. No. 12/057,067, filed Mar. 27, 2008, 17 p.
Chen, Office Action Feb. 16, 2011, U.S. Appl. No. 12/057,067, filed Mar. 27, 2008, 22 p.
O'Neill, Final Office Action Jul. 17, 2012, U.S. Appl. No. 10/411,835, filed Apr. 11, 2003, 32 p.
O'Neill, Office Action Feb. 10, 2012, U.S. Appl. No. 10/411,835, filed Apr. 11, 2003, 26 p.
O'Neill, Advisory Action Jul. 29, 2011, U.S. Appl. No. 10/411,835, filed Apr. 11, 2003, 3 p.
O'Neill, Advisory Action Jun. 28, 2011, U.S. Appl. No. 10/411,835, filed Apr. 11, 2003, 3 p.
O'Neill, Final Office Action Apr. 11, 2011, U.S. Appl. No. 10/411,835, filed Apr. 11, 2003, 29 p.
O'Neill, Office Action Nov. 8, 2010, U.S. Appl. No. 10/411,835, filed Apr. 11, 2003, 26 p.
O'Neill, Office Action Aug. 26, 2009, U.S. Appl. No. 10/411,835, filed Apr. 11, 2003, 25 p.
Chen, Notice of Allowance Aug. 31, 2012, U.S. Appl. No. 10/412,045, filed Apr. 11, 2003, 10 p.
Chen, Final Office Action Jan. 25, 2012, U.S. Appl. No. 10/412,045, filed Apr. 11, 2003, 18 p.
Chen, Office Action Aug. 3, 2011, U.S. Appl. No. 10/412,045, filed Apr. 11, 2003, 18 p.
Chen, Final Office Action Apr. 19, 2010, U.S. Appl. No. 10/412,045, filed Apr. 11, 2003, 25 p.
Chen, Office Action Aug. 26, 2009, U.S. Appl. No. 10/412,045, filed Apr. 11, 2003, 17 p.
O'Neill, Office Action Jul. 23, 2012, U.S. Appl. No. 12/636,600, filed Dec. 11, 2009, 17 p.
Rao, Examiner's Answer May 26, 2011, U.S. Appl. No. 11/637,435, filed Dec. 12, 2006, 20 p.
Rao, Office Action Sep. 10, 2009, U.S. Appl. No. 11/637,435, filed Dec. 12, 2006, 16 p.
Rao, Final Office Action Sep. 15, 2010, U.S. Appl. No. 11/637,435, filed Dec. 12, 2006, 15 p.
Rao, Final Office Action Mar. 17, 2009, U.S. Appl. No. 11/637,435, filed Dec. 12, 2006, 15 p.
Rao, Office Action Sep. 22, 2008, U.S. Appl. No. 11/637,435, filed Dec. 12, 2006, 14 p.
Rao, Decision on Appeal Jun. 29, 2012, U.S. Appl. No. 10/706,362, filed Nov. 12, 2003, 6 p.
Rao, Examiner Answer Oct. 30, 2009, U.S. Appl. No. 10/706,362, filed Nov. 12, 2003, 24 p.
Rao, Final Office Action Apr. 15, 2009, U.S. Appl. No. 10/706,362, filed Nov. 12, 2003, 20 p.
Rao, Office Action Oct. 1, 2008, U.S. Appl. No. 10/706,362, filed Nov. 12, 2003, 19 p.
Rao, Office Action Jan. 9, 2008, U.S. Appl. No. 10/706,362, filed Nov. 12, 2003, 16 p.
Rao, Office Action Jul. 31, 2007, U.S. Appl. No. 10/706,362, filed Nov. 12, 2003, 17 p.
Rao, Office Action Dec. 5, 2006, U.S. Appl. No. 10/706,362, filed Nov. 12, 2003, 15 p.
McGhee, Decision on Appeal Jun. 6, 2012, U.S. Appl. No. 10/774,027, filed Feb. 6, 2004, 8 p.
McGhee, Examiner's Answer Oct. 30, 09, U.S. Appl. No. 10/774,027, filed Feb. 6, 2004, 31 p.
McGhee, Final Office Action Apr. 24, 2009, U.S. Appl. No. 10/774,027, filed Feb. 6, 2004, 23 p.
McGhee, Office Action Oct. 15, 2008, U.S. Appl. No. 10/774,027, filed Feb. 6, 2004, 25 p.
McGhee, Office Action Mar. 4, 2008, U.S. Appl. No. 10/774,027, filed Feb. 6, 2004, 26 p.
Yang, Corrected Examiner's Answer Nov. 21, 2011, U.S. Appl. No. 12/030,757, filed Feb. 13, 2008, 2 p.
Yang, Examiner's Answer Nov. 10, 2011, U.S. Appl. No. 12/030,757, filed Feb. 13, 2008, 19 p.
Yang, Advisory Action Sep. 29, 2011, U.S. Appl. No. 12/030,757, filed Feb. 13, 2008, 3 p.
Yang, Final Office Action Jul. 14, 2011, U.S. Appl. No. 12/030,757, filed Feb. 13, 2008, 17 p.
Yang, Office Action Mar. 9, 2011, U.S. Appl. No. 12/030,757, filed Feb. 13, 2008, 33 p.
Rao, Final Office Action Nov. 20, 2012, U.S. Appl. No. 10/909,550, filed Aug. 2, 2004, 20 p.
Rao, Office Action Jun. 19, 2012, U.S. Appl. No. 10/909,550, filed Aug. 2, 2004, 24 p.
Rao, Advisory Action Oct. 8, 2010, U.S. Appl. No. 10/909,550, filed Aug. 2, 2004, 3 p.
Rao, Advisory Action Sep. 1, 2010, U.S. Appl. No. 10/909,550, filed Aug. 2, 2004, 3 p.
Rao, Final Office Action Jun. 3, 2010, U.S. Appl. No. 10/909,550, filed Aug. 2, 2004, 26 p.
Rao, Office Action Nov. 27, 2009, U.S. Appl. No. 10/909,550, filed Aug. 2, 2004, 17 p.
Rao, Office Action Jun. 23, 2009, U.S. Appl. No. 10/909,550, filed Aug. 2, 2004, 7 p.
Rao, Final Office Action Sep. 25, 2008, U.S. Appl. No. 10/909,550, filed Aug. 2, 2004, 19 p.
Rao, Office Action Apr. 23, 2008, U.S. Appl. No. 10/909,550, filed Aug. 2, 2004, 29 p.
Chia, Notice of Allowance May 31, 2012, U.S. Appl. No. 10/943,455, filed Sep. 17, 2004, 11 p.
Chia, Final Office Action Dec. 8, 2011, U.S. Appl. No. 10/943,455, filed Sep. 17, 2004, 23 p.
Chia, Office Action Jun. 22, 2010, U.S. Appl. No. 10/943,455, filed Sep. 17, 2004, 34 p.
Chia, Office Action Jan. 7, 2010, U.S. Appl. No. 10/943,455, filed Sep. 17, 2004, 21 p.
Chia, Office Action Jun. 11, 2009, U.S. Appl. No. 10/943,455, Sep. 17, 2004, 18 p.
Chia, Final Office Action Dec. 24, 2008, U.S. Appl. No. 10/943,455, Sep. 17, 2004, 17 p.
Chia, Office Action Mar. 21, 2008, U.S. Appl. No. 10/943,455, filed Sep. 17, 2004, 22 p.
Wang, Examiner's Answer Aug. 19, 2011, U.S. Appl. No. 11/183,199, filed Jul. 15, 2005, 23 p.
Wang, Advisory Action Feb. 23, 2011, U.S. Appl. No. 11/183,199, filed Jul. 15, 2005, 2 p.
Wang, Final Office Action Nov. 1, 2010, U.S. Appl. No. 11/183,199, Jul. 15, 2005, 19 p.
Wang, Office Action Apr. 28, 2010, U.S. Appl. No. 11/183,199, filed Jul. 15, 2005, 17 p.
Wang, Final Office Action Aug. 17, 2009, U.S. Appl. No. 11/183,199, filed Jul. 15, 2005, 16 p.
Wang, Office Action Feb. 13, 2009, U.S. Appl. No. 11/183,199, filed Jul. 15, 2005, 16 p.

(56) References Cited

OTHER PUBLICATIONS

Wang, Interview Summary Feb. 5, 2009, U.S. Appl. No. 11/183,199, filed Jul. 15, 2005, 2 p.
Wang, Final Office Action Oct. 28, 2008, U.S. Appl. No. 11/183,199, filed Jul. 15, 2005, 19 p.
Wang, Office Action Apr. 17, 2008, U.S. Appl. No. 11/183,199, filed Jul. 15, 2005, 41 p.
Wang, Final Office Action Oct. 9, 2007, U.S. Appl. No. 11/183,199, filed Jul. 15, 2005, 13 p.
Wang, Office Action Jan. 9, 2007, U.S. Appl. No. 11/183,199, filed Jul. 15, 2005, 15 p.
Randall, Examiner's Answer Jun. 9, 2010, U.S. Appl. No. 10/955,021, filed Sep. 30, 2004, 22 p.
Randall, Final Office Action Nov. 6, 2009, U.S. Appl. No. 10/955,021, filed Sep. 30, 2004, 25 p.
Randall, Office Action Apr. 1, 2009, U.S. Appl. No. 10/955,021, filed Sep. 30, 2004, 16 p.
Randall, Office Action Oct. 17, 2008, U.S. Appl. No. 10/955,021, filed Sep. 30, 2004, 16 p.
Randall, Office Action May 1, 2008, U.S. Appl. No. 10/955,021, filed Sep. 30, 2004, 18 p.
Daley, Corrected Examiner's Answer Nov. 1, 2011, U.S. Appl. No. 11/039,000, filed Jan. 18, 2005, 2 p.
Daley, Examiner's Answer Oct. 24, 2011, U.S. Appl. No. 11/039,000, filed Jan. 18, 2005, 20 p.
Daley, Final Office Action Feb. 17, 2011, U.S. Appl. No. 11/039,000, filed Jan. 18, 2005, 15 p.
Daley, Office Action Aug. 30, 2010, U.S. Appl. No. 11/039,000, filed Jan. 18, 2005, 15 p.
Daley, Final Office Action Nov. 27, 2009, U.S. Appl. No. 11/039,000, filed Jan. 18, 2005, 14 p.
Daley, Office Action May 28, 2009, U.S. Appl. No. 11/039,000, filed Jan. 18, 2005, 13 p.
Daley, Final Office Action Dec. 3, 2008, U.S. Appl. No. 11/039,000, filed Jan. 18, 2005, 15 p.
Daley, Office Action Jan. 5, 2008, U.S. Appl. No. 11/039,000, filed Jan. 18, 2005, 25 p.
Kapadekar, Examiner's Answer Mar. 2, 2011, U.S. Appl. No. 11/552,942, filed Oct. 25, 2006, 18 p.
Kapadekar, Final Office Action Jun. 11, 2010, U.S. Appl. No. 11/552,942, filed Oct. 25, 2006, 17 p.
Kapadekar, Office Action Oct. 30, 2009, U.S. Appl. No. 11/552,942, filed Oct. 25, 2006, 15 p.
Kapadekar, Final Office Action Jul. 24, 2009, U.S. Appl. No. 11/552,942, filed Oct. 25, 2006, 12 p.
Kapadekar, Office Action Jan. 14, 2009, U.S. Appl. No. 11/552,942, filed Oct. 25, 2006, 8 p.
Logan, Examiner's Answer Jul. 28, 2011, U.S. Appl. No. 11/500,734, filed Aug. 7, 2006, 2 p.
Logan, Examiner's Answer Jun. 28, 2011, U.S. Appl. No. 11/500,734, filed Aug. 7, 2006, 25 p.
Logan, Advisory Action Feb. 17, 2011, U.S. Appl. No. 11/500,734, filed Aug. 7, 2006, 2 p.
Logan, Office Action Sep. 29, 2010, U.S. Appl. No. 11/500,734, filed Aug. 7, 2006, 24 p.
Logan, Office Action Apr. 27, 2010, U.S. Appl. No. 11/500,734, filed Aug. 7, 2006, 23 p.
Logan, Final Office Action Dec. 14, 2009, U.S. Appl. No. 11/500,734, filed Aug. 7, 2006, 22 p.
Logan, Office Action Nov. 26, 2008, U.S. Appl. No. 11/500,734, filed Aug. 7, 2006, 20 p.
Rao, Examiner's Answer Jun. 28, 2011, U.S. Appl. No. 11/385,502, filed Mar. 21, 2006, 17 p.
Rao, Final Office Action Nov. 26, 2010, U.S. Appl. No. 11/385,502, filed Mar. 21, 2006, 11 p.
Rao, Office Action Jun. 25, 2010, U.S. Appl. No. 11/385,502, filed Mar. 21, 2006, 10 p.
Rao, Final Office Action Dec. 15, 2009, U.S. Appl. No. 11/385,502, filed Mar. 21, 2006, 10 p.
Rao, Office Action May 12, 2009, U.S. Appl. No. 11/385,502, filed Mar. 21, 2006, 9 p.
Motta, Final Office Action Nov. 19, 2012, U.S. Appl. No. 11/449,259, filed Jun. 7, 2006, 25 p.
Motta, Office Action Jul. 26, 2012, U.S. Appl. No. 11/449,259, filed Jun. 7, 2006, 20 p.
Motta, Decision on Appeal Jun. 20, 2012, U.S. Appl. No. 11/449,259, filed Jun. 7, 2006, 7 p.
Motta, Examiner's Answer Jul. 23, 2009, U.S. Appl. No. 11/449,259, filed Jun. 7, 2006, 28 p.
Motta, Interview Summary Feb. 12, 2009, U.S. Appl. No. 11/449,259, filed Jun. 7, 2006, 4 p.
Motta, Advisory Action Jan. 27, 2009, U.S. Appl. No. U.S. Appl. No. 11/449,259, filed Jun. 7, 2006, 3 p.
Motta, Final Office Action Nov. 13, 2008, U.S. Appl. No. 11/449,259, filed Jun. 7, 2006, 18 p.
Motta, Office Action Jul. 10, 2008, U.S. Appl. No. 11/449,259, filed Jun. 7, 2006, 22 p.
Motta, Examiner's Answer Nov. 25, 2011, U.S. Appl. No. 11/590,137, filed Oct. 30, 2006, 11 p.
Motta, Final Office Action Jul. 19, 2011, U.S. Appl. No. 11/590,137, filed Oct. 30, 2006, 11 p.
Motta, Office Action Mar. 11, 2011, U.S. Appl. No. 11/590,137, filed Oct. 30, 2006, 12 p.
Daley, Final Office Action Mar. 17, 2011, U.S. Appl. No. 11/676,997, filed Feb. 20, 2007, 34 p.
Daley, Office Action Aug. 17, 2010, U.S. Appl. No. 11/676,997, filed Feb. 20, 2007, 31 p.
Daley, Office Action Feb. 22, 2010, U.S. Appl. No. 11/676,997, filed Feb. 20, 2007, 27 p.
Motta, Interview Summary Apr. 12, 2012, U.S. Appl. No. 11/829,520, filed Jul. 27, 2007, 3 p.
Motta, Final Office Action Jan. 13, 2012, U.S. Appl. No. 11/829,520, filed Jul. 27, 2007, 27 p.
Motta, Interview Summary Nov. 29, 2011, U.S. Appl. No. 11/829,520, filed Jul. 27, 2007, 3 p.
Motta, Office Action Sep. 1, 2011, U.S. Appl. No. 11/829,520, filed Jul. 27, 2007, 14 p.
Daley, Examiner's Answer Nov. 2, 2010, U.S. Appl. No. 11/839,396, filed Aug. 15, 2007, 15 p.
Daley, Final Office Action May 25, 2010, U.S. Appl. No. 11/839,396, filed Aug. 15, 2007, 16 p.
Daley, Interview Summary Feb. 25, 2010, U.S. Appl. No. 11/839,396, filed Aug. 15, 2007, 3 p.
Daley, Office Action Dec. 21, 2009, U.S. Appl. No. 11/839,396, filed Aug. 15, 2007, 14 p.
Daley, Office Action Jul. 29, 2009, U.S. Appl. No. 11/839,396, filed Aug. 15, 2007, 23 p.
Rao, Final Office Action Sep. 21, 2012, U.S. Appl. No. 11/867,370, filed Oct. 4, 2007, 14 p.
Rao, Office Action May 3, 2012, U.S. Appl. No. 11/867,370, filed Oct. 4, 2007, 13 p.
Rao, Final Office Action Dec. 22, 2010, U.S. Appl. No. 11/867,370, filed Oct. 4, 2007, 10 p.
Rao, Office Action Sep. 3, 2010, U.S. Appl. No. 11/867,370, filed Oct. 4, 2007, 11 p.
Rao, Examiner's Answer Apr. 12, 2012, U.S. Appl. No. 11/871,867, filed Oct. 12, 2007, 14 p.
Rao, Final Office Action Oct. 11, 2011, U.S. Appl. No. 11/871,867, filed Oct. 12, 2007, 14 p.
Rao, Interview Summary Aug. 5, 2011, U.S. Appl. No. 11/871,867, filed Oct. 12, 2007, 4 p.
Rao, Office Action Apr. 29, 2011, U.S. Appl. No. 11/871,867, filed Oct. 12, 2007, 13 p.
Rao, Final Office Action Sep. 30, 2010, U.S. Appl. No. 11/871,867, filed Oct. 12, 2007, 14 p.
Rao, Office Action Mar. 25, 2010, U.S. Appl. No. 11/871,867, filed Oct. 12, 2007, 11 p.
Rao, Office Action Aug. 10, 2009, U.S. Appl. No. 11/871,867, filed Oct. 12, 2007, 14 p.
Chowdhary, Decision on Appeal Nov. 1, 2012, U.S. Appl. No. 11/005,312, Dec. 6, 2004, 8 p.

(56) References Cited

OTHER PUBLICATIONS

Chowdhary, Order Apr. 27, 2009, U.S. Appl. No. 11/005,312, filed Dec. 6, 2004, 3 p.
Chowdhary, Examiner's Answer Aug. 20, 2008, U.S. Appl. No. 11/005,312, filed Dec. 6, 2004, 28 p.
Chowdhary, Office Action Sep. 5, 2006, Nov. 1, 2012, U.S. Appl. No. 11/005,312, filed Dec. 6, 2004, 29 p.
Chowdhary, Final Office Action Mar. 21, 2007, U.S. Appl. No. 11/005,312, filed Dec. 6, 2004, 27 p.
Chowdhary, Office Action Jan. 11, 2008, U.S. Appl. No. 11/005,312, filed Dec. 6, 2004, 24 p.
Rao, Final Office Action Oct. 16, 2012, U.S. Appl. No. 13/350,355, filed Jan. 13, 2012, 18 p.
Rao, Office Action May 16, 2012, U.S. Appl. No. 13/350,355, filed Jan. 13, 2012, 28 p.
Okkonen, Office Action Dec. 28, 2005, U.S. Appl. No. 10/417,285, filed Apr. 15, 2003, 21 p.
Okkonen, Final Office Action May 1, 2006, U.S. Appl. No. 10/417,285, filed Apr. 15, 2003, 41 p.
Okkonen, Office Action Jan. 29, 2007, U.S. Appl. No. 10/417,285, filed Apr. 15, 2003, 41 p.
Okkonen, Office Action Aug. 6, 2007, U.S. Appl. No. 10/417,285, filed Apr. 15, 2003, 6 p.
Okkonen, Office Action Dec. 9, 2009, U.S. Appl. No. 11/650,777, filed Jan. 8, 2007, 17 p.
Okkonen, Final Office Action May 13, 2010, U.S. Appl. No. 11/650,777, filed Jan. 8, 2007, 24 p.
O'Neill, Office Action Jun. 26, 2006, U.S. Appl. No. 10/631,567, filed Jul. 31, 2003, 18 p.
O'Neill, Final Office Action Apr. 10, 2007, U.S. Appl. No. 10/631,567, filed Jul. 31, 2003, 31 p.
O'Neill, Office Action Jan. 14, 2008, U.S. Appl. No. 10/631,567, filed Jul. 31, 2003, 41 p.
O'Neill, Office Action Jul. 9, 2008, U.S. Appl. No. 10/631,567, filed Jul. 31, 2003, 14 p.
O'Neill, Final Office Action Jan. 22, 2009, U.S. Appl. No. 10/631,567, filed Jul. 31, 2003, 14 p.
Chen, Office Action Jan. 8, 2007, U.S. Appl. No. 10/646,324, filed Aug. 22, 2003, 9 p.
Chen, Office Action May 13, 2011, U.S. Appl. No. 11/923,383, filed Oct. 24, 2007, 22 p.
Chen, Final Office Action Nov. 10, 2011, U.S. Appl. No. 11/923,383, filed Oct. 24, 2007, 27 p.
O'Neill, Office Action Oct. 23, 2006, U.S. Appl. No. 10/654,149, filed Sep. 3, 2003, 13 p.
O'Neill, Office Action May 31, 2007, U.S. Appl. No. 10/654,149, filed Sep. 3, 2003, 13 p.
O'Neill, Final Office Action Dec. 13, 2007, U.S. Appl. No. 10/654,149, filed Sep. 3, 2003, 15 p.
O'Neill, Office Action Dec. 4, 2008, U.S. Appl. No. 10/654,149, filed Sep. 3, 2003, 14 p.
O'Neill, Final Office Action May 26, 2009, U.S. Appl. No. 10/654,149, filed Sep. 3, 2003, 15 p.
Rao, Office Action Feb. 7, 2007, U.S. Appl. No. 10/654,412, filed Sep. 3, 2003, 9 p.
Rao, Final Office Action Aug. 24, 2007, U.S. Appl. No. 10/654,412, filed Sep. 3, 2003, 13 p.
Rao, Office Action Mar. 5, 2008, U.S. Appl. No. 10/654,412, filed Sep. 3, 2003, 15 p.
Chen, Office Action Nov. 20, 2006, U.S. Appl. No. 10/646,319, filed Aug. 22, 2003, 8 p.
Chen, Office Action Aug. 16, 2011, U.S. Appl. No. 12/032,809, filed Feb. 18, 2008, 20 p.
Chen, Final Office Action Jan. 19, 2012, U.S. Appl. No. 12/032,809, filed Feb. 18, 2008, 24 p.
Rao, Office Action Aug. 16, 2006, U.S. Appl. No. 10/695,713, filed Oct. 29, 2003, 12 p.
Rao, Final Office Action Dec. 20, 2006, U.S. Appl. No. 10/695,713, filed Oct. 29, 2003, 13 p.
Rao, Office Action Oct. 21, 2009, U.S. Appl. No. 11/688,820, filed Mar. 20, 2007, 10 p.
Rao, Final Office Action May 3, 2010, U.S. Appl. No. 11/688,820, filed Mar. 20, 2007, 14 p.
Rao, Office Action Dec. 30, 2004, U.S. Appl. No. 10/689,309, filed Oct. 20, 2003, 5 p.
Rao, Office Action Jun. 24, 2009, U.S. Appl. No. 11/251,046, filed Oct. 14, 2005, 8 p.
Lilley, Office Action Oct. 24, 2006, U.S. Appl. No. 10/681,861, filed Oct. 8, 2003, 24 p.
Lilley, Final Office Action Jul. 23, 2007, U.S. Appl. No. 10/681,861, filed Oct. 8, 2003, 18 p.
Lilley, Office Action Nov. 16, 2007, U.S. Appl. No. 10/681,861, filed Oct. 8, 2003, 18 p.
Lilley, Final Office Action Jun. 16, 2008, U.S. Appl. No. 10/681,861, filed Oct. 8, 2003, 24 p.
O'Neill, Office Action Mar. 22, 2007, U.S. Appl. No. 10/721,658, filed Nov. 25, 2003, 14 p.
O'Neill, Final Office Action Sep. 25, 2007, U.S. Appl. No. 10/721,658, filed Nov. 25, 2003, 9 p.
O'Neill, Final Office Action Feb. 20, 2008, U.S. Appl. No. 10/721,658, filed Nov. 25, 2003, 13 p.
Rao, Office Action Oct. 5, 2004, U.S. Appl. No. 10/701,848, filed Nov. 5, 2003, 12 p.
Rao, Final Office Action May 5, 2005, U.S. Appl. No. 10/701,848, filed Nov. 5, 2003, 14 p.
Rao, Office Action Nov. 23, 2005, U.S. Appl. No. 10/701,848, filed Nov. 5, 2003, 13 p.
Rao, Final Office Action Aug. 15, 2006, U.S. Appl. No. 10/701,848, filed Nov. 5, 2003, 16 p.
Rao, Office Action Nov. 14, 2006, U.S. Appl. No. 10/706,219, filed Nov. 12, 2003, 12 p.
Rao, Final Office Action May 2, 2007, U.S. Appl. No. 10/706,219, filed Nov. 12, 2003, 17 p.
Rao, Office Action Dec. 13, 2007, U.S. Appl. No. 10/706,219, filed Nov. 12, 2003, 13 p.
Rao, Office Action Jun. 25, 2008, U.S. Appl. No. 10/706,219, filed Nov. 12, 2003, 10 p.
Rao, Final Office Action Jan. 6, 2009, U.S. Appl. No. 10/706,219, filed Nov. 12, 2003, 16 p.
Rao, Office Action Jul. 22, 2009, U.S. Appl. No. 10/706,219, filed Nov. 12, 2003, 6 p.
Rao, Office Action Mar. 26, 2009, U.S. Appl. No. 11/401,708, filed Apr. 11, 2006, 20 p.
Rao, Office Action Aug. 9, 2005, U.S. Appl. No. 10/695,524, filed Oct. 28, 2003, 19 p.
Chia, Office Action May 28, 2008, U.S. Appl. No. 10/719,114, filed Nov. 21, 2003, 10 p.
Chia, Final Office Action Dec. 2, 2008, U.S. Appl. No. 10/719,114, filed Nov. 21, 2003, 8 p.
Chia, Final Office Action May 4, 2009, U.S. Appl. No. 10/719,114, filed Nov. 21, 2003, 11 p.
Chia, Office Action Aug. 19, 2009, U.S. Appl. No. 10/719,114, filed Nov. 21, 2003, 8 p.
Chia, Final Office Action Mar. 17, 2010, U.S. Appl. No. 10/719,114, filed Nov. 21, 2003, 9 p.
Jacobi, Office Action Dec. 10, 2004 U.S. Appl. No. 10/697,458, filed Oct. 30, 2003, 16 p.
Jacobi, Final Office Action Jun. 14, 2005, U.S. Appl. No. 10/697,458, filed Oct. 30, 2003, 16 p.
Gustafson, Office Action Mar. 4, 2008, U.S. Appl. No. 10/761,735, filed Jan. 20, 2004, 25 p.
Gustafson, Office Action Sep. 8, 2008, U.S. Appl. No. 10/761,735, filed Jan. 20, 2004, 25 p.
Gustafson, Final Office Action Mar. 20, 2009, U.S. Appl. No. 10/761,735, filed Jan. 20, 2004, 27 p.
Rao, Office Action Sep. 25, 2008, U.S. Appl. No. 11/083,596, filed Mar. 18, 2005, 7 p.
Rao, Office Action Oct. 19, 2004, U.S. Appl. No. 10/765,817, filed Jan. 27, 2004, 8 p.
Rao, Office Action Feb. 4, 2008, U.S. Appl. No. 10/782083, filed Feb. 19, 2004, 21 p.

(56) References Cited

OTHER PUBLICATIONS

Rao, Final Office Action Jul. 15, 2008, U.S. Appl. No. 10/782,083, filed Feb. 19, 2004, 25 p.
Gustafson, Office Action Jul. 24, 2007, U.S. Appl. No. 10/790,340, filed Mar. 1, 2004, 21 p.
Gustafson, Office Action Jun. 12, 2008, U.S. Appl. No. 10/790,340, filed Mar. 1, 2004, 20 p.
Gustafson, Office Action Dec. 23, 2008, U.S. Appl. No. 10/790,340, filed Mar. 1, 2004, 21 p.
Gustafson, Final Office Action Jul. 6, 2009, U.S. Appl. No. 10/790,340, filed Mar. 1, 2004, 21 p.
Lilley, Final Office Action Jul. 25, 2007, U.S. Appl. No. 10/646,975, filed Aug. 22, 2003, 13 p.
Lilley, Office Action Oct. 31, 2007, U.S. Appl. No. 10/646,975, filed Aug. 22, 2003, 15 p.
Lilley, Final Office Action Apr. 16, 2008, U.S. Appl. No. 10/646,975, filed Aug. 22, 2003, 14 p.
Rao, Office Action Jun. 30, 2006, U.S. Appl. No. 10/797,176, filed Mar. 10, 2004, 15 p.
Rao, Final Office Action Jul. 17, 2007, U.S. Appl. No. 10/797,176, filed Mar. 10, 2004, 26 p.
Rao, Final Office Action Oct. 31, 2007, U.S. Appl. No. 10/797,176, filed Mar. 10, 2004, 29 p.
Rao, Office Action Apr. 14, 2008, U.S. Appl. No. 10/797,176, filed Mar. 10, 2004, 31p.
Rao, Office Action Oct. 16, 2008, U.S. Appl. No. 10/797,176, filed Mar. 10, 2004, 33 p.
Rao, Final Office Action Nov. 25, 2009, U.S. Appl. No. 10/797,176, filed Mar. 10, 2004, 41 p.
Rao, Final Office Action Aug. 19, 2010, U.S. Appl. No. 10/797,176, filed Mar. 10, 2004, 5 p.
Okkonnen, Office Action Feb. 28, 2005, U.S. Appl. No. 10/807,694, filed Mar. 24, 2004, 18 p.
Okkonnen, Final Office Action Aug. 10, 2005, U.S. Appl. No. 10/807,694, filed Mar. 24, 2004, 17 p.
Okkonen, Office Action Mar. 14, 2006, U.S. Appl. No. 10/807,694, filed Mar. 24, 2004, 21 p.
Okkonen, Office Action Oct. 24, 2006, U.S. Appl. No. 10/807,694, filed Mar. 24, 2004, 16 p.
Okkonen, Office Action Jul. 10, 2007, U.S. Appl. No. 10/807,694, Mar. 24, 2004, 19 p.
Okkonen, Final Office Action Dec. 18, 2007, U.S. Appl. No. 10/807,694, Mar. 24, 2004, 22 p.
Okkonen, Office Action May 12, 2008, U.S. Appl. No. 10/807,694, filed Mar. 24, 2004, 22 p.
Okkonen, Final Office Action Nov. 20, 2008, U.S. Appl. No. 10/807,694, filed Mar. 24, 2004, 22 p.
Okkonen, Office Action Jun. 25, 2009, U.S. Appl. No. 10/807,694, filed Mar. 24, 2004, 34 p.
Mcghee, Office Action Sep. 27, 2006, U.S. Appl. No. 10/797,825, filed Mar. 10, 2004, 7 p.
Mcghee, Final Office Action Jun. 25, 2007, U.S. Appl. No. 10/797,825, filed Mar. 10, 2004, 6 p.
Yang, Office Action Jan. 28, 2008, U.S. Appl. No. 10/802,191, filed Mar. 17, 2004, 18 p.
Yang, Final Office Action Jun. 6, 2008, U.S. Appl. No. 10/802,191, filed Mar. 17, 2004, 19 p.
Yang, Office Action Sep. 5, 2008, U.S. Appl. No. 10/802,191, filed Mar. 17, 2004, 16 p.
Qumei, Final Office Action Nov. 23, 2007, U.S. Appl. No. 10/813,212, filed Mar. 30, 2004, 11 p.
Yang, Office Action Sep. 21, 2006, U.S. Appl. No. 10/635,991, filed Aug. 7, 2003, 10 p.
Yang, Office Action Jun. 2, 2010, U.S. Appl. No. 12/014,549, filed Jan. 15, 2008, 8 p.
Yang, Final Office Action Sep. 16, 2010, U.S. Appl. No. 12/014,549, filed Jan. 15, 2008, 7 p.
Yang, Office Action Nov. 2, 2006, U.S. Appl. No. 10/887,490, filed Jul. 8, 2004, 12 p.
Yang, Final Office Action Apr. 17, 2007, U.S. Appl. No. 10/887,490, filed Jul. 8, 2004, 13 p.
Marolia, Final Office Action Jan. 30, 23, 2008, U.S. Appl. No. 10/852,396, filed May 24, 2004, 17 p.
Marolia, Office Action May 28, 2008, U.S. Appl. No. 10/852,396, filed May 24, 2004, 20 p.
Marolia, Office Action Dec. 8, 2008, U.S. Appl. No. 10/852,396, filed May 24, 2004, 19 p.
Marolia, Final Office Action Jun. 17, 2009, U.S. Appl. No. 10/852,396, filed May 24, 2004, 24 p.
Marolia, Office Action Dec. 14, 2009, U.S. Appl. No. 10/852396, filed May 24, 2004, 19 p.
Marolia, Office Action Jun. 3, 2005, U.S. Appl. No. 10/888841, filed Jul. 9, 2004, 8 p.
Marolia, Final Office Action Dec. 6, 2005, U.S. Appl. No. 10/888,841, filed Jul. 9, 2004, 10 p.
Marolia, Office Action May 4, 2006, U.S. Appl. No. 10/888,841, filed Jul. 9, 2004, 13 p.
Marolia, Final Office Action Jan. 12, 2007, U.S. Appl. No. 10/888,841, filed Jul. 9, 2004, 15 p.
Marolia, Office Action Jun. 18, 2007, U.S. Appl. No. 10/888,841, filed Jul. 9, 2004, 16 p.
Marolia, Final Office Action Nov. 27, 2007, U.S. Appl. No. 10/888,841, filed Jul. 9, 2004, 17 p.
Marolia, Office Action Apr. 28, 2009, U.S. Appl. No. 10/888,841, filed Jul. 9, 2004, 15 p.
Qumei, Office Action Apr. 21, 2008, U.S. Appl. No. 10/864,095, filed Jun. 9, 2004, 15 p.
Marolia, Office Action Dec. 11, 2007, U.S. Appl. No. 10/879,869, filed Jun. 28, 2004, 10 p.
Marolia, Final Office Action May 30, 2008, U.S. Appl. No. 10/879,869, filed Jun. 28, 2004, 15 p.
Marolia, Office Action Aug. 18, 2008, U.S. Appl. No. 10/879,869, filed Jun. 28, 2004, 17 p.
Marolia, Final Office Action Jan. 28, 2009, U.S. Appl. No. 10/879,869, filed Jun. 28, 2004, 18 p.
Rao, Office Action Jul. 25, 2007, U.S. Appl. No. 10/860,964, filed Jun. 4, 2004, 22 p.
Rao, Final Office Action Jan. 7, 2008, U.S. Appl. No. 10/860,964, filed Jun. 4, 2004, 26 p.
Rao, Office Action Apr. 30, 2008, U.S. Appl. No. 10/860,964, filed Jun. 4, 2004, 23 p.
Rao, Final Office Action Oct. 28, 2008, U.S. Appl. No. 10/860,964, filed Jun. 4, 2004, 29 p.
Yang, Office Action Jun. 27, 2007, U.S. Appl. No. 10/860,978, filed Jun. 4, 2004, 14 p.
Yang, Final Office Action Dec. 7, 2007, U.S. Appl. No. 10/860,978, filed Jun. 4, 2004, 16 p.
Yang, Office Action Jun. 20, 2008, U.S. Appl. No. 10/860,978, filed Jun. 4, 2004, 13 p.
Yang, Office Action Dec. 23, 2008, U.S. Appl. No. 10/860,978, filed Jun. 4, 2004, 13 p.
Yang, Final Office Action Jun. 19, 2009, U.S. Appl. No. 10/860,978, filed Jun. 4, 2004, 16 p.
Rao, Office Action Aug. 24, 2007, U.S. Appl. No. 10/868,050, filed Jun. 15, 2004, 15 p.
Rao, Office Action Feb. 7, 2008, U.S. Appl. No. 10/868,050, filed Jun. 15, 2004, 16 p.
Rao, Final Office Action Aug. 6, 2008, U.S. Appl. No. 10/868,050, filed Jun. 15, 2004, 18 p.
Rao, Office Action Apr. 15, 2008, U.S. Appl. No. 10/899,513, filed Jul. 26, 2004, 14 p.
Rao, Final Office Action Oct. 24, 2008, U.S. Appl. No. 10/899,513, filed Jul. 26, 2004, 16 p.
Rao, Office Action Jun. 11, 2007, U.S. Appl. No. 10/902,452, filed Jul. 29, 2004, 13 p.
Rao, Final Office Action Dec. 20, 2007, U.S. Appl. No. 10/902,452, filed Jul. 29, 2004, 10 p.
Rao, Final Office Action Jun. 23, 2008, U.S. Appl. No. 10/902,425, filed Jul. 29, 2004, 14 p.
Rao, Office Action Jan. 5, 2009, U.S. Appl. No. 10/902,452, filed Jul. 29, 2004, 16 p.

(56) References Cited

OTHER PUBLICATIONS

Rao, Final Office Action Jul. 20, 2009, U.S. Appl. No. 10/902,452, filed Jul. 29, 2004, 16 p.
Rao, Office Action May 13, 2010, U.S. Appl. No. 10/902,452, filed Jul. 29, 2004, 16 p.
Qumei, Office Action Jul. 12 2007, U.S. Appl. No. 10/909,519, filed Aug. 2, 2004, 17 p.
Qumei, Final Office Action Dec. 20, 2007, U.S. Appl. No. 10/909,519, filed Aug. 2, 2004, 11 p.
Qumei, Office Action May 29, 2008, U.S. Appl. No. 10/909,519, filed Aug. 2, 2004, 21 p.
Qumei, Final Office Action Aug. 17, 2008, U.S. Appl. No. 10/909,519, filed Aug. 2, 2004, 24 p.
Qumei, Office Action Aug. 28, 2009, U.S. Appl. No. 10/909,519, filed Aug. 2, 2004, 23 p.
Chen, Office Action May 14, 2008, U.S. Appl. No. 10/932,175, filed Sep. 1, 2004, 18 p.
Chen, Final Office Action Feb. 6, 2009, U.S. Appl. No. 10/932,175, filed Sep. 1, 2004, 15 p.
Chen, Office Action Mar. 1, 2010, U.S. Appl. No. 10/932,175, filed Sep. 1, 2004, 16 p.
Chen, Final Office Action Sep. 21, 2010, U.S. Appl. No. 10/932,175, filed Sep. 1, 2004, 17 p.
Okkonen, Office Action Jan. 5, 2007, U.S. Appl. No. 10/945,466, filed Sep. 20, 2004, 5 p.
Okkonen, Office Action Aug. 10, 2007, U.S. Appl. No. 10/945,466, filed Sep. 20, 2004, 5 p.
Okkonen, Final Office Action Jan. 9, 2008, U.S. Appl. No. 10/945,466, filed Sep. 20, 2004, 7 p.
Okkonen, Office Action May 12, 2008, U.S. Appl. No. 10/945,466, filed Sep. 20, 2004, 6 p.
Okkonen, Office Action Nov. 12, 2008, U.S. Appl. No. 10/945,466, filed Sep. 20, 2004, 5 p.
Okkonen, Office Action Apr. 14, 2009, U.S. Appl. No. 10/945,466, filed Sep. 20, 2004, 5 p.
Rao, Office Action Aug. 27, 2007, U.S. Appl. No. 10/950,764, filed Sep. 27, 2004, 14 p.
Rao, Final Office Action Mar. 4, 2008, U.S. Appl. No. 10/950,746, filed Sep. 27, 2004, 17 p.
Rao, Office Action Nov. 3, 2008, U.S. Appl. No. 10/950,764, filed Sep. 27, 2004, 12 p.
Rao, Final Office Action Jun. 30, 2009, U.S. Appl. No. 10/950,764, filed Sep. 27, 2004, 15 p.
Chen, Office Action Jan. 29, 2008, U.S. Appl. No. 10/958,148, filed Oct. 4, 2004, 16 p.
Chen, Final Office Action Aug. 20, 2008, U.S. Appl. No. 10/958,148, filed Oct. 4, 2004, 19 p.
Chen, Office Action Apr. 14, 2009, U.S. Appl. No. 10/958,148, filed Oct. 4, 2004, 11 p.
Chen, Final Office Action Nov. 25, 2009, U.S. Appl. No. 10/958,148, filed Oct. 4, 2004, 12 p.
Chen, Office Action Apr. 1, 2010, U.S. Appl. No. 10/958,148, filed Oct. 4, 2004, 13 p.
Gustafson, Office Action Sep. 11, 2007, U.S. Appl. No. 11/010,913, filed Dec. 13, 2004, 27 p.
Gustafson, Office Action Feb. 1, 2008, U.S. Appl. No. 11/010,913, filed Dec. 13, 2004, 29 p.
Gustafson, Final Office Action Feb. 18, 2010, U.S. Appl. No. 11/010,913, filed Dec. 13, 2004, 31 p.
Ren, Office Action Jan. 22, 2008, U.S. Appl. No. 10/989,628, filed Nov. 16, 2004, 8 p.
Ren, Office Action Aug. 18, 2008, U.S. Appl. No. 10/989,628, filed Nov. 16, 2004, 7 p.
Ren, Final Office Action Nov. 24, 2009, U.S. Appl. No. 10/989,628, filed Nov. 16, 2004, 9 p.
Slyz, Office Action Mar. 1, 2010, U.S. Appl. No. 11/874,102, filed Oct. 17, 2007, 13 p.
Qumei, Office Action Apr. 9, 2007, U.S. Appl. No. 10/698,665, filed Oct. 30, 2003, 22 p.
Qumei, Office Action Jul. 29, 2010, U.S. Appl. No. 11/852,933, filed Sep. 10, 2007, 14 p.
Qumei, Final Office Action Feb. 17, 2011, U.S. Appl. No. 11/852,933, filed Sep. 10, 2007, 19 p.
Chen, Office Action Apr. 19, 2007, U.S. Appl. No. 10/903,394, filed Jul. 30, 2004, 31 p.
Chen, Final Office Action Oct. 18, 2007, U.S. Appl. No. 10/903,394, filed Jul. 30, 2004, 34 p.
Chen, Office Action May 13, 2008, U.S. Appl. No. 10/903,394, filed Jul. 30, 2004, 14 p.
Chen, Office Action Nov. 26, 2008, U.S. Appl. No. 10/903,394, filed Jul. 30, 2004, 14 p.
Chen, Final Office Action Apr. 21, 2009, U.S. Appl. No. 10/903,394, filed Jul. 30, 2004, 21 p.
Chen, Office Action Oct. 30, 2009, U.S. Appl. No. 10/903,394, filed Jul. 30, 2004, 19 p.
Chen, Final Office Action Apr. 29, 2010, U.S. Appl. No. 10/903,394, filed Jul. 30, 2004, 24 p.
Rao, Office Action Feb. 4, 2008, U.S. Appl. No. 11/047,212, filed Jan. 31, 2005, 9 p.
Rao, Final Office Action Sep. 3, 2008, U.S. Appl. No. 11/047,212, filed Jan. 31, 2005, 8 p.
Rao, Office Action Feb. 2, 2009, U.S. Appl. No. 11/047,212, filed Jan. 31, 2005, 8 p.
Rao, Final Office Action Sep. 25, 2009, U.S. Appl. No. 11/047,212, filed Jan. 31, 2005, 9 p.
Rao, Office Action Jan. 22, 2010, U.S. Appl. No. 11/047,212, filed Jan. 31, 2005, 9 p.
Rao, Final Office Action Jun. 10, 2010, U.S. Appl. No. 11/047,212, filed Jan. 31, 2005, 11 p.
Rao, Office Action Jan. 14, 2011, U.S. Appl. No. 11/047,212, filed Jan. 31, 2005, 9 p.
Kokkinen, Office Action Feb. 23, 2007, U.S. Appl. No. 10/688,640, filed Oct. 17, 2003, 23 p.
Kokkinen, Office Action Aug. 21, 2007, U.S. Appl. No. 10/688,640, filed Oct. 17, 2003, 23 p.
Kokkinen, Office Action Jul. 18, 2008, U.S. Appl. No. 10/688,640, filed Oct. 17, 2003, 28 p.
Kokkinen, Office Action Dec. 30, 2008, U.S. Appl. No. 10/688,640, filed Oct. 17, 2003, 29 p.
Kokkinen, Office Action Jul. 21, 2009, U.S. Appl. No. 10/688,640, filed Oct. 17, 2003, 30 p.
Kokkinen, Office Action Feb. 24, 2010, U.S. Appl. No. 10/688,640, filed Oct. 17, 2003, 33 p.
Kokkinen, Office Action Aug. 6, 2010, U.S. Appl. No. 10/688,640, filed Oct. 17, 2003, 26 p.
Okkonen, Office Action Apr. 19, 2007, U.S. Appl. No. 10/788,768, filed Feb. 27, 2004, 14 p.
Okkonen, Final Office Action Oct. 2, 2007, U.S. Appl. No. 10/788,768, filed Feb. 27, 2004, 18 p.
Okkonen, Office Action Mar. 20, 2008, U.S. Appl. No. 10/788,768, filed Feb. 27, 2004, 16 p.
Okkonen, Office Action Oct. 2, 2008, U.S. Appl. No. 10/788,768, filed Feb. 27, 2004, 17 p.
Okkonen, Final Office Action Apr. 14, 2009, U.S. Appl. No. 10/788,768, filed Feb. 27, 2004, 18 p.
Qumei, Final Office Action Sep. 7, 2007, U.S. Appl. No. 10/770,983, filed Feb. 3, 2004, 15 p.
Qumei, Office Action Jan. 25, 2008, U.S. Appl. No. 10/770,983, filed Feb. 3, 2004, 18 p.
Qumei, Office Action Jul. 3, 2008, U.S. Appl. No. 10/770,983, filed Feb. 3, 2004, 22 p.
Qumei, Office Action Dec. 19, 2008, U.S. Appl. No. 10/770,983, filed Feb. 3, 2004, 19 p.
Qumei, Final Office Action Jun. 11, 2009, U.S. Appl. No. 10/770,983, filed Feb. 3, 2004, 21 p.
Hamasaki, Office Action Jan. 9, 2008, U.S. Appl. No. 10/748,053, filed Dec. 30 2003, 18 p.
Hamasaki, Final Office Action Aug. 20, 2008, U.S. Appl. No. 10/748,053, filed Dec. 30, 2003, 21 p.
Hamasaki, Office Action Feb. 27, 2009, U.S. Appl. No. 10/748,053, filed Dec. 30, 2003, 19 p.

(56) References Cited

OTHER PUBLICATIONS

Hamasaki, Final Office Action Sep. 11, 2009, U.S. Appl. No. 10/748,053, filed Dec. 30, 2003, 19 p.
Hamasaki, Final Office Action May 17, 2010, U.S. Appl. No. 10/748,053, filed Dec. 30, 2003, 21 p.
Rao, Office Action Feb. 6, 2009, U.S. Appl. No. 10/754,378, filed Jan. 9, 2004, 14 p.
Rao, Final Office Action Jul. 13, 2009, U.S. Appl. No. 10/754,378, filed Jan. 9, 2004, 25 p.
Rao, Office Action May 17, 2010, U.S. Appl. No. 10/754,378, filed Jan. 9, 2004, 43 p.
Marolia, Office Action Oct. 17, 2006, U.S. Appl. No. 10/754,313, filed Jan. 9, 2004, 16 p.
Marolia, Office Action Feb. 20, 2008, U.S. Appl. No. 10/754,313, filed Jan. 9, 2004, 11 p.
Gustafson, Office Action Jan. 4, 2007, U.S. Appl. No. 10/756,103, filed Jan. 13, 2004, 10 p.
Gustafson, Office Action Aug. 10, 2007, U.S. Appl. No. 10/756,103, filed Jan. 13, 2004, 11 p.
Gustafson, Office Action Jan. 22, 2008, U.S. Appl. No. 10/756,103, filed Jan. 13, 2004, 11 p.
Gustafson, Office Action Jul. 8, 2009, U.S. Appl. No. 10/756,103, filed Jan. 13, 2004, 21 p.
Gustafson, Final Office Action Dec. 18, 2009, U.S. Appl. No. 10/756,103, filed Jan. 13, 2004, 22 p.
Chen, Office Action Jul. 23, 2007, U.S. Appl. No. 10/646,230, filed Aug. 22, 2003, 14 p.
Chen, Final Office Action Dec. 28, 2007, U.S. Appl. No. 10/646,230, filed Aug. 22, 2003, 14 p.
Chen, Office Action Dec. 23, 2008, U.S. Appl. No. 10/646,230, filed Aug. 22, 2003, 25 p.
Chen, Final Office Action May 27, 2009, U.S. Appl. No. 10/646,230, filed Aug. 22, 2003, 28 p.
Chen, Office Action Dec. 2, 2009, U.S. Appl. No. 10/646,230, filed Aug. 22, 2003, 15 p.
Chen, Office Action May 27, 2010, U.S. Appl. No. 10/646,230, filed Aug. 22, 2003, 17 p.
Chen, Final Office Action Nov. 10, 2010, U.S. Appl. No. 10/646,230, filed Aug. 22, 2003, 17 p.
Chen, Office Action Aug. 23, 2011, U.S. Appl. No. 10/646,230, filed Aug. 22, 2003, 6 p.
Marolia, Office Action Aug. 17, 2007, U.S. Appl. No. 10/852,396, filed May 24, 2004, 17 p.
Qumei, Office Action Jun. 20, 2007, U.S. Appl. No. 10/813,212, filed Mar. 30, 2004, 10 p.
Chen, Office Action Jun. 12, 2008, U.S. Appl. No. 10/646,230, filed Aug. 22, 2003, 14 p.
Chen, Office Action Dec. 7, 2005, U.S. Appl. No. 10/411,784, filed Apr. 11, 2003, 15 p.
Chen, Final Office Action Nov. 6, 2007, U.S. Appl. No. 11/125,974, filed May 9, 2005, 10 p.
Gustafson, Office Action Jan. 22, 2009, U.S. Appl. No. 10/756,103, filed Jan. 13, 2004, 15.p.
Qumei, Office Action, Apr. 13, 2007, U.S. Appl. No. 10/770,983, filed Feb. 3, 2004, 11 .p.
Muller, N. J., "Focus on OpenView a guide to Hewlett—Packard's Network and Systems Management Platform," pp. 1-291, CBM Books, published 1995.
Ilog, "Ilog Jrules—Complete business rule management," [Online] <http://www.ilog.com/products/jrules/datasheet> (May 2003).
Verbauwhede et al., "Low power DSP's for wireless communications (embedded tutorial session)", Aug. 2000, pp. 303-310. [Online] 21 http://delivery.acm.org/10.1145/350000/34464 7/p303-verbauwhede. pdf>.
"Over the Air User Initiated Provisioning Recommended Practice for the Mobile Information Device Profile", Version 1.0, May 7, 2001.
Oma, "SyncML Device Management Tree and Description, Version 1.1.2," Dec. 2, 2003, pp. 1-44.
Lucent Technologies, "Wireless Intelligent Network Over-the-Air Service Provisioning," Technical Brochure, [Online] <http://www.lucent.com/livelink/146175-Brochure.pdf>, 1997.
3GPP2 C:R1001-A 2.0: Administration of Parameter Value Assignments for cdma2000 Spread Spectrum Standards, Release A: Jul. 14, 2000.
Albright, Brian, "Managing the force: Planning makes the difference," Frontline Solutions, Jan. 2001, retrieved from scholar.google.com search Jun. 15, 2006.
Bailey, E. C., "Maximum RPM: Taking the Red Hat Package Manager to the Limit," Copyright 2000 by Red Hat, Inc., 14 p.
Baker et al., "Compressing Differences of Executable Code," Apr. 22, 1999.
Bokun et al. (Active Badges—The Next Generation, Linux Journa, Oct. 1998, Issue 54).
Brown, Michael et al., PGP in Constrined Wireless Devices, 1-23, 9th USENIX Security Symposium Paper 2000, retrieved Apr. 16, 2007.
Burns et al., "In-Place Reconstruction of Delta Compressed Files," Univ of California, Santa Cruz, darrel1@cs.scsc.edu; 12 pgs.
Ortiz, C. Enrique, "Introduction to OTA Application Provisioning," Nov. 2002, [Online] http://developers.sun.com/techtopics/mobility/midparticles/ota/ retrieved on Mar. 29, 2007.
Microsoft, "Computer Dictionary," Microsoft Press Third Edition, pp. 88, 190, 1997.
Deitel & Deitel, "C How to Program," 1994, Prentice-Hall, Inc., Second Edition, Chapter 5.
Digital Cellular Telecomminications System (Phase 2+) At Command Set for GSM Mobile Equipment (ME) (GSM 07.07 version 7.4.0 Release 1998), ETSI TS 100 916 V7.4.0 (Nov. 1999), 126 p.
Engstrom, Don, "Two Clicks to a Rejuvenated Mac: A Review of UpdateAgent—CD Edition," Feb. 20, 2002, pp. 1-3.
Eppstein, D., "Fast Hierarchical Clustering and Other Applications of Dynamic Closest Pairs," Jan. 31, 2001, pp. 1-10. [Online] http://www.ics.uci.edu/-eppstein/projects/pairs/Papers/ Epp-SODA-98.pdf>.
Euroloader, "Technical Specification" Dec. 2001, ECCA Euroloader Specificaion, pp. 1-60.
Fowler et al., "Lossless Compression of Volumne Data," 1995, IEEE, pp. 43-50.
Funambol Inc., "Funambol DM Server Developer's Guide Version 3.0," Sep. 2006.
Guanluca, Moro, "On the Event Coordination in Multi-Component Systems," published 2002, pp. 315-322.
Hicks et al., Dynamic Software Updating, Jun. 2001. [Online] <citeseer.ist.psu.edu/336947.html>.
IEEE Lan Man Standards Committee, "Draft Amendment to IEEE Standard for Local and Metropolitan Area Networks; Part 16: Air Interface for Fixed and Mobile Broadband Wireless Access Systems—Amendment to IEE Standards for Local and Metoropolitian Area Networks—Management Plane Procedures and Services," IEEE Draft Standards, No. 802. 16g-04/03, Dec. 2004, pp. 1-8, XP002469853.
Jansen et al., "Approx 2000, LNCS 1913," pp. 84-95, 2000, Springer-Verlag, Berlin Heidelberg 2000.
Luculli, Gabriele, "Efficient and Effective Simulation of Memory Maps for System-on-Chip," 11th IEEE Int'l. Conference and Workshop on the Engineering of Computer Baseed Systems, May 24-27, 2004, pp. 242-247.
Open Mobile Alliance, "Firmware Update Management Object," 2006.
Open Mobile Alliance, "OMA Device Management Security," Jul. 2005, Candidate Version 1.2.
Open Mobile Alliance, "SyncML Device Management Bootstrap," 2003.
Open Mobile Alliance, "Firmware Update Management Object," OMA-DM-V0_14-20040ct28-D.
Open Mobile Alliance, "OMA Device Management Tree and Description_ver 1.2," Jun. 15, 2005 (OMA-TS-DM-TND-V1_2-20050615-C).
Paila et al. "FLUTE—File Delivery Over Unidirectional Transport," Network Working Group Request for Comments; 3926 Category; Experimental; Oct. 2004.

(56) References Cited

OTHER PUBLICATIONS

"Part 16: Air Interface for Fixed Broadband Wireless Access Systems," Sep. 22, 2005, pp. 1-257, XP007904329.
"Problem Tracking Task Reference," Continuus Software Corporation, Whole Manual, Part No. PTTR-041-011, 1996.
Riel, "Object-Oriented Design Heuristics," Apr. 30, 1996, Addison-Wesley Professional, Section 10.1.
Rodriguez et al., "TCP/IP Tutorial and Technical Overview," Copyright 2002, pp. 489-490.
Shapira et al., "In Place Differential File Compression," The Author 2005; Published by Oxford University Press on behalf of the British Computer Society; Advance Access published on Aug 26, 2005; 15 p.
Starlin, Mark, UpdateAgent 8, Nov. 19, 2002, pp. 1-2.
Symbian, "Symbian OS powered Sony Ericsson P800 Smartphone to ship in Q32003" Mar. 2002 pp. 1-2.
Tansley, "Linux and Unix Shell Programming," Dec. 27, 1999, Addison-Wesley Professional, 2 p.
The Mac Observer, Update Agent Scouts Out an Update for Itself, May 9, 2000, pp. 1-3.
TIA/EIA/IS-683-A: Over-the-Air Service Provisioning of Mobile Stations in Spread Spectrum Systems: May 1998.
Veeraraghavan et al., "A distributed control strategy for wireless ATM networks," pp. 323.339, Wireless Networks 1995, retrieved from ACM database search Jun. 15, 2006.
Yang et al., "Reuse Linux Device Drivers in Embedded Systems," 1998 International Computer Symposium Workshop on Software Engineering and Database Systems Dec. 17-19, 1998.
Yau et al., "An approach to distributed component-based real-time application software development," 1998, pp. 275-283.
Douglas B. Terry et al., "Managing Update Conflicts in Bayou, a Weakly Connected Replicated Storage System," Proceedings of the 15th ACM Symposium on Operating Systems Principles, 1995, pp. 172-182, Available at: <dl.acm.org/citation.cfm?id=224070>.
Hewlett-Packard Development Company, L.P., Office Action, European Application No. 04754355.8, Date: Jul. 5, 2013, pp. 1-11.
Hewlett-Packard Development Company, L.P., Office Action, European Application No. 04782849.6, Date: Jul. 3, 2013, pp. 1-5.
Jonathan P. Munson and Prasun Dewan, "Sync: A Java Framework for Mobile Collaborative Applications," IEEE, Jun. 1997, pp. 59-66, Available at: <ieeexplore.ieee.org/stamp/stamp.jsp? tp=&arnumber=587549>.
Teck Chia et al., U.S. Appl. No. 10/943,455, Notice of Allowance, Date Mailed: May 2013, pp. 1-69.
Tim Farnham et 3., "IST-TRUST: A Perspective on the Reconfiguration of Future Mobile—Terminals using Software Download," The 11th IEEE International Symposium on Personal, Indoor and Mobile Radio Communications, 2000, pp. 1054-1059, Available at: <ieeexplore.ieee.org/stamp/stamp.jsp?tp=&arnumber=881582>.
"International Search Report/Written Opinion" for PCT Application No. PCT/US20071070534, dated Feb. 7, 2008, 8 pages.
"International Search Report/Written Opinion" for PCT Application PCT/US2007/070534, dated Apr. 10, 2008, 17 pages.
Patrick O'Neill, Non-Final Office Action, U.S. Appl. No. 12/636,600, Notification Date: Sep. 20, 2013, pp. 1-8.

\* cited by examiner

| Identifier: '3F00 / 2F46' | Structure: transparent | Optional |
|---|---|---|
| File Size: 17 bytes | Update activity: low | |
| Access Conditions:<br>    READ                    CHV1<br>    UPDATE              ADM<br>    INVALIDATE      ADM<br>    REHABILITATE    ADM | | |

| Bytes | Description | M/O | Length |
|---|---|---|---|
| 1 | FOTA Condition | M | 1 byte |
| 2 to 17 | RFU | M | 16 bytes |

Byte 1, FOTA condition:

| Update Package | OPERATOR - SIM | | |
| --- | --- | --- | --- |
| | Update Allowed | | Update Not Allowed |
| | Secured | Not secured | |
| OPERATOR – Secured | Ok | No | No |
| OPERATOR – Not Secured | No | No | No |
| Other – Secured | No | No | No |

User ID: Jane Harvey
User's Job Name: Moto-300-update-7
IMEI: 353388000433719
MSISDN: 19492250032
Accept Device: Accept only the expected IMEI 2004.09.27 02:34.045 Task 2256 started FOTA
2004.09.27 02:34.875 Notification sent
2004.09.27 02:42.332 Notification delivered
2004.09.27 02:43.563 OMA DM PKG#1 received
2004.09.27 02:44.246 Device MMV = Motorola V300 Version 2.3
2004.09.27 02:44.856 FW selected = Version 4.2, URL http://DLSrvr2.TMO.com
2004.09.27 02:45.725 OMA DM session ended OK
2004.09.27 02:46.052 OMA DL session started
2004.09.27 02:47.045 OMA DL session ended OK
2004.09.27 03:50.834 Task 2256 completed FOTA

DEVICE MANAGEMENT IN A NETWORK

This application is a divisional of U.S. application Ser. No. 11/810,575, filed Jun. 6, 2007, entitled "Device Management in a Network," now U.S. Pat. No. 8,209,676, which application claims priority to U.S. Provisional Application No. 60/812,376, entitled "Device Management in a Network," filed Jun. 8, 2006. The specification of U.S. application Ser. No. 11/810,575 is incorporated herein by reference. The present application makes reference to U.S. Provisional Application Ser. No. 60/812,376 entitled "DEVICE MANAGEMENT IN A NETWORK" filed Jun. 8, 2006, the complete subject matter of which is hereby incorporated herein by reference, in its entirety.

In addition, the present application makes reference to U.S. Provisional Patent Application Ser. No. 60/688,508. entitled "CUSTOMER CARE NETWORK WITH AUTOMATIC CALLBACK TO SUBSCRIBER", filed Jun. 7, 2005, U.S. Provisional Patent Application Ser. No. 60/249,606, entitled "System and Method for Updating and Distributing Information," filed Nov. 17, 2000, and International Patent Application Publication No. WO 02/41147 A1, entitled "System And Method For Updating And Distributing Information", filed Nov. 19, 2001, and having publication date Mar. 23, 2002, the complete subject matter of each of which is hereby incorporated herein by reference, in its entirety.

BACKGROUND OF THE INVENTION

Non-volatile memory is employed in a wide variety of electronic devices such as, for example, mobile handsets, cellular phones, personal digital assistants (PDA's), pagers and handheld personal computers. The non-volatile memory in these devices contains firmware, application software, data, and configuration information that makes the devices operational, and may be provided by the manufacturers of the electronic devices, by system operators of telecommunication carrier networks, or by third parties developers. If defects are found in such firmware/software, or if new features are to be added to such devices, the software and/or firmware in the affected electronic devices may need to be updated. Errors and/or interruptions that may occur during the updating of such operational code may leave the electronic device in a partly or completely non-functional state. To avoid this problem, present methods of updating such software and/or firmware involve returning the electronic device to the manufacturer, to the system operator, or to the third party, so that an update of memory contents may be performed using a direct connection to the electronic device. This is both costly and inconvenient to both the user of the electronic device, and to one performing the update.

Configuration parameters and other information for an electronic device may be stored in the non-volatile memory of such devices, and information about the device capabilities, the hardware, software and manufacturer of the device, and particulars for a given instance of the device in a network may be stored in databases used by, for example, device management and customer service operations. Such databases may be accessible to device management and customer service operations through database access mechanisms using, for example, structured query language (SQL) or similar database management tools.

Updates to firmware and/or software in an electronic device may be developed by a number of parties including, for example, the manufacturer of the electronic device, the provider of services of a communication network accessed by the electronic device, or a third party. While the manufacturer and/or third party may be technically qualified and capable of creating workable updates for the firmware and/or software in an electronic device, such updated firmware and/or software may not be planned for or compatible with the services and communication capabilities of the communication network of the service provider. Although the user of the electronic device may have authorization to use the network, an update to the firmware/software of the electronic device may not be authorized for use in electronic device served by the communication network of the service provider.

In some circumstances, updates to software/firmware of an electronic device that are approved for distribution may be intended only for use by a subset of those electronic device users. For example, new applications or software and/or firmware updates may provide electronic device capabilities that are intended for use by specific groups of users. Some updates may not yet be fully tested, and there may be a desire to make such updates available to users that have been selected to be testers of an early release of an application or firmware/software update. In other circumstances, such a subset of users may have a common need for an application or update of firmware/software, and distribution to such a subset may be desirable. Limiting the distribution of such updates to a selected group may be necessary and/or prudent, if such updates may cause problems for the users of the affected electronic devices.

Further limitations and disadvantages of conventional and traditional approaches will become apparent to one of skill in the art, through comparison of such systems with a representative embodiment of the present invention as set forth in the remainder of the present application with reference to the drawings.

BRIEF DESCRIPTION OF SEVERAL VIEWS OF THE DRAWINGS

FIG. 8 shows a table illustrating exemplary scenarios regarding the control of the update process for an electronic device that may correspond to, for example, the electronic device of FIG. 1, for an update package secured by System Operator A and those not secured by System Operator A, used with a SIM issued by System Operator A, in accordance with a representative embodiment of the present invention.

FIG. 10 illustrates a exemplary job details screen that may be employed by a user of an update server during management of updates to multiple electronic devices that may correspond to, for example, the electronic device of FIG. 1, in accordance with a representative embodiment of the present invention.

FIG. 11 illustrates an exemplary event level details screen, in accordance with a representative embodiment of the present invention.

DETAILED DESCRIPTION OF THE INVENTION

Figure 1:
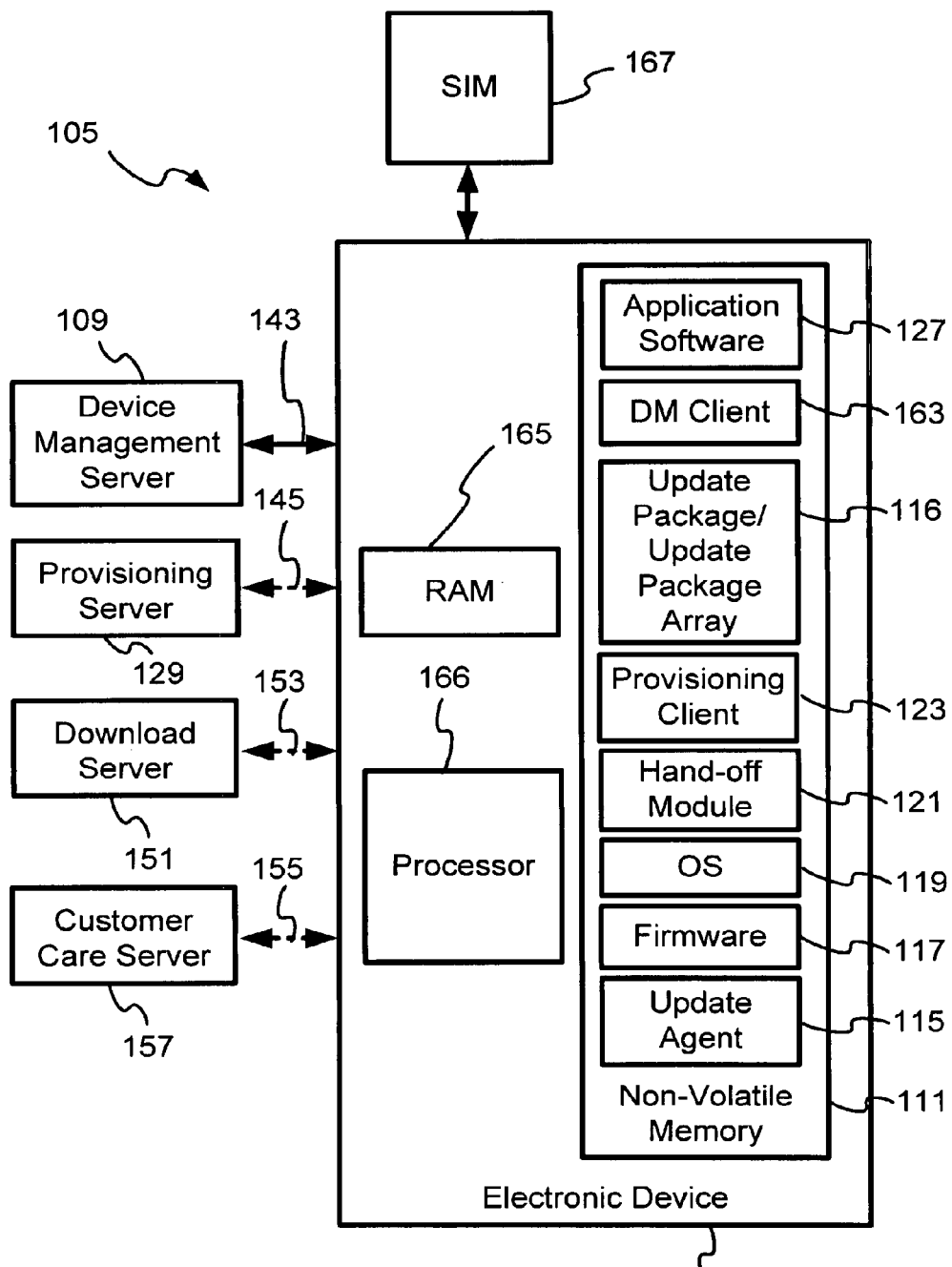
FIG. 1 is a perspective block diagram of an exemplary network that supports remote update of non-volatile memory of an electronic device such as, for example, a mobile handset or personal digital assistant, in accordance with a representative embodiment of the present invention.

Aspects of the present invention relate generally to the updating of memory in electronic devices, and more specifically, to methods and systems supporting device management and processing of updates for firmware, software, configuration parameters and file systems in memory of an electronic device such as, for example, non-volatile FLASH-type memory. While the following discussion focuses primarily on mobile electronic devices such as, for example, a mobile handset, a cellular phone, a personal digital assistant, a pager, and a handheld personal computer, this is by way of example and not by way of specific limitations of the present invention. The teaching contained herein may also be applicable to a variety of other electronic devices having a processor and memory containing software, firmware, configuration information, data files, and the like, for which updating of memory contents may be desirable.

Representative embodiments of the present invention may be employed during updates using wired or wireless communication links such as, for example, a public switched telephone network, a wired local or wide area network, an intranet, the Internet, and wireless cellular, paging, local area, personal area, and short range networks such as those referred to as WiFi, IEEE 802.11a/b/g/n compatible networks, the short range wireless technology known as Bluetooth, and similar types of communication links.

In a representative embodiment of the present invention, information for updating memory in an electronic device such as those described above is communicated using, for example, an update package comprising a set of instructions executable by firmware and/or software in the electronic device to transform or convert an existing version of software, firmware, and/or data in the electronic device into a new or updated version of the software, firmware, and/or data. Such an update package may also contain metadata related to the update.

The following definitions, acronyms and abbreviations are use in this document:

| | |
|---|---|
| API | Application Programming Interface |
| CSR | Customer Service Representative |
| DA | Delivery Agent |
| DAO | Data Access Objects |
| DM | Device Management |
| DM Tree | Device management tree |
| EJB | Enterprise Java Beans |
| IMEI | International Mobile Equipment Identity |
| JDBC | Java Database Connectivity |
| JDO | Java Data Objects |
| JNDI | Java Naming and Directory Interface |
| MMV | Refers to a combination of values that define a device make, model and (firmware) version |
| MO | Management Object |
| MOI | Management Object Identifier |
| MSISDN | Mobile Station Integrated Services Digital Network |
| NVM | Non-Volatile Memory |
| OMA | Open Mobile Alliance |
| RAM | Random Access Memory |
| RMI | Remote Method Invocation |
| SMS | Short Message Service |
| SMSC | Short Message Service Center |
| UI | User Interface |
| URI | Universal Resource Identifier |
| URL | Universal Resource Locator |
| WDP | Wireless Datagram Protocol |
| WSP | Wireless Session Protocol |
| XML | Extensible Markup Language |

FIG. 1 is a perspective block diagram of an exemplary network 105 that supports remote update of non-volatile memory of an electronic device 107 such as, for example, a mobile handset or personal digital assistant, in accordance with a representative embodiment of the present invention. The electronic device 107 may, for example, comprise a cellular phone, a personal digital assistant (PDA), a pager, a handheld personal computer (PC), and/or the like. The electronic device 107 may support a number of features and/or applications that may contain software/firmware errors that need to be corrected, or that may provide additional features/benefits by updating the software/firmware. The electronic device 107 may itself be used to request updates to software/firmware via a customer care server 157 either directly, using a browser in the electronic device 107, or via a customer service representative (CSR). A CSR may, for example, provide service to the customer using the electronic device 107 by retrieving, as necessary, one or more diagnostic management objects (MOs) stored in memory of the electronic device 107, and by transmitting to the electronic device 107 from a remote server, update information in the form of, for example, one or more update packages. Such update packages may, for example, comprise instructions to code in the electronic device 107 to convert or transform a first version of software/firmware to a second version of software/firmware, in the electronic device 107, in addition to metadata, and checksum information.

As shown in the illustration of FIG. 1, the network 105 in one representative embodiment of the present invention comprises the electronic device 107, a device management (DM) server 109, a provisioning server 129, a customer care server 157, and a download server 151. Although not illustrated in FIG. 1, a representative embodiment of the present invention may also comprise other application servers such as, for example, a diagnostics server, and a self-care website/portal. The electronic device 107 of FIG. 1 is able to communicate with the DM server 109, the download server 151, the customer care server 157, and the provisioning server 129 via communication paths 143, 153, 155 and 145, respectively.

Although the communication paths 143, 153, 155, 145 are illustrated as being separate paths between the electronic device 107 and their respective servers, this is only for purpose of illustration, and is not a specific limitation of a representative embodiment of the present invention. The communication paths 143, 153, 155, 145 may be combined into one or more paths that may comprise wired or wireless communication paths such as, for example, a local area network, a public switched telephone network, a wireless personal, local or wide area network, and a cellular or paging network, to name only a few possibilities.

As illustrated in FIG. 1, an electronic device in accordance with one representative embodiment of the present invention comprises a processor 166, random access memory (RAM) 165, and non-volatile memory (NVM) 111. The NVM 111 may comprise, for example, NAND or NOR type flash memory or other suitable type of NVM. The NVM 111 may contain a number of software/firmware code components of the electronic device 107 including, for example, application software 127, a device management (DM) client 163, an update package/update package array 116, a provisioning client 123, a hand-off module 121, an operating system (OS) 119, firmware 117, and one or more update agent(s) 115. Additional software/firmware code components may also be present in the RAM 165 and NVM 111. The term "code" may be used herein to represent one or more of executable instructions, operand data, configuration parameters, and other information stored in memory of the electronic device 107, and the term "update package catalog" may be used interchangeably with the term "update package array" to refer to received update information that comprises multiple update packages. The electronic device 107 may also comprise interface circuitry (not shown) to enable operable connection of a subscriber identity module (SIM) card 167, that may be employed in accordance with aspects of the present invention described later in this document.

In a representative embodiment of the present invention, an electronic device such as, for example, the electronic device 107 of FIG. 1 may employ an update package (e.g., the update package/update package array 116) delivered by a remote server such as, for example, the download server 151, to update firmware/software, data and configuration information in memory of the electronic device 107. Such an update package may comprise update information including, for example, metadata describing an update, checksums, and instructions executable by one or more update agents such as, for example, the update agent 115 of FIG. 1. The update agent 115 may process a set of executable instructions, which may be used as a compact means to encode differences between existing/first and updated/second versions of firmware, software, data, and configuration parameters for the electronic device 107. The executable instructions may be assembled into update packages to be transmitted to an electronic device for use in updating memory of the electronic device. Update agent(s) in the electronic device may process respective portions of the executable instructions from an update package to convert/transform corresponding portions of an existing/first version of code in memory of the electronic device 107 to portions of an updated/second version of code. The electronic device 107 may also receive provisioning information from, for example, the device management server 109, the customer care server 157, and/or the provisioning server 129 to fix configuration problems or reconfigure software and hardware.

In addition to those elements described above, the electronic device 107 may comprise a downloaded diagnostic client (not shown) that facilitates remote diagnosis, and a traps client (not shown) that facilitates the setting of traps and retrieving of collected information. The DM client 163 of the electronic device 107 may interact with the DM server 109, the diagnostic client, and the traps client, to receive DM commands from the DM server 109 and to implement them in the electronic device 107. The download server 151 may be employed to download firmware and software updates (e.g., update information in the form of, for example, update packages). The download server 151 may also be used to download new firmware/software such as, for example, the diagnostics client mentioned above, which may then be installed and activated in the electronic device 107.

As described briefly above, an electronic device in accordance with a representative embodiment of the present invention (e.g., electronic device 107) may receive update information (e.g., an update package) for processing by one or more update agents (e.g., update agent 115) to convert/transform software (e.g., application software 127) and/or firmware (e.g., firmware 117) to produce updated software/firmware in the electronic device. In some representative embodiments of the present invention, the update agent 115 may comprise multiple update agents, each of the update agents appropriately arranged to process different types of update information for updating different types/formats of software, firmware, user data, and configuration parameters in the memory of the electronic device 107. Each of the update packages received may be processed in the electronic device by an appropriate one of the update agent(s) 115 to update an associated type of information in the memory of the electronic device 107.

In one representative embodiment of the present invention, an Open Mobile Alliance (OMA) device management (DM)-based applications server is composed of two parts, an OMA DM-based application, and an OMA DM server such as, for example, the DM server 109 shown in FIG. 1. An OMA DM-based application is mainly focused on business processes, logic, and data. An OMA DM server, however, is mainly focused on the functionality required to support the OMA DM protocol by which the OMA DM-based application manipulates OMA DM-capable electronic devices such as, for example, the electronic device 107 of FIG. 1.

An OMA DM common framework in accordance with a representative embodiment of the present invention is arranged to support a set of application programming interfaces (APIs) and call back services, so that OMA DM-based applications may be easily and effectively integrated with an OMA DM server, such as the DM server 109 of FIG. 1, for example. One example of an OMA DM-based application server is the Mobile Variance Platform (MVP) Server developed by Hewlett-Packard Company. An OMA DM-based common framework in accordance with a representative embodiment of the present invention supports a set of APIs and call back services that permit the integration of multiple applications including, for example, a customer care/service application, and other servers with an OMA DM-based server such as the DM server 109 of FIG. 1

A customer care server such as, for example, the customer care server 157 of FIG. 1, may provide an API for issuing OMA DM commands and values to OMA DM capable electronic devices, including the ability to explore the device management tree (DM tree) on the electronic device. Bootstrapping the electronic device may be supported, along with the ability to configure one or more bootstrap messages. A customer care server such as the customer care server 157 may support a simple graphical user interface (UI) to allow OMA DM compatible electronic devices to be bootstrapped, and for commands to be issued to allow the electronic device to be explored and configured via a browser such as, for example, an Internet browser.

In a representative embodiment of the present invention, the code to support OMA DM-based device management for customer care activities of a customer care server (e.g., customer care server 157 of FIG. 1) may be shared with an OMA DM-based application server. By employing a representative embodiment of the present invention, a system ensure that an application server and a customer care server produce identical behavior in their interactions with electronic devices under OMA DM-based device management.

An OMA DM common framework in accordance with one representative embodiment of the present invention provides for the real-time sharing of data by multiple OMA DM Based applications, and may include sharing of the data from a DM tree in an electronic device such as the electronic device 107 of FIG. 1. In a representative embodiment of the present invention, each OMA DM-based application may access the data required to create OMA DM commands for the electronic device.

Currently, each manufacturer of an electronic devices such as the electronic device 107 of FIG. 1 may place electronic device setting parameters (e.g., GPRS setting) in different locations within the DM tree of an electronic device they manufacture. This may cause the node uniform resource identifier (URI) of a given parameter to be different for each electronic device make, model, and version (MMV). Some representative embodiments of the present invention provide a data store to be used in managing DM tree information. Such a data store may hold single device information such as the international mobile equipment identity (IMEI) of the electronic device, a password, and a nonce, to name only a few examples. Some data may be customized for each OMA DM-based application including, for example, the type of authentication scheme to be used, and bootstrap content. Some representative embodiments of the present invention allow a user of a customer care system to modify the bootstrap content, to specify the security type and profile type for devices. The security type may, for example, be one or both of "Networkpin" and "Userpin". Some representative embodiments of the present invention permit notification and bootstrap functionality to be shared by OMA DM-based customer care and application servers such as the customer care server 157 and DM server 109 of FIG. 1, for example. Such an arrangement may permit a user of the customer care server to specify, for example, a short message service center (SMSC) to be used for the sending of notification and bootstrap messages. Some representative embodiments of the present invention provide this functionality through a set of APIs and call back services that support the sending of DM commands and receipt of results.

An example demonstrating how a customer care server may profile a DM tree in an electronic device is discussed below.

Figure 2:
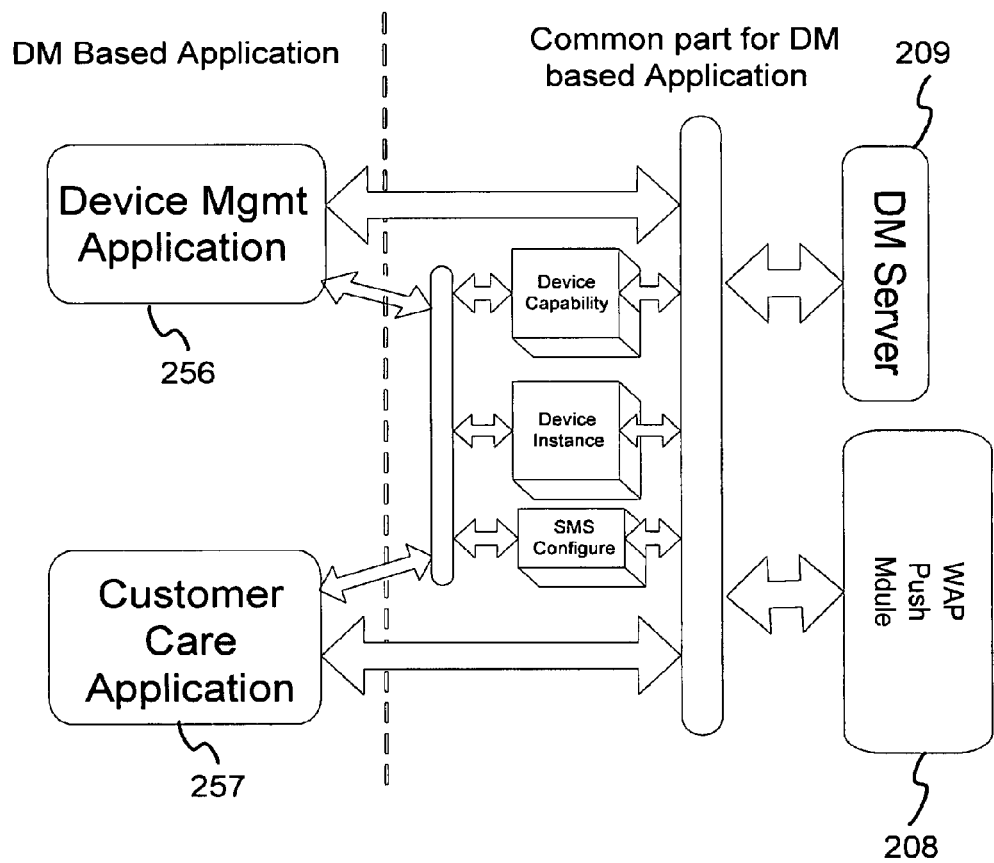
FIG. 2 shows a block diagram of an exemplary OMA DM-based device management architecture employing an OMA DM common framework supporting interactions between OMA DM-based applications servers and an electronic device such as the electronic device of FIG. 1, in accordance with a representative embodiment of the present invention.

FIG. 2 shows a block diagram of an exemplary OMA DM-based device management architecture 200 employing an OMA DM common framework 210 supporting interactions between OMA DM-based applications servers and an electronic device such as the electronic device 107 of FIG. 1, in accordance with a representative embodiment of the present invention. The illustration of FIG. 2 shows two OMA DM-based applications accessing an OMA DM common framework in accordance with a representative embodiment of the present invention. Device management application 256 accesses device capability information, device instance information, and short message service (SMS) configuration information using the application programming interface and call back services provided by the OMA DM common framework. A DM server 209 and WAP push module 208 access the device capability information, device instance information, and short message service (SMS) configuration during interactions with electronic devices such as, for example, the electronic device 107 of FIG. 1.

Figure 3:
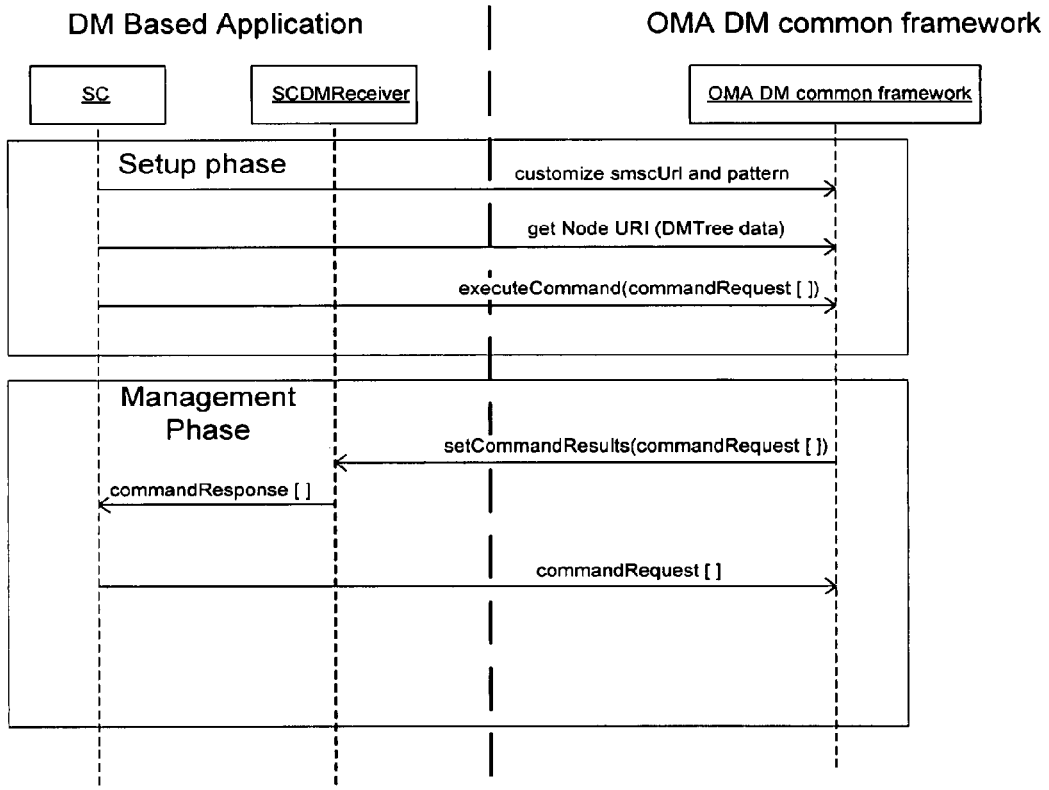
FIG. 3 shows an exemplary message exchange between an OMA DM-based application and an OMA DM common framework during a regular device management session, in accordance with a representative embodiment of the present invention.

FIG. 3 shows an exemplary message exchange between an OMA DM-based application and an OMA DM common framework during a regular device management session, in accordance with a representative embodiment of the present invention. During a setup phase, the OMA DM-based application first customizes an SMS universal resource locator (URL) and pattern information. The OMA DM-based application then gets node universal resource identifier information, using device management (DM) tree data. The OMA DM-based application then employs one of the OMA DM common framework API functions, executeCommand, and passes a CommandRequest object to indicate the SyncML DM command to be issued to the DM client in the electronic device (e.g., electronic device 107 of FIG. 1) involved in the DM session. Additional details of the executeCommand API call and the CommandRequest object are set forth later in this document.

During the management phase, the OMA DM common framework first employs the setCommandResults call back service to communicate the CommandResponse object to the OMA DM based application. In the illustration, this communication is received by functional element SCDMReceiver of the OMA DM based application. As shown in FIG. 3, SCDMReceiver then passes the CommandResponse object to the OMA DM-based application. The OMA DM-based application may then access the CommandRequest object.

Figure 4:
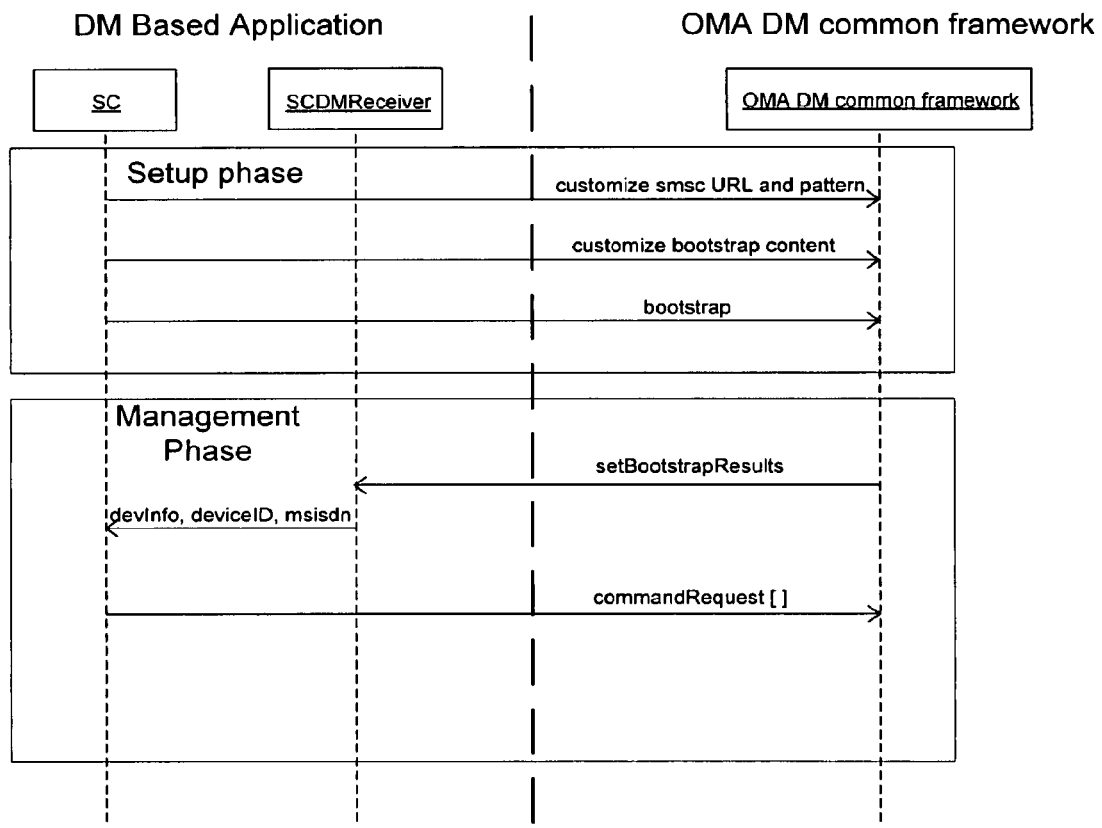
FIG. 4 illustrates an exemplary exchange of messages or control between an OMA DM-based application and an OMA DM common framework during a bootstrap session, in accordance with a representative embodiment of the present invention.

FIG. 4 illustrates an exemplary exchange of messages or control between an OMA DM-based application and an OMA DM common framework during a bootstrap session, in accordance with a representative embodiment of the present invention. During a setup phase, the OMA DM-based application first customizes SMS URL and pattern information. The OMA DM-based application may then customize bootstrap content, and may then transmit a bootstrap to the electronic device (e.g., electronic device 107 of FIG. 1).

During a management phase, the OMA DM common framework employs a setBoostrapResult call back service to pass results of the bootstrap activity to the OMA DM-based application. In the illustration, this communication is received by functional element SCDMReceiver of the OMA DM based application. As shown in FIG. 4, SCDMReceiver then passes device information (devinfo), device identification (devID) and the MSISDN of the electronic device (MSISDN) to the OMA DM-based application. The OMA DM-based application may then access the CommandRequest object.

As shown in FIG. 2, a representative embodiment of the present invention supports multiple OMA DM-based applications at runtime. There are two approaches that may be employed to achieve this, the use of Webservices, and the use of Java Remote Method Invocation (RMI). By using Webservices, an OMA DM-based application may implement the call back service API defined in this document and provide the following information to the OMA DM common framework.

| Name | Description |
|---|---|
| Call back service URL | This is the URL of jndi server. By binding this URL with a call back service, the OMA DM common framework may communicate with an OMA DM-based application. |

When using Java Remote Method Invocation, an OMA DM-based application may implement the call back services remote client API defined in this document and provide the following information to the OMA DM common framework.

| Name | Description |
|---|---|
| Context.PROVIDER_URL | This is the URL of a jndi server. |
| Context.INITIAL_CONTEXT_FACTORY | This is the service provider definition. |
| Call back service jndi name | The OMA DM common framework may use this name to look up the remote client API. |

A representative embodiment of the present invention defines a set of objects for communication between an OMA DM-based application (e.g., device management application 256 and customer care application 257 of FIG. 2) and an OMA DM common framework. An API in accordance with a representative embodiment of the present invention is clean, easy to understand and at the same time extensible. Six objects (CommandRequest, CommandResponse, MMV, DeviceCapability, DeviceInstance, and SMSCConfiguration) are defined below that are representative of those that may be used for communication between an OMA DM-based application and the OMA DM common framework, in accordance with a representative embodiment of the present invention. Although five objects are employed in the examples of the present application, a different number or set of objects may be employed in a representative embodiment of the present invention.

Some representative embodiments of the present invention employ an API object named "CommandRequest", which is used by an OMA DM-based application to indicate to the OMA DM common framework the SyncML DM command to issue to a DM client (e.g., 163 of FIG. 1) and to identify associated attributes. Table 1, below, shows an exemplary structure of a CommandRequest object in accordance with a representative embodiment of the present invention.

TABLE 1

| Attribute | Type | Description |
|---|---|---|
| command | String | This attribute may be used to define an actual OMA DM command to be issued. Valid values are: Get, Replace, Exec, Copy, Add, Delete, Alert, Sequence, and Atomic. |
| targetURI | String | This attribute may be used to define the URI of the node on which the command is issued, e.g., command="Get" targetURI='./DevDetail' |
| sourceURI | String | Applicable when the command is "Copy". |
| value[ ] | Object | This attribute may be used to define the data for the command. e.g., if the command is "Replace", this attribute defines the value to set in that node. The value array may contain a single element, but in some cases (e.g., the Alert command) it may contain multiple values For example, for Alert 1103: value[0] = "1103" value[1] = "MINDT=10&MAXDT=20&DR=1" Value[3] = "Select a color" Value[4] = "Red" Value[5] = "Green" Value[6] = "Blue" |
| Format | String | This attribute may be used to define the format of the data.(e.g., bin, chr, b64, bool, int, xml, node) |
| optIn | Int | This attribute may be used to define the optIn parameter when sending the OMA DM notification. Its valid values may comprise integers 0 to 3, which correspond to the <ui-mode> field in the DM SMS notification message. See Section 6.2.7 in OMA-SyncML-DMNotification-V1_1_2-20031205-A.pdf |
| commandRequests | CommandRequest [ ] | This attribute may be used to wrap more commands within this command. For example: Used for Atomic and Sequence. |

Some representative embodiments of the present invention employ an API object named "CommandResponse", which is used to report back the results or the status of the command back to the OMA DM Based application. Table 2, below, shows an exemplary structure of a CommandResponse object in accordance with a representative embodiment of the present invention.

TABLE 2

| Attribute | Type | Description |
|---|---|---|
| Command | String | This attribute may be used to define the command from which these results come. |
| statusCode | String | This attribute may be used to define the status code returned by the DM client. Example: In case of Alert 1226, the status Code may be: 1226 |
| uri[ ] | String | This attribute may be used to define the node URI for the command. For example: if the command was Get on "./DevDetail", this uri attribute will be: "./DevDetail" If the Get was issued on a tree node, the results may be of all leaf nodes. In that case, the array may have more than one element. |
| value[ ] | String | This attribute may be used to define the data of the resulting command. For example: if the command is a "Get" on "./DevDetail", this attribute may be the value of that sub-tree in extensible markup language (XML) form. Example: in Case of Alert 1226 Value[0] = Result code Value[1] = Alert type Value[2]= correlator |
| format[ ] | String | This attribute may be used to define the type of returned data. |

Some representative embodiments of the present invention employ an API object named "MMV", that is used by an OMA DM-based application and OMA DM common framework to represent the make, model and version of an electronic device (e.g., electronic device 107 of FIG. 1). Table 3, below, shows an exemplary structure of a MMV object in accordance with a representative embodiment of the present invention.

TABLE 3

| make | String | This attribute may be used to indicate the manufacturer of the electronic device. |
|---|---|---|
| model | String | This attribute may be used to indicate the model of the electronic device. |
| version | String | This attribute may be used to indicate the (firmware) version of the electronic device. |

Some representative embodiments of the present invention employ an API object named "DeviceCapability", that is used by an OMA DM-based application and OMA DM common framework to customize the data related to device. (e.g., electronic device 107 of FIG. 1). Table 4, below, shows an exemplary structure of a DeviceCapability object in accordance with a representative embodiment of the present invention.

TABLE 4

| Attribute | Type | Description |
|---|---|---|
| name | String | This attribute may be used to define the name of the device capability. |
| description | String | This attribute may be used to provide the description of the DeviceCapability. |
| mmv | MMV | This attribute may be used to indicate the make, model and version. |
| DeviceParameter[ ] | deviceParameters | This attribute may be used to define the deviceParameters representing: DMTree data Authentication scheme Bootstrap profile type Bootstrap sec type |
| bootstrapTemplate | byte[ ] | This attribute may be used to define the content of the bootstrap. |

Some representative embodiments of the present invention employ an API object named "DeviceInstance", that is used by an OMA DM-based application and OMA DM common framework to represent the data related to a single device. (e.g., electronic device 107 of FIG. 1). Table 5, below, shows an exemplary structure of a DeviceInstance object in accordance with a representative embodiment of the present invention.

TABLE 5

| Attribute | Type | Description |
|---|---|---|
| msisdn | String | This attribute may be used to define a phone number of the electronic device. |
| deviceId | String | This attribute may be used to define an IMEI for the electronic device. |
| description | String | This attribute may be used to describe the electronic device. |
| status | String | This attribute may be used to indicate the current status of the electronic device. Valid values may be: UNKNOWN—Cannot determine the status UNASSIGNED—The electronic device is not yet associated with a subscriber. ASSIGNED—An electronic device associated with a subscriber. QUARANTINED—No actions are to be performed for this electronic device. PROVISIONED—The electronic device has been provisioned. NEEDS_UPDATE—The electronic device is assigned to a subscriber, but an update is to be done later. |

TABLE 5-continued

| Attribute | Type | Description |
| --- | --- | --- |
| DeviceCapability | deviceCapability | This attribute may be used to define the DeviceCapability assigned to this device |
| lastProvisionDate | Date | This attribute may be used to indicate the last date the electronic device was provisioned. |
| clientUserName | String | This attribute may be used to define the client user name used by OMA DM common framework to authenticate the electronic device. |
| clientPassword | String | This attribute may be used to indicate the client password used by OMA DM common framework to authenticate the electronic device. |
| clientNonce | String | This attribute may be used to define the client nonce used by OMA DM common framework to authenticate the electronic device in case authentication type is MD5 and HMAC. |
| serverNonce | String | This attribute may be used by the OMA DM common framework to generate credential sent to the electronic device in case the authentication type is MD5 or HMAC. |
| serverPassword | String | This attribute may be used by the OMA DM common framework to generate credential sent to the electronic device in case authentication type is MD5 or HMAC. |
| type | String | This attribute may be used to indicate the electronic device type (e.g., Home, Work, etc.) |
| createdBy | String | This attribute may be used to indicate the user who uploaded this electronic device instance. |
| lastModifiedBy | String | This attribute may be used to indicate the user who last modified the device instance for the electronic device. |
| createdTimeStamp | Date | This attribute may be used to indicate the time when this device instance was uploaded. |
| lastModifiedTimeStamp | Date | This attribute may be used to define the time when this device instance was last modified. | employ an API object named "SMSCConfiguration", that may used by an OMA DM-based application and OMA DM common framework to represent the data related to the configuration of a short message service center. Table 6, below, shows an exemplary structure of a SMSCConfiguration object in accordance with a representative embodiment of the present invention.

TABLE 6

| Attribute | Type | Description |
| --- | --- | --- |
| smsHostAddress | String | This attribute may be used to indicate the manufacturer of the electronic device. |
| smsPort | String | This attribute may be used to indicate the model of the electronic device. |
| smsPassword | String | This attribute may be used top indicate the (firmware) version of the electronic device. |
| smsUserName | String | This attribute may be used to indicate the user name of the SMS. |
| Description | String | |
| smscName | String | This attribute may be used to indicate the SMSC name. |
| messagesPerMinute | int | This attribute may be used to indicate the number of messages to send per minute. |
| createdBy | String | |
| lastModifiedBy | String | |
| dateCreated | Date | |
| smppSystemType | String | |
| smppDTON | String | |
| smppDNPI | String | |
| smppRange | String | |
| smppOADDR | String | |
| smppOTON | String | |
| smppONPI | String | |
| smppServiceType | String | |
| kannelUri | String | This attribute may be used to indicate the URI of the kannel. |
| kannelHdrLength | String | This attribute may be used to indicate the hdr length of the kannel. |
| protocol | String | This attribute may be used to indicate the protocol used to send SMS. kannel ucp smpp |
| isDefault | boolean | |

A representative embodiment of the present invention provides a application programming interface (API) that permits an OMA DM-based application to send device management (DM) commands to an electronic device such as, for example, the electronic device 107 of FIG. 1. Such an API may provide a number of API functions and call back services to support communication between an OMA DM-based application and an OMA DM server such as, for example, the DM server 109 of FIG. 1.

Some representative embodiments of the present invention provide a API function to execute a command on a single electronic device. A function prototype for such a function may appear as follows:

public void executeCommand (String session, Command Request[ ]cmd, String msisdn, String expectedDeviceId, String authScheme)

In a representative embodiment of the present invention, this function may be an asynchronous call. The DM server may use the "cmd" parameter to determine which OMA DM command to issue to the electronic device. The expectedDeviceId (e.g., IMEI) and authScheme parameters may be passed to save calls by a DM server such as DM server 109 of FIG. 1 to an OMA DM-based application server. If the DM client in the electronic device (e.g., electronic device 107 of FIG. 1) responds with a deviceId (e.g., IMEI) which is different than the expectedDeviceId, the DM server may perform a call to the OMA DM-based application server using a call back service such as "processDevice( )", described later in this document. If the value returned by the OMA DM-based application server is "true", the OMA DM server may make a call to a function that may be named "getAuthScheme( )", to determine the identity of an XML file (e.g., DBOfficer) to use for authentication. If, however, the DM Client returns a deviceId that is the same as the expectedDeviceId, then the DM server may not make a call to "processDevice( )" and may use the authorization mechanism indicated by the authScheme parameter sent in the call to "executeCommand". The results of this call may be conveyed back to the OMA DM-based application by a call back API such as, for example, the "setCommandResults" call back service API, described later in this document. In some representative embodiments of the present invention, when the DM common framework is unable to find call back server URL information, the OMA DM common framework may treat a designated OMA DM-based application server as the call back service server.

Table 7, shown below, illustrates an exemplary set of parameters that may be used with the "executeCommand" API call.

TABLE 7

| Name | Description |
| --- | --- |
| session | This parameter may be used to define a string used by a OMA DM-based application as an internal session identifier. |
| cmd | This parameter may be used to define the command object containing the details of the OMA DM command to be executed. The array length may be 1, but in some cases (e.g., "Sequence" or when a "Replace" followed by "Exec" is performed), there may be multiple commands in the array. |
| msisdn | This parameter may be used to define the phone number of the electronic device on which to issue the command. |
| expectedDeviceId | This parameter may be used to define the expected deviceId to respond. |
| authScheme | This parameter may be used to define the string that contains a full path to the XML file having the authentication class/scheme to use. |

Some representative embodiments of the present invention provide an API function to execute a command on multiple electronic devices for one API call. A function prototype for such a function may appear as follows:

public void executeCommand (String session, CommandRequest[ ][ ] cmd, String msisdn[ ], String expectedDeviceId[ ], String authScheme[ ])

In a representative embodiment of the present invention, this function may be an asynchronous call. The DM server may use the "cmd" parameter array to determine which OMA DM command to issue to each electronic device. The expectedDeviceId (IMEI) and authScheme parameter arrays may be passed to save calls by a DM server such as DM server 109 of FIG. 1 to an OMA DM-based application server. If the DM client in any of the identified electronic devices (e.g., electronic device 107 of FIG. 1) responds with a deviceId (IMEI) which is different than the expectedDeviceId, the DM server may perform a call to the OMA DM-based application server using a call back service such as "processDevice( )", described later in this document. If the value returned by the OMA DM-based application server is "true", the OMA DM server may make a call to a function that may be named "getAuthScheme( )", to determine the identity of an XML file (e.g., DBOfficer) to use for authentication of that electronic device. If, however, the DM Client returns a deviceId that is the same as the expectedDeviceId, then the DM server may not make a call to "processDevice( )" and may use the authorization mechanism indicated by the authScheme parameter for that electronic device, as sent in the call to "executeCommand". The results of this call may be conveyed back to the OMA DM-based application by a call back API such as, for example, the "setCommandResults" call back service API, described later in this document. In some representative embodiments of the present invention, when the DM common framework is unable to find call back server URL information, the OMA DM common framework may treat a designated OMA DM-based application server as the call back service server.

Table 8, shown below, illustrates an exemplary set of parameters that may be used with the "executeCommand" API call.

TABLE 8

| Name | Description |
| --- | --- |
| Session | This parameter may be used to define a string used by a OMA DM-based application as an internal session identifier. |
| cmd | This parameter may be used to define the command object containing the details of the OMA DM command to be executed. The array length may be 1, but in some cases (e.g., "Sequence" or when a "Replace" followed by "Exec" is performed), there may be multiple commands in the array. |
| msisdn[ ] | This parameter may be used to define all of the phone numbers of the electronic devices on which to issue the command. |
| expectedDeviceId[ ] | This parameter may be used to define the expected deviceIds corresponding to the MSISDNs to respond. |
| authScheme[ ] | This parameter may be used to define the string that contains a full path to the XML file having the authentication class/scheme to use. |

Some representative embodiments of the present invention provide an alternate API function to execute a command on a single electronic device. A function prototype for such a function may appear as follows:

public void executeCommand (HashMap session, CommandRequest[ ]cmd, String msisdn, String expectedDeviceId, String authScheme)

In a representative embodiment of the present invention, this function may be an asynchronous call. The DM server may use the "cmd" parameter to determine which OMA DM command to issue to the electronic device. The expectedDeviceId (IMEI) and authScheme parameters may be passed to save calls by a DM server such as DM server 109 of FIG. 1 to an OMA DM-based application server. If the DM client in the electronic device (e.g., electronic device 107 of FIG. 1) responds with a deviceId (IMEI) which is different than the expectedDeviceId, the DM server may perform a call to the OMA DM-based application server using a call back service such as "processDevice( )", described later in this document.

If the value returned by the OMA DM-based application server is "true", the OMA DM server may make a call to a function that may be named "getAuthScheme( )", to determine the identity of an XML file (e.g., DBOfficer) to use for authentication. If, however, the DM Client returns a deviceId that is the same as the expectedDeviceId, then the DM server may not make a call to "processDevice( )" and may use the authorization mechanism indicated by the authScheme parameter sent in the call to "executeCommand". The results of this call may be conveyed back to the OMA DM-based application by a call back API such as, for example, the "setCommandResults" call back service API, described later in this document. In some representative embodiments of the present invention, when the DM common framework is unable to find call back server URL information, the OMA DM common framework may treat a designated OMA DM-based application server as the call back service server. This PI function may be employed by some OMA DM-based applications, and the DM common framework may send back information by calling a call back service defined in the "session" parameter.

Table 9, shown below, illustrates an exemplary set of parameters that may be used with the "executeCommand" API call.

TABLE 9

| Name | Description |
| --- | --- |
| session | This parameter may be used to define a HashMap object that contains the following elements:<br>Protocol—This value may be used to indicate the protocol used by call back service. The value may be RMI or Webservice.<br>CallBackUrl—In case of Webservice, this value may be the web service URL.<br>Context.PROVIDER_URL—In case of RMI, this value may be the jndi server address.<br>Context.INITIAL_CONTEXT_FACTORY—In case of RMI, this value may be the service provider definition.<br>jndiName—In case of RMI, this value may be the jndi name of the Enterprise Java Bean (EJB) that implements the call back service.<br>sessionId—This value may be a DM based application's internal session identifier.<br>sendMsg—This value may be a flag to indicate whether the DM-based application wants to send the notification and bootstrap itself. The value may be "T" or "F", where "T" may mean the DM application wants to send notification and bootstrap message itself, and "F" may mean the DM application wants the DM common framework to send notification and bootstrap message. |
| cmd | This parameter may be used to define the command object containing the details of the OMA DM command to be executed. The array length may be 1, but in some cases (e.g., "Sequence" or when a "Replace" followed by "Exec" is performed), there may be multiple commands in the array. |
| msisdn | This parameter may be used to define the phone number of the electronic device on which to issue the command. |

TABLE 9-continued

| Name | Description |
| --- | --- |
| expectedDeviceId | This parameter may be used to define the expected deviceId to respond. |
| authScheme | This parameter may be used to define the string that contains a full path to the XML file having the authentication class/scheme to use. |

Some representative embodiments of the present invention provide an alternate API function to execute a command on multiple electronic devices for one API call. A function prototype for such a function may appear as follows:

public void executeCommand (HashMap session, Command Request[ ][ ] crud, String msisdn[ ], String expectedDeviceId[ ], String authScheme[ ])

In a representative embodiment of the present invention, this function may be an asynchronous call. The DM server may use the "cmd" parameter array to determine which OMA DM command to issue to each electronic device. The expectedDeviceId (IMEI) and authScheme parameter arrays may be passed to save calls by a DM server such as DM server 109 of FIG. 1 to an OMA DM-based application server. If the DM client in any of the identified electronic devices (e.g., electronic device 107 of FIG. 1) responds with a deviceId (IMEI) which is different than the expectedDeviceId, the DM server may perform a call to the OMA DM-based application server using a call back service such as "processDevice( )", described later in this document. If the value returned by the OMA DM-based application server is "true", the OMA DM server may make a call to a function that may be named "getAuthScheme( )", to determine the identity of an XML file (e.g., DBOfficer) to use for authentication of that electronic device. If, however, the DM Client returns a deviceId that is the same as the expectedDeviceId, then the DM server may not make a call to "processDevice( )" and may use the authorization mechanism indicated by the authScheme parameter for that electronic device, as sent in the call to "executeCommand". The results of this call may be conveyed back to the OMA DM-based application by a call back API such as, for example, the "setCommandResults" call back service API, described later in this document. In some representative embodiments of the present invention, when the DM common framework is unable to find call back server URL information, the OMA DM common framework may treat a designated OMA DM-based application server as the call back service server.

Table 10, shown below, illustrates an exemplary set of parameters that may be used with the "executeCommand" API call.

TABLE 10

| Name | Description |
| --- | --- |
| session | This parameter may be used to define a HashMap object that contains the following elements:<br>Protocol—This value may be used to indicate the protocol used by call back service. The value may be RMI or Webservice.<br>CallBackUrl—In case of Webservice, this value may be the web service URL.<br>Context.PROVIDER_URL—In case of RMI, this value may be the jndi server address. |

TABLE 10-continued

| Name | Description |
| --- | --- |
| | Context.INITIAL_CONTEXT_FACTORY—In case of RMI, this value may be the service provider definition.
jndiName—In case of RMI, this value may be the jndi name of the Enterprise Java Bean (EJB) that implements the call back service.
sessionId—This value may be a DM based application's internal session identifier.
sendMsg—This value may be a flag to indicate whether the DM-based application wants to send the notification and bootstrap itself. The value may be "T" or "F", where "T" may mean the DM application wants to send notification and bootstrap message itself, and "F" may mean the DM application wants the DM common framework to send notification and bootstrap message. |
| cmd | This parameter may be used to define the command object containing the details of the OMA DM command to be executed. The array length may be 1, but in some cases (e.g., "Sequence" or when a "Replace" followed by "Exec" is performed), there may be multiple commands in the array. |
| Msisdn[ ] | This parameter may be used to define the phone number of the electronic device on which to issue the command. |
| expectedDeviceId[ ] | This parameter may be used to define the expected deviceId to respond. |
| authScheme[ ] | This parameter may be used to define the string that contains a full path to the XML file having the authentication class/scheme to use. |

Some representative embodiments of the present invention provide an API function to cancel a device management command on an electronic device. A function prototype for such a function may appear as follows:
    public String cancelCommand (String session, String msisdn)
In a representative embodiment of the present invention, this function may be a synchronous call. The DM server may cancel or delete any pending DM command for the electronic device with the specified phone number. Such an API call may return a 0 if a command is successfully cancelled, and may return −1 if an error occurs while deleting a DM command.

Some representative embodiments of the present invention provide an alternate API function to cancel a device management command on an electronic device. A function prototype for such a function may appear as follows:
    public String cancelCommand (HashMap session, String msisdn)
In a representative embodiment of the present invention, this function may be a synchronous call. The DM server may cancel or delete any pending DM command for the electronic device with the specified phone number. Such an API call may return a 0 if a command is successfully cancelled, and may return −1 if an error occurs while deleting a DM command.

Some representative embodiments of the present invention provide an API function to retry a device management command on an electronic device. A function prototype for such a function may appear as follows:
    public String retryCommand (String session, String msisdn)
In a representative embodiment of the present invention, this function may be a synchronous call. The DM server may retry the last DM command that was issued to the electronic device. The DM server may first cancel and then re-issue the command. Such an API call may return a 0 if a command retry is successful, and may return −1 if an error occurs while retrying a DM command.

Some representative embodiments of the present invention provide an alternate API function to retry a device management command on an electronic device. A function prototype for such a function may appear as follows:
    public String retryCommand (HashMap session, String msisdn)
In a representative embodiment of the present invention, this function may be a synchronous call. The DM server may retry the last command that was issued to the electronic device. The DM server may first cancel and then re-issue the command. Such an API call may return a 0 if a command retry is successful, and may return −1 if an error occurs while retrying a DM command.

An OMA DM-based application in accordance with some representative embodiments of the present invention provides a call back service function to report the results of a device management command on an electronic device. A function prototype for such a function may appear as follows:
    public CommandRequest[ ] setCommandResults (String session, String devInfo, CommandResponse[ ]response, String msisdn)
In a representative embodiment of the present invention, a DM server (e.g., DM server 109 of FIG. 1) may use such a function to report back the results of a DM command including the status and return value(s). This function may return CommandRequest[ ], it there are more commands to be executed, or Null if no additional commands are to be executed. If the latter case, the DM session may be ended.

Table 11, shown below, illustrates an exemplary set of parameters that may be used with the "setCommandResults" API call.

TABLE 11

| Name | Description |
| --- | --- |
| session | This parameter may be used by an OMA DB-based application as an internal session identifier. |
| devInfo | This parameter may be an XML string containing a "./DevInfo" sub-tree. |
| response | This parameter may be the results of the CommandRequest that was sent. |
| msisdn | This parameter may be the phone number of the electronic device which responded. |

Some representative embodiments of the present invention provide a call back service function to be used by a DM server such as the DM server 109 of FIG. 1 when the device ID received from the electronic device is not the expected device ID. A function prototype for such a function may appear as follows:
    public boolean processDevice (String session, String msisdn, String devInfo)
In a representative embodiment of the present invention, a DM server (e.g., DM server 109 of FIG. 1) may use such a function when the device ID returned by the electronic device does not match the IMEI sent in the initial call. The OMA DM-based application may check a policy about what to do with the electronic device and may return a boolean flag indicating that the DM server (e.g., DM server 109 of FIG. 1)

may proceed with the DM session or abort it. A return value of "true" may indicate that the DM session may proceed, while a value of "false" may indicate that a DM session should be aborted.

Table 12, shown below, illustrates an exemplary set of parameters that may be used with the "processDevice" call back service call.

TABLE 12

| Name | Description |
| --- | --- |
| session | This parameter may be used by an OMA DB-based application as an internal session identifier. |
| devInfo | This parameter may be an XML string containing a "./DevInfo" sub-tree. |
| msisdn | This parameter may be the phone number of the electronic device which responded. |

Some representative embodiments of the present invention provide a call back service function to be used by a DM server such as the DM server 109 of FIG. 1 to determine an appropriate authentication scheme when the received device ID of the responding electronic device is not the device ID expected. A function prototype for such a function may appear as follows:

public String getAuthScheme (String session, String devInfo)

In a representative embodiment of the present invention, a DM server (e.g., DM server 109 of FIG. 1) may use such a function when the device ID returned by the electronic device does not match the IMEI sent in the initial call. The OMA DM-based application may return the full path to an XML file to be used to load the correct authentication class to be used to perform authentication. The return value may be the full path to the XML file containing the class to be loaded.

Table 13, shown below, illustrates an exemplary set of parameters that may be used with the "getAuthScheme" call back service call.

TABLE 13

| Name | Description |
| --- | --- |
| session | This parameter may be a string containing session information. The DM server may have received this session information during an initial query call. |
| devInfo | This parameter may be an XML string containing a "./DevInfo" sub-tree. |

Some representative embodiments of the present invention provide an API function to be used by an OMA DM-based application to bootstrap a single electronic device. A function prototype for such a function may appear as follows:

public void Bootstrap (String session, Bootstrap Bootstrap)

In a representative embodiment of the present invention, this function may be an asynchronous call. A DM server (e.g., DM server 109 of FIG. 1) may create a Bootstrap message according to information provided in a Bootstrap object. Calculated credentials may be stored in a DEVICE_INSTANCE table organized in rows by device ID. This table may be updated for the appropriate device ID. In some representative embodiments of the present invention, an electronic device (e.g., electronic device 107 of FIG. 1) may send a defined package of information after a successful Bootstrap. In other representative embodiments, such a package of information may not be sent. If the electronic device does send a package of information after a successful bootstrap, the DM server may report back the Bootstrap using a call back service function such as setBootstrapResults, described later in this document.

Table 14, shown below, illustrates an exemplary set of parameters that may be used with the "Bootstrap" API function call.

TABLE 14

| Name | Description |
| --- | --- |
| Session | This parameter may be a string containing session information. The DM server may have received this session information during an initial query call. |
| devInfo | This parameter may be an XML string containing a "./DevInfo" sub-tree. |

Some representative embodiments of the present invention provide an API function to be used by an OMA DM-based application such as the DM server 109 of FIG. 1 to bootstrap multiple electronic devices with a single API call. A function prototype for such a function may appear as follows:

public void Bootstrap (String session, Bootstrap Bootstrap[ ])

In a representative embodiment of the present invention, this function may be an asynchronous call. This is similar to the Bootstrap call shown above, with the exception that the Bootstrap parameter may be an array of objects for the electronic devices to be bootstrapped during the DM session.

Some representative embodiments of the present invention provide an API function to be used by an OMA DM-based application to create a bootstrap message without sending it to the intended electronic device recipient. A function prototype for such a function may appear as follows:

public String createBootstrapMessage (String session, Bootstrap Bootstrap[ ])

In a representative embodiment of the present invention, this function may be a synchronous call. This is similar to the Bootstrap call shown in the above two sections, but instead of sending the bootstrap message to the intended electronic device, the API function may immediately return the calculated text comprising a bootstrap XML message string. In addition, calculated credentials may be stored (e.g., in DEVICE_INSTANCE).

Some representative embodiments of the present invention provide an alternate API function to be used by an OMA DM-based application to create a bootstrap message without sending it to the intended electronic device recipient. A function prototype for such a function may appear as follows:

public String createBootstrapMessage (HashMap session, Bootstrap Bootstrap[ ])

In a representative embodiment of the present invention, this function may be a synchronous call. This call is similar to the Bootstrap call shown in the above section. Instead of sending the bootstrap message to the intended electronic device, this API function may immediately return the calculated text comprising a bootstrap XML message string. In addition, calculated credentials may be stored (e.g., in DEVICE_INSTANCE).

Some representative embodiments of the present invention provide an API function to be used by an OMA DM-based application to bootstrap an electronic device. A function prototype for such a function may appear as follows:

public void bootstrapDevice(HashMap session,String msisdn, String deviceId, MMV mmv, String pin)

In a representative embodiment of the present invention, an OMA DM-based application may use this API function to cause the OMA DM common framework to bootstrap an electronic device (e.g., the electronic device 107 of FIG. 1) according to the DeviceCapability information associated with the electronic device.

Table 15, shown below, illustrates an exemplary set of parameters that may be used with the "bootstrapDevice" API function call.

TABLE 15

| Name | Description |
|---|---|
| Session | This parameter may be a HashMap object that may be used by the OMA DM common framework to call the "processDevice" and "setBootstrapResults" call back services. This attribute may be used to define a HashMap object that contains the following elements:<br>Protocol—This value may be used to indicate the protocol used by call back service. The value may be RMI or Webservice.<br>CallBackUrl—In case of Webservice, this value may be the web service URL.<br>Context.PROVIDER_URL—In case of RMI, this value may be the jndi server address.<br>Context.INITIAL_CONTEXT_FACTORY—In case of RMI, this value may be the service provider definition.<br>jndiName—In case of RMI, this value may be the jndi name of the Enterprise Java Bean (EJB) that implements the call back service.<br>sessionId—This value may be a DM based application's internal session identifier.<br>sendMsg—This value may be a flag to indicate whether the DM-based application wants to send the notification and bootstrap itself. The value may be "T" or "F", where "T" may mean the DM application wants to send notification and bootstrap message itself, and "F" may mean the DM application wants the DM common framework to send notification and bootstrap message. |
| msisdn | This parameter may be the phone number of the electronic device. |
| deviceID | This parameter may be a device identifier. |
| mmv | This parameter may be the make, model and version of the electronic device. |
| pin | This parameter may be the pin number used to calculate the mac value. |

Some representative embodiments of the present invention employ a call back service function to be used by a DM server such as the DM server 109 of FIG. 1 to notify an OMA DM-based application of the results of a bootstrap operation. A function prototype for such a function may appear as follows:

public void setBootstrapResults(String session,String deviceId, String status)

In a representative embodiment of the present invention, an OMA DM-based application may provide/expose such a call back service to permit a DM server (e.g., DM server 109 of FIG. 1) to notify the OMA DM-based application of the results of a bootstrap operation.

Table 16, shown below, illustrates an exemplary set of parameters that may be used with the "setBootstrapResults" call back service call.

TABLE 16

| Name | Description |
|---|---|
| session | This parameter may be a string used by an OMA DM-based application as an internal session identifier. |
| deviceID | This parameter may be an identifier of the electronic device. |
| status | This parameter may be the status of the bootstrap operation. |

Some representative embodiments of the present invention employ a call back service function to be used by a DM server such as the DM server 109 of FIG. 1 to cause the sending of a DM notification message to a single electronic device. A function prototype for such a function may appear as follows:

Public void sendMessage(String session, String msisdn, byte[ ] message)

In a representative embodiment of the present invention, an OMA DM-based application may provide/expose such a call back service to permit a DM server (e.g., DM server 109 of FIG. 1) to send a SMS DM notification to one electronic device (e.g., electronic device 107 of FIG. 1).

Table 17, shown below, illustrates an exemplary set of parameters that may be used with the "sendMessage" call back service call.

TABLE 17

| Name | Description |
|---|---|
| session | This parameter may be a string used by an OMA DM-based application as an internal session identifier. |
| msisdn | This parameter may be the phone number of he electronic device to which the SMS DM notification is to be sent. |
| message[ ] | This parameter may be a byte array containing the information for the notification such as, for example, wireless datagram protocol (WDP), wireless session protocol (WSP) and content. |

Some representative embodiments of the present invention employ a call back service function to be used by a DM server such as the DM server 109 of FIG. 1 to cause the sending of a DM notification message to multiple electronic devices. A function prototype for such a function may appear as follows:

Public void sendMessage(String session, String misisdn[ ], byte[ ][ ] message)

In a representative embodiment of the present invention, an OMA DM-based application may also provide/expose such a call back service to permit a DM server (e.g., DM server 109 of FIG. 1) to send a SMS DM notification to multiple electronic devices (e.g., electronic device 107 of FIG. 1) (e.g., a bulk operation).

Table 18, shown below, illustrates an exemplary set of parameters that may be used with the "send Message" call back service call.

TABLE 18

| Name | Description |
| --- | --- |
| session | This parameter may be a string used by an OMA DM-based application as an internal session identifier. |
| msisdn[ ] | This parameter may be the phone number of each of the electronic devices to which an SMS DM notification is to be sent. |
| message[ ][ ] | This parameter may be a byte array containing the information for each notification to be sent such as, for example, wireless datagram protocol (WDP), wireless session protocol (WSP) and content for an electronic device. |

Some representative embodiments of the present invention employ a call back service function to be used by a DM server such as the DM server 109 of FIG. 1 to cause the sending of a DM bootstrap message to a single electronic device. A function prototype for such a function may appear as follows:

public void sendMessage(String session, String BootstrapType, String msisdn, byte[ ] hdr, byte[ ] message Body)

In a representative embodiment of the present invention, an OMA DM-based application may provide/expose such a call back service to permit a DM server (e.g., DM server 109 of FIG. 1) to send a SMS DM notification to one electronic device (e.g., electronic device 107 of FIG. 1).

Table 19, shown below, illustrates an exemplary set of parameters that may be used with the "send Message" call back service call.

TABLE 19

| Name | Description |
| --- | --- |
| session | This parameter may be a string used by an OMA DM-based application as an internal session identifier. |
| Bootstrap Type | This parameter may be used to indicate the type of bootstrap to perform, either WAP or plain. |
| hdr[ ] | This parameter may be a byte array containing the SMS message header for the boostrap message. |
| messageBody[ ] | This parameter may be a byte array containing the SMS message body for the boostrap message. |

Some representative embodiments of the present invention employ a call back service function to be used by a DM server such as the DM server 109 of FIG. 1 to cause the sending of a DM bootstrap message to multiple electronic devices for a single call. A function prototype for such a function may appear as follows:

public void sendMessage(String session, String BootstrapType, String msisdn[ ], byte[ ][ ] hdr, byte[ ][ ] messageBody)

In a representative embodiment of the present invention, an OMA DM-based application may provide/expose such a call back service to permit a DM server (e.g., DM server 109 of FIG. 1) to send a SMS DM notification to a number of electronic devices (e.g., electronic device 107 of FIG. 1) as a result of a single call.

Table 20, shown below, illustrates an exemplary set of parameters that may be used with the "sendMessage" call back service call.

TABLE 20

| Name | Description |
| --- | --- |
| session | This parameter may be a string used by an OMA DM-based application as an internal session identifier. |
| Bootstrap Type | This parameter may be used to indicate the type of bootstrap to perform, either WAP or plain. |
| hdr[ ][ ] | This parameter may be a byte array containing the SMS message headers for the bootstrap messages for each electronic device. |
| messageBody[ ][ ] | This parameter may be a byte array containing the SMS message body for the bootstrap message for each electronic device. |

Some representative embodiments of the present invention provide an API function to be used by an OMA DM-based application to access DeviceCapability by the MMV of the electronic device. A function prototype for such a function may appear as follows:

public Collection getDeviceCapabilityByMMV(MMV mmv)

In a representative embodiment of the present invention, an OMA DM-based application may use this API function to cause the OMA DM common framework to provide DeviceCapability information based on the MMV of an electronic device (e.g., the electronic device 107 of FIG. 1). The "getDeviceCapabilityByMMV" function may return the list of device capabilities.

Table 21, shown below, illustrates an exemplary set of parameters that may be used with the "getDeviceCapability" API function call.

TABLE 21

| Name | Description |
| --- | --- |
| mmv | This parameter may be the make, model and version of the electronic device. |

Some representative embodiments of the present invention provide an API function to be used by an OMA DM-based application to access DeviceCapability by the deviceID of the electronic device. A function prototype for such a function may appear as follows:

public Collection getDeviceCapability(String deviceID)

In a representative embodiment of the present invention, an OMA DM-based application may use this API function to cause the OMA DM common framework to provide DeviceCapability information based on the deviceID of an electronic device (e.g., the electronic device 107 of FIG. 1). The "getDeviceCapability" function may return the list of device capabilities.

Table 22, shown below, illustrates an exemplary set of parameters that may be used with the "getDeviceCapability" API function call.

TABLE 22

| Name | Description |
| --- | --- |
| deviceID | This parameter may be the deviceID of the electronic device. |

Some representative embodiments of the present invention provide an API function to be used by an OMA DM-based application to create a new DeviceCapability for an electronic device. A function prototype for such a function may appear as follows:

public void createDeviceCapability (DeviceCapability deviceCapability)

In a representative embodiment of the present invention, an OMA DM-based application may use this API function to cause the OMA DM common framework to create a new DeviceCapability information.

Table 23, shown below, illustrates an exemplary set of parameters that may be used with the "createDeviceCapability" API function call.

TABLE 23

| Name | Description |
| --- | --- |
| deviceCapability | This parameter may be the deviceCapability that the OMA DM-based application wishes to create. |

Some representative embodiments of the present invention provide an API function to be used by an OMA DM-based application to assign a DeviceCapability to a single electronic device (e.g., electronic device 107 of FIG. 1). A function prototype for such a function may appear as follows:

public void assignDeviceCapability(DeviceInstance deviceInstance, DeviceCapability deviceCapability)

In a representative embodiment of the present invention, an OMA DM-based application may use this API function to assign DeviceCapability information a single electronic device (e.g., the electronic device 107 of FIG. 1).

Table 24, shown below, illustrates an exemplary set of parameters that may be used with the "getDeviceCapability" API function call.

TABLE 24

| Name | Description |
| --- | --- |
| deviceInstance | This parameter may be a single electronic device. |
| deviceCapability | This parameter may be the DeviceCapability that the OMA DM-based application wishes to assign to the electronic device. |

Some representative embodiments of the present invention provide an API function to be used by an OMA DM-based application to update DeviceCapability information for a single electronic device (e.g., electronic device 107 of FIG. 1). A function prototype for such a function may appear as follows:

public void updateDeviceCapability(DeviceCapability deviceCapability)

In a representative embodiment of the present invention, an OMA DM-based application may use this API function to update DeviceCapability information for a single electronic device (e.g., the electronic device 107 of FIG. 1).

Table 25, shown below, illustrates an exemplary set of parameters that may be used with the "updateDeviceCapability" API function call.

TABLE 25

| Name | Description |
| --- | --- |
| deviceCapability | This parameter may be the DeviceCapability that the OMA DM-based application wishes to update. |

Some representative embodiments of the present invention provide an API function to be used by an OMA DM-based application to get the node URI for a single electronic device (e.g., electronic device 107 of FIG. 1). A function prototype for such a function may appear as follows:

public String getNodeURI(String deviceId, String nodeType)

In a representative embodiment of the present invention, an OMA DM-based application may use this API function to get the node URI for a single electronic device (e.g., the electronic device 107 of FIG. 1).

Table 26, shown below, illustrates an exemplary set of parameters that may be used with the "getNodeURI" API function call.

TABLE 26

| Name | Description |
| --- | --- |
| deviceID | This parameter may be the device identifier of the electronic device. |
| nodeType | This parameter may be an identifier in the DM tree. By defining the nodeType in deviceCapability, the OMA DM-based application may share the DM tree information. |

Some representative embodiments of the present invention provide an API function to be used by an OMA DM-based application to add a device instance for an electronic device (e.g., electronic device 107 of FIG. 1) to an OMA DM common framework. A function prototype for such a function may appear as follows:

public void addDevice (DeviceInstance deviceInstance)

In a representative embodiment of the present invention, an OMA DM-based application may use this API function to add a DeviceInstance object to an OMA DM common framework for an electronic device (e.g., the electronic device 107 of FIG. 1).

Table 27, shown below, illustrates an exemplary set of parameters that may be used with the "addDevice" API function call.

TABLE 27

| Name | Description |
| --- | --- |
| deviceInstance | This parameter may be the DeviceInstance object to be added to the OMA DM common framework. |

Some representative embodiments of the present invention provide an API function to be used by an OMA DM-based application to update a device instance for an electronic device (e.g., electronic device 107 of FIG. 1). A function prototype for such a function may appear as follows:

public void updateDevice (DeviceInstance deviceInstance)

In a representative embodiment of the present invention, an OMA DM-based application may use this API function to update a DeviceInstance object in an OMA DM common framework for an electronic device (e.g., the electronic device 107 of FIG. 1).

Table 28, shown below, illustrates an exemplary set of parameters that may be used with the "addDevice" API function call.

TABLE 28

| Name | Description |
| --- | --- |
| deviceInstance | This parameter may be the DeviceInstance object to be added to the OMA DM common framework. |

Some representative embodiments of the present invention provide an API function to be used by an OMA DM-based application to get a device instance for an electronic device (e.g., electronic device 107 of FIG. 1). A function prototype for such a function may appear as follows:

public void getDevice (DeviceInstance deviceInstance)

In a representative embodiment of the present invention, an OMA DM-based application may use this API function to get a DeviceInstance object for an electronic device (e.g., the electronic device 107 of FIG. 1) from an OMA DM common framework.

Table 29, shown below, illustrates an exemplary set of parameters that may be used with the "getDevice" API function call.

TABLE 29

| Name | Description |
| --- | --- |
| deviceID | This parameter may be the device ID identifying the electronic device for which the DeviceInstance object is to be gotten from the OMA DM common framework. |

Figure 5:
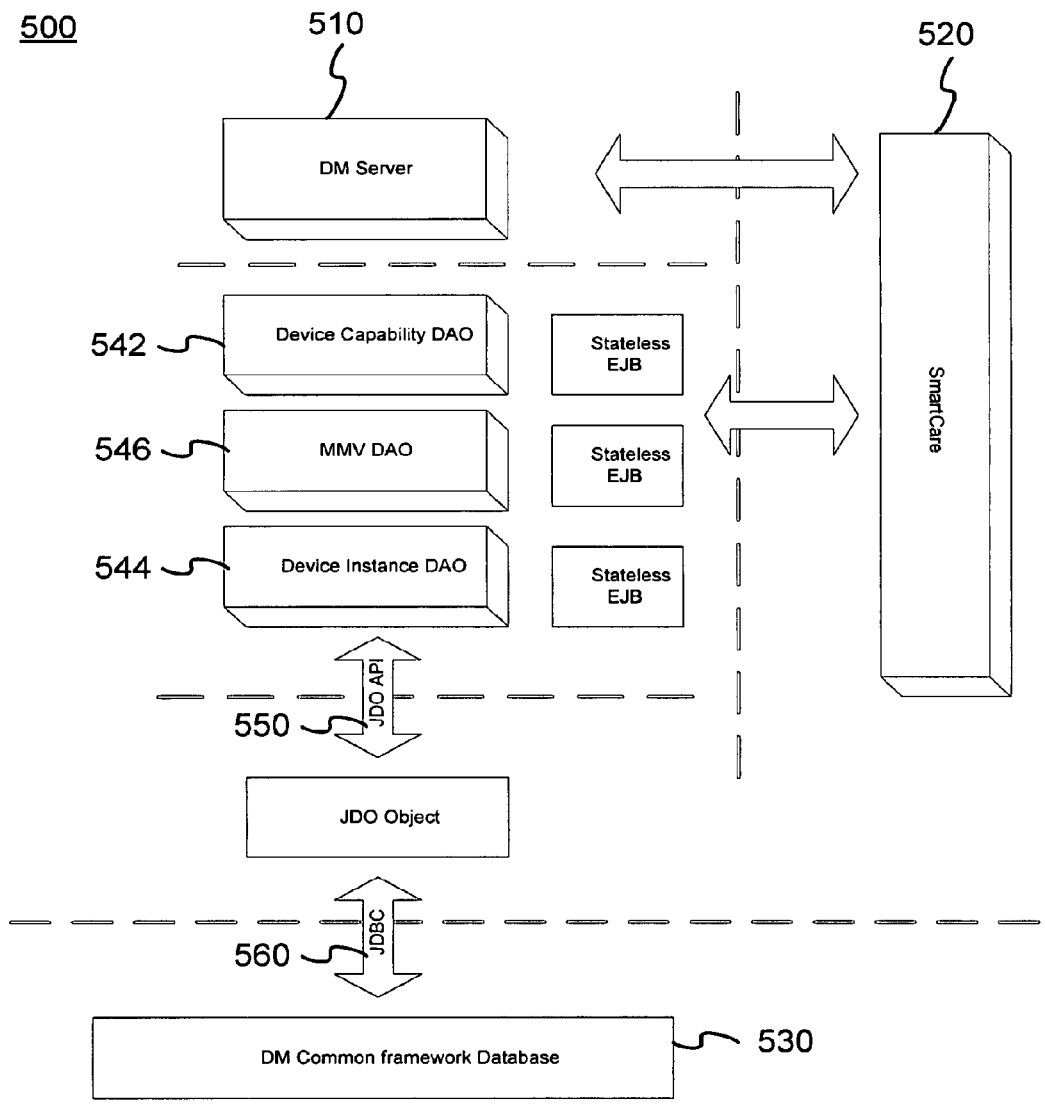
FIG. 5 shows the architecture of an exemplary device management system having an OMA DM common framework in accordance with a representative embodiment of the present invention.

FIG. 5 shows the architecture of an exemplary device management system 500 having an OMA DM common framework in accordance with a representative embodiment of the present invention. As shown in the example shown in the illustration of FIG. 5, OMA DM-based applications 520 employ an OMA DM common framework to manage Device Capability object 542, Device Instance object 544, and MMV object 546. The OMA DM-based applications 520 may comprise, for example, the SmartCare customer care application from Hewlett-Packard Company. The DM common framework may, for example, be implemented as a standalone Java Version 2 Enterprise Edition (J2ee) application, and may export its API by Remote Method Invocation (RMI) or web services, as described above. Access to the Device Capability object 542, Device Instance object 544, and MMV object 546 may be enabled by a stateless Enterprise Java Bean mechanism. The Device Capability object 542, Device Instance object 544, and MMV object 546 may employ a Java Data Objects (JDO) API 550 and Java Database Connectivity (JDBC) 560 to access a DM common framework database 530. Details of the functionality of the DM common framework database are not required of any of the OMA DM-based applications 520. In this manner, multiple OMA DM-based applications such as, for example, the OM DM-based applications 520 may simultaneously/concurrently access the DM common framework database 530, without knowledge of the access details or structure of the DM common framework database. In addition, access to the DM common framework database using an OMA DM common framework in accordance with a representative embodiment of the present invention permits OMA DM-based applications 520 to each "see" one set of objects used in device management of electronic devices (e.g., electronic device 107), providing consistent handling of the variety of data elements used.

The following describes an example device management activity to profile a sub-tree of a device management tree in an electronic device, node by node. In such a circumstance, a OMA DM-based application may issue the CommandRequest shown in Table 30, below:

TABLE 30

| Field | Value |
| --- | --- |
| command | GetStructData |
| targetURI[ ] | {./DevDetail?list=StructData}<br>The ./DevDetail is the root node URI of the sub-tree |
| sourceURI | Null |
| value | Null |
| Format | Null |
| optIn | This field used to specify the notification UI mode in OMA DM specification<br>0 not-specified<br>1 background<br>2 informative<br>3 user-interaction<br>Detail definition please refer to OMA-SyncML-DMNotification-V1_1_2-20031205-A.pdf |

An OMA DM common framework in accordance with one representative embodiment of the present invention converts the above object to a DM command and send it to the electronic device (e.g., electronic device 107 of FIG. 1). If the DM command status returned by the electronic device is, for example, "200", the profiling of the electronic device sub-tree was successful. The OMA DM common framework may return the results to the OMA DM-based application (e.g., an instance of the SmartCare customer care application). If the DM command status returned by electronic device is, for example, "406", the profiling of the electronic device failed, and may indicate that the electronic device doesn't support retrieval of the DM tree information.

An OMA DM common framework in accordance with one representative embodiment of the present invention uses the command and parameters shown below to determine whether profiling a sub-tree is supported by an electronic device. The targetURI attribute of the CommandRequest object may be set as follows:

targetURI=="./abc?list=structData"

In accordance with the OMA DM protocol, a DM server may use the Get command with a "targetURI" attribute to retrieve management tree information identified by the targetURI attribute. The Get command and the URI may have the following format:

GET <URI>?list=<attribute>

Table 31 shows exemplary values for the "attributes" values shown above:

TABLE 31

| Attribute Value | Description |
| --- | --- |
| Struct | The structure of a management tree is returned, without any data. |
| StructData | The structure of the management tree is returned, with the leaf nodes data. |

In accordance with the OMA DM protocol, if an electronic device doesn't support the DM command sent to it, the electronic device will return the status "406". When an OMA DM common framework in accordance with a representative embodiment of the present invention finds that the electronic device does not support retrieval of the DM tree information, the OMA DM common framework may send a DM Get command to the electronic device recursively, to profile the sub-tree node by node. When the profile of a sub-tree is complete, an OMA DM common framework may send the results back to the OMA DM-based application (e.g., the SmartCare customer care application) by calling the "setCommandsResults" call back service method implemented by the OMA DM-based application.

The following illustrates an example of the results of a DM sub-tree profile activity:

| Field | Value |
|---|---|
| Struct | The structure of a management tree is returned, without any data. |
| StructData | The structure of the management tree is returned, with the leaf nodes data. |
| Command | Get. |
| statusCode | 406: to indicate that the device not support retrieve DM tree information. OMA DM common framework profile the device node by node<br>200: to indicate that the device support retrieve DM tree information |
| uri[ ] | {"./DevDetail?list=StructData",<br>"./DevDetail",<br>  "./DevDetail/LrgObj",<br>  "./DevDetail/HwV",<br>    "./DevDetail/SwV",<br>    "./DevDetail/FwV",<br>    "./DevDetail/OEM",<br>     "./DevDetail/DevTyp",<br>     "./DevDetail/URI",<br>      "./DevDetail/Bearer",<br>      "./DevDetail/URI/MaxSegLen",<br>      "./DevDetail/URI/MaxTotLen",<br>      "./DevDetail/URI/MaxDepth"<br>} |
| value[ ] | {"",<br>"",<br>"true",<br>"intel",<br>"4.0",<br>"1.0",<br>"SyncML Initiative",<br>"Windows workstation",<br>"",<br>"",<br>"0",<br>"0",<br>"0"<br>} |
| format[ ] | {"",<br>"node",<br>"true",<br>"intel",<br>"4.0",<br>"1.0",<br>"SyncML Initiative",<br>"Windows workstation",<br>"node",<br>"node",<br>"0",<br>"0",<br>"0"<br>} |

A representative embodiment of the present invention supports an end-to-end Firmware-Over-the-Air (FOTA) update solution where a subscriber identity module (SIM) may be used to augment existing OMA DM and proprietor FOTA security. The SIM is employed as an authentication tool for FOTA update packages and provides an operator specific control point for rejecting update packages for updates that are not explicitly authorized via the SIM. In a representative embodiment of the present invention, update packages may be signed by, for example, a network system operator and may then be checked against a validation string, which is embedded during manufacturing in an operator-provided SIM. In some representative embodiments, an update packages may have a validation string added as a header to a binary file that constitutes the update package.

In a representative embodiment of the present invention, update packages may be transported to an electronic device (e.g., electronic device 107 of FIG. 1) through existing OMA-based mechanisms. Existing OMA security mechanisms may be in place to validate authenticity of a client (e.g., the DM client 163 or update agent 115 of FIG. 1) and server (e.g., DM server 109 or download server 151 of FIG. 1) as well as to validate integrity of each message exchange. After download of an update package to the electronic device is complete, and prior to installation, a handoff agent (e.g., hand-off module 121 of FIG. 1) may retrieve the validation string from the SIM and store the validation string to non-volatile (e.g., flash) memory 111 so as to make the string available to the update agent 115 for validation. The update agent 115 in the electronic device 107 may check the header within the update package header against this validation string. A device management applicant such a, for example, the MVP Server from Hewlett-Packard Company, may be used to manage and dispatch the update package data to electronic devices (e.g., cellular or mobile handsets) over a communication network.

A representative embodiment of the present invention may be employed in electronic device such as, for example, Motorola V635 and E1000 handsets. Subscriber identity module (SIM) cards such as those available from, for example, Gemplus SA, also known as Gemalto NV, may be used to secure FOTA updates. In a representative embodiment of the present invention, a SIM card may include special information about a system operator against which validation of an update package may be performed, to permit secure updates.

Figures 6A, 6B:
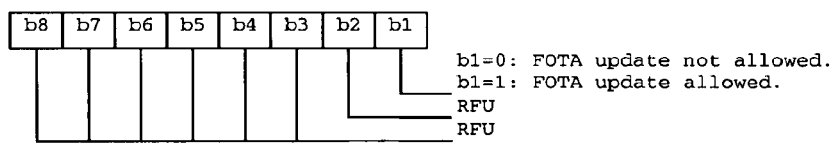
FIG. 6A shows an exemplary SIM file format for containing a set of FOTA credentials that may be stored in the file system of a SIM, in accordance with a representative embodiment of the present invention.
FIG. 6B shows an exemplary format of a FOTA condition byte that may correspond, for example, to the FOTA condition byte shown in FIG. 1, in accordance with a representative embodiment of the present invention.

FIG. 6A shows an exemplary SIM file format for containing a set of FOTA credentials that may be stored in the file system of a SIM, in accordance with a representative embodiment of the present invention. The file may, for example, be named EF_FOTA, and may have the format shown in FIG. 6A. In the example shown in FIG. 6A, the file is 17 bytes in size. A first byte "b1" may contain a FOTA condition flag that indicates whether the update process is allowed. The remaining 16 RFU bytes (2 through 17) may be used to hold the validation string or signature.

FIG. 6B shows an exemplary format of a FOTA condition byte that may correspond, for example, to the FOTA condition byte shown in FIG. 1, in accordance with a representative embodiment of the present invention. As shown in the example of FIG. 6B, a FOTA condition byte may use the rightmost or lowest order bit "b1" may take a value of "0", when FOTA update is not allowed, and a value of "1", when FOTA update is allowed.

Figure 7:
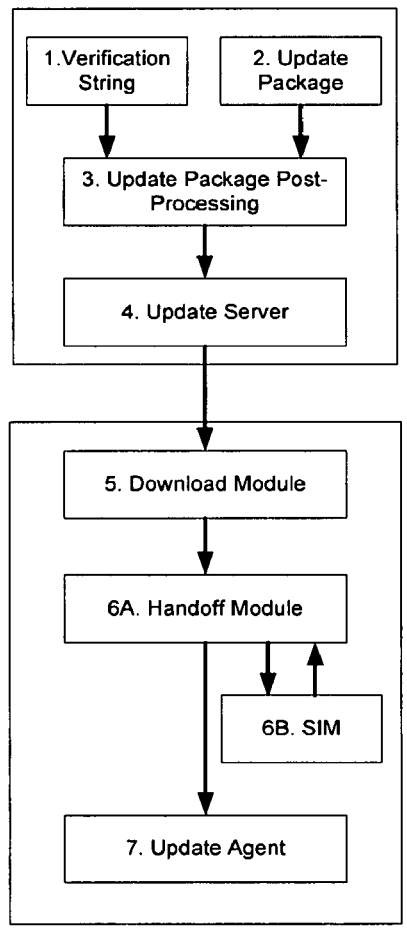
FIG. 7 shows a flowchart illustrating an exemplary process of signing an update package and verifying it against the signature/validation string stored on a SIM card, in accordance with a representative embodiment of the present invention.

FIG. 7 shows a flowchart illustrating an exemplary process of signing an update package and verifying it against the signature/validation string stored on a SIM card, in accordance with a representative embodiment of the present invention. In box 1, a verification string/validation string/signature may be provided by the vendor/manufacturer of the SIM cards in use. The verification string/validation string/signature may, for example, be programmed into the SIM cards during the manufacturing process. At box 2, the developer/creator of an update package may provide the update package for a given update. The verification string/validation string/signature may be unique to a particular system operator, but may not be unique to a subscriber/owner of the electronic device to be updated. At box 3, a post-processing activity may place the verification string/validation string/signature into the update package, readying it for secure distribution. Then, at box 4, the update package may be stored on an update server (e.g., download server 151 or DM server 109 of FIG. 1) for later distribution to compatible and identified electronic devices.

At some later time, a download module in an electronic device (e.g., electronic device 107 of FIG. 1) may download the update package from the update server. The downloaded update package may, for example, be stored in non-volatile memory (e.g., non-volatile memory 111 of FIG. 1). In a representative embodiment of the present invention, the download process may be allowed to begin only if the "FOTA update allowed" bit (e.g., bit "b1" of the FOTA condition byte of FIG. 6B) is set, and/or if the a FOTA file (e.g., EF_FOTA file mentioned above) exists on the SIM operably coupled to the electronic device. At box 6A, a handoff module (e.g., handoff module 121 of FIG. 1) may assist an update agent (e.g., update agent 115 of FIG. 1) to validate the update package by retrieving the verification string/validation string/signature stored in the EF_FOTA file of the SIM. As described previously, this information may, for example, be pre-installed in the SIM at time of manufacture. The verification string/validation string/signature from the SIM may then be written to non-volatile memory (e.g., flash memory) for retrieval by the update agent 115. Then, at box 7, the update agent 115 may validate the verification string/validation string/signature against the string contained in the header of the update package. The update package may be processed and the update process completed, if the verification string/validation string/signature is validated. The update process may be terminated, however, if validation of the verification string/validation string/signature fails.

FIG. 8 shows a table illustrating exemplary scenarios regarding the control of the update process for an electronic device that may correspond to, for example, the electronic device 107 of FIG. 1, for an update package secured by System Operator A and those not secured by System Operator A, used with a SIM issued by System Operator A, in accordance with a representative embodiment of the present invention.

In a representative embodiment of the present invention, the verification string/validation string/signature data may be stored in non-volatile memory (e.g., flash memory), and may share memory space with FOTA data. The EF_FOTA bytes may be stored at the end of blocks reserved for an update package. In some representative embodiments of the present invention, the EF_FOTA bytes may be part of flex data.

The update agent in one representative embodiment of the present invention extracts the verification string/validation string/signature data from an update package, and may compare it with the verification string/validation string/signature data extracted from the SIM and stored in non-volatile memory (e.g., flash memory). The update agent may identify the location of the verification string/validation string/signature data by including the appropriate addresses in memory where it is stored. This information may be part of an update agent header, and the update agent may accommodate the signature checking. The verification string/validation string/signature data extracted from a SIM by a handoff agent may be read, and may be compared with verification string/validation string/signature data signature data embedded in an update package. If the update package is rejected, an error code may be written to non-volatile memory as a return value.

In a representative embodiment of the present invention, an update agent such as, for example, the update agent 115 of FIG. 1, may perform the following functions in validating an update package:

The update agent may read the SIM verification string/validation string/signature data location in non-volatile (e.g., flash) memory, The update agent may shall read a FOTA header (e.g., a 17-byte header as shown in FIG. 6A) from a downloaded update package, The update agent may compare the SIM verification string/validation string/signature data to the update package FOTA header:

If the verification string/validation string/signature data match, the update agent may process the update package and install it in a fault-tolerant manner, If the verification string/validation string/signature data do not match, the update agent may reject the update package and terminate the update process. The update agent may return the electronic device (e.g., electronic device 107 of FIG. 1) to a normal operating condition and may reset any bytes used to start the update process.

The update agent may communicate error codes upon failure by storing this information within a handoff data area of non-volatile memory (e.g., non-volatile memory 111 of FIG. 1).

In a representative embodiment of the present invention, verification string/validation string/signature data may be added/attached to an update package created by, for example, an update package generator such as the mProve® Generator available from Hewlett-Packard Company. In some representative embodiments, sixteen (16) bytes may be added to the update package binary data. The process of adding/attaching the verification string/validation string/signature data may be done through a binary concatenation tool designed for this specific purpose.

In a representative embodiment of the present invention, software/firmware components within the electronic device may perform the following functions in handling an update package:

A download agent in the electronic device (e.g., DM client 163 of FIG. 1) may be responsible for the following:

Reading the verification string/validation string/signature data,

EF_FOTA file, from a SIM card.

Implement the logic to proceed with download if update is allowed, otherwise abort.

Download the update package from the server.

Pass control to a handoff agent (e.g., handoff module 121 of FIG. 1).

A handoff agent in the electronic device (e.g., handoff module 121 of FIG. 1) may be responsible for the following:

Reading the verification string/validation string/signature data, EF_FOTA file, from the SIM card.

Implement logic to proceed with committing data to non-volatile memory if update is allowed, otherwise abort.

Store data to non-volatile memory (e.g., flash memory) according to the following sequence: 1) update package data, 2) verification string/validation string/signature data, 3) handoff data.

Pass control to an update agent, and reset the electronic device. The non-volatile memory (e.g., flash storage)

location for the contents of the EF_FOTA file from the SIM may be accessible to the update agent.

The following discussion provides the details of exemplary use-cases illustrating various aspects of some representative embodiments of the present invention. A representative embodiment of the present invention provides a SIM secured FOTA mechanism that is designed to prevent users with electronic devices issued, provided, and maintained by a system operator from installing alternative update packages that are not explicitly approved by the system operator. The security method is transport independent, so that unapproved updates are rejected by the electronic device, regardless of how they are delivered.

The following exemplary use-case illustrates a case where a system operator A-approved update package is to be processed with a system operator A-secured FOTA SIM.

Pre-Condition:
1) Electronic device is operating on an older revision of firmware,
2) System operator SIM secured update package for newer firmware version is already published to an update server,
3) Electronic device is FOTA enabled with SIM security functionality,
4) System operator SIM with FOTA security credentials is being used,
5) Electronic device has been bootstrapped with DM credentials.

Post-Condition:
1) Electronic device is operating on newer revision of firmware

Steps:
1) Initiate update via update server by entering MSISDN,
2) Download agent checks for the update allowed condition (e.g., bit "b1" set in FOTA condition byte),
3) Electronic device downloads applicable update package,
4) Handoff agent retrieves FOTA credentials (e.g., verification string/validation string/signature data) from SIM and stores it to the non-volatile memory (e.g., flash memory), and triggers update agent,
5) Update agent validates the update package against SIM credentials (verification string/validation string/signature data) stored in non-volatile memory (e.g., flash memory),
6) Update agent installs approved update package,
7) Electronic device responds with success status.

The following exemplary use-case illustrates a case where a non-secured update package is to be processed with a system operator A-secured FOTA SIM.

Pre-Condition:
1) Electronic device is operating on an older revision of firmware,
2) Non-secured update package for newer firmware version is already published to the update server,
3) Electronic device is FOTA enabled with SIM security functionality,
4) System operator SIM with FOTA security credentials (verification string/validation string/signature data) is being used,
5) Electronic device has been bootstrapped with DM credentials.

Post-Condition:
1) Electronic device rejects new update package,
2) Electronic device is operating on older (original) revision of firmware.

Steps:
1) Initiate update via update server by entering MSISDN,
2) Download agent checks for the update allowed condition (e.g., bit "b1" set in FOTA condition byte),
3) Electronic device downloads applicable update package,
4) Handoff agent retrieves FOTA credentials (verification string/validation string/signature data) from SIM and stores it to the non-volatile memory (e.g., flash memory), and triggers update agent,
5) Update agent validates update package against SIM credentials (verification string/validation string/signature data) stored in non-volatile memory (e.g., flash memory),
6) Update agent rejects update package and terminates installation,
7) Update agent produces a "Failed" status and returns to normal operation.

The following exemplary use-case illustrates a case where a system operator B-secured update package is to be processed with a system operator A-secured FOTA SIM.

Pre-Condition:
1) Electronic device is operating on an older revision of firmware,
2) SIM secured update package from system operator B for newer firmware version is already published to the update server (Note: This may be an unlikely scenario, but may be used to test extent of security protection. Credentials (verification string/validation string/signature data) are assumed different for system operator B),
3) Electronic device is FOTA enabled with SIM security functionality,
4) System operator A SIM with FOTA security credentials is being used,
5) Electronic device has been bootstrapped with DM credentials.

Post-Condition:
1) Electronic device rejects new update,
2) Electronic device is operating on older (original) revision of firmware.

Steps:
1) Initiate update via update server by entering MSISDN,
2) Download agent checks for the update allowed condition (e.g., bit "b1" set in FOTA condition byte),
3) Electronic device downloads applicable update package,
4) Handoff agent retrieves FOTA credentials (verification string/validation string/signature data) from SIM and stores it to the non-volatile memory (e.g., flash memory), and triggers update agent,
5) Update agent validates update package against SIM credentials (verification string/validation string/signature data) stored in non-volatile memory (e.g. flash memory),
6) Update agent rejects update package and terminates installation,
7) Update agent produces a "Failed" status and returns to normal operation.

The following exemplary use-case illustrates a case where a system operator B-approved update package is to be processed with a system operator A-not secured FOTA SIM.

Pre-Condition:
8) Electronic device is operating on an older revision of firmware,
9) System operator A SIM secured update package for newer firmware version is already published to the update server, 10) Electronic device is FOTA enabled without SIM security functionality,
11) System operator A SIM without FOTA security credentials is being used,
12) Electronic device has been bootstrapped with DM credentials.

Post-Condition:
1) Electronic device rejects new update,
2) Electronic device is operating on older (original) revision of firmware.

Steps:
1) Initiate update via update server by entering MSISDN,
2) Download agent checks for the update allowed condition (e.g., bit "b1" set in FOTA condition byte) and/or EF_FOTA file presence on the SIM,
3) If EF_FOTA file does not exist, download agent aborts update session,
4) Download agent check for the update allowed condition (e.g., bit "b1" set in FOTA condition byte),
5) Download agent retrieves FOTA credentials (verification string/validation string/signature data) from SIM and stores it to the non-volatile memory (e.g., flash memory),
6) Electronic device downloads applicable update package and triggers update agent,
7) Update agent validates update package header against SIM credentials (verification string/validation string/signature data) stored in non-volatile memory (e.g., flash memory),
8) Update agent rejects update package and terminates installation,
9) Update agent produces a "Failed" status and returns to normal operation.

The following exemplary use-case illustrates a case where a non-secured update package is to be processed with a system operator A-not secured FOTA SIM.

Pre-Condition:
1) Electronic device is operating on an older revision of firmware,
2) Non-secured update package for newer firmware version is already published to the update server,
3) Electronic device is FOTA enabled without SIM security functionality,
4) System operator A SIM without FOTA security credentials is being used,
5) Electronic device has been bootstrapped with DM credentials.

Post-Condition:
1) Electronic device rejects new update,
2) Electronic device is operating on older (original) revision of firmware, Steps:
1) Initiate update via update server by entering MSISDN,
2) Download agent checks for the update allowed condition (e.g., bit "b1" set in FOTA condition byte) and/or EF_FOTA file presence on the SIM,
3) If EF_FOTA file does not exist, download agent aborts update session,
4) Download agent checks for the update allowed condition (e.g., bit "b1" set in FOTA condition byte),
5) Download agent retrieves FOTA credentials (verification string/validation string/signature data) from SIM and stores it to the non-volatile memory (e.g., flash memory),
6) Electronic device downloads applicable update package and triggers update agent,
7) Update agent validates update package header against SIM credentials (verification string/validation string/signature data) stored in non-volatile memory (e.g., flash memory),
8) Update agent rejects update package and terminates installation,
9) Update agent produces a "Failed" status and returns to normal operation.

The following exemplary use-case illustrates a case where a non-system operator B-secured update package is to be processed with a system operator A-not secured FOTA SIM.

Pre-Condition:
1) Electronic device is operating on an older revision of firmware,
2) SIM Secured Update Package from system operator B for newer firmware version is already published to the update server (Note: This may be an unlikely scenario, but may be used to test extent of security protection. Credentials (verification string/validation string/signature data) are assumed different for system operator B),
3) Electronic device is FOTA enabled without SIM security functionality
4) System operator A SIM without FOTA security credentials is being used,
5) Electronic device has been bootstrapped with DM credentials.

Post-Condition:
1) Electronic device rejects new update,
2) Electronic device is operating on older (original) revision of firmware.

Steps:
1) Initiate update via update server by entering MSISDN,
2) Download agent checks for the update allowed condition (e.g., bit "b1" set in FOTA condition byte) and/or EF_FOTA file presence on the SIM,
3) If EF_FOTA file does not exist, download agent aborts update session,
4) Download agent checks for the update allowed condition (e.g., bit "b1" set in FOTA condition byte),
5) Download agent retrieves FOTA credentials (verification string/validation string/signature data) from SIM and stores it to the non-volatile memory (e.g., flash memory),
6) Electronic device downloads applicable update package and triggers update agent,
7) Update agent validates update package header against SIM credentials (verification string/validation string/signature data) stored in non-volatile memory (e.g., flash memory),
8) Update agent rejects update package and terminates installation,
9) Update agent produces a "Failed" status and returns to normal operation.

The following exemplary use-case illustrates a case where a system operator A-approved update package is to be processed with a system operator A-secured FOTA SIM and FOTA update is not allowed (e.g., bit "b1" of FOTA condition byte=0).

Pre-Condition:
1) Electronic device is operating on an older revision of firmware,
2) System operator A SIM secured update package for newer firmware version is already published to the update server,
3) Electronic device is FOTA enabled with SIM security functionality, 4) System operator A SIM with FOTA security credentials (verification string/validation string/signature data) but FOTA Update Not Allowed is being used,
5) Electronic device has been bootstrapped with DM credentials.

Post-Condition:
1) Electronic device rejects new update,
2) Electronic device is operating on older (original) revision of firmware.

Steps:
1) Initiate update via update server by entering MSISDN,
2) Download agent checks for the update allowed condition (e.g., bit "b1" set in FOTA condition byte),
3) Download agent retrieves FOTA credentials (verification string/validation string/signature data) from SIM and stores it to the non-volatile memory (e.g., flash memory),
4) Electronic device downloads applicable update package and triggers update agent,
5) Update agent validates update package header against SIM credentials (verification string/validation string/signature data) stored in non-volatile memory (e.g., flash memory),
6) Update agent rejects update package and terminates installation,
7) Update agent produces a "Failed" status and returns to normal operation.

An update server in one representative embodiment of the present invention supports Operator specific prompting. Language preference may be passed as a field in a form that may be manually filled in by customer on web interface, or that may be passed as a URL parameter such as, for example, automatically passed by customer care agent application or by Operator Mobile portal. Region specific languages may be supported in a download descriptor portion of metadata that is associated with an update package. In order to support multiple languages, one representative embodiment of the present invention permits multiple download descriptors to be associated with each update package.

Some representative embodiments of the present invention support management (e.g., creation, deletion, modification, selection, and listing) of device tester groups. Specific software/firmware updates may be selectively published to specific groups of subscribers. Deployment managers may select available 'Released' updates and assign them to managed subscriber groups, or classes. This feature enables global operators to centrally test and validate updates while providing the flexibility of independent deployments for each geographic or operating unit. For example, an update may be only made available to a specific device testing group who have a software/firmware version of 2.x or higher because of certain electronic device (e.g., hardware limitations).

Figure 9:
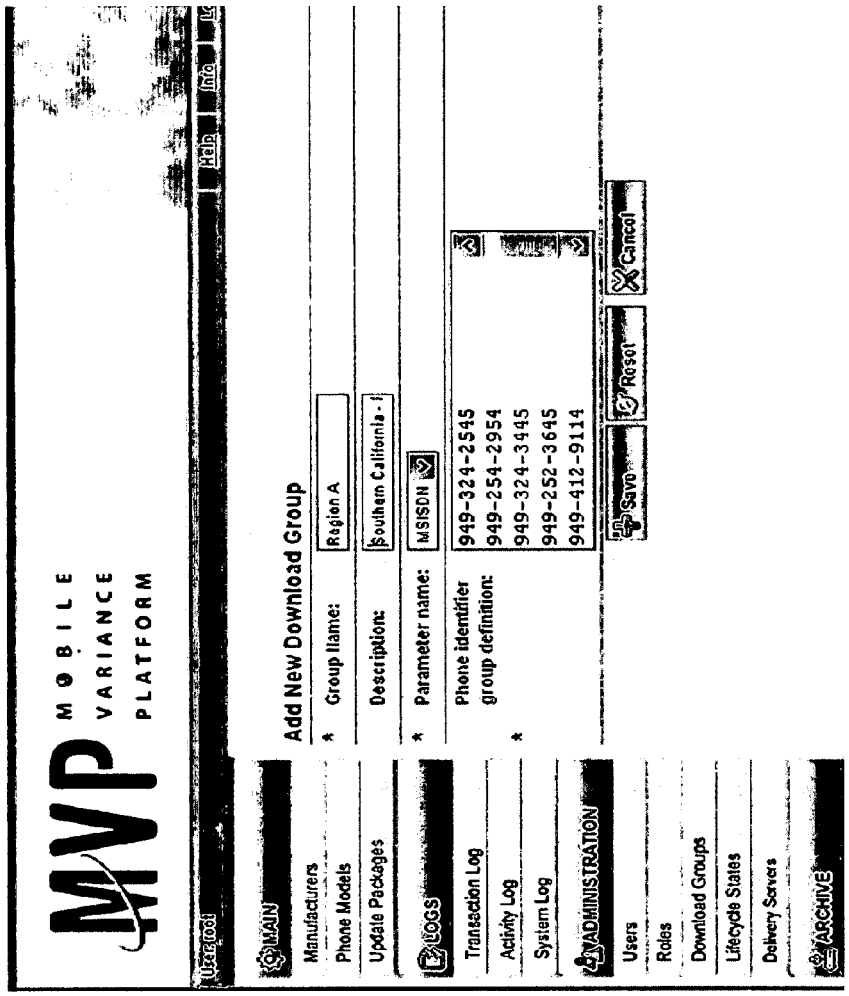
FIG. 9 shows an illustration of an exemplary user interface screen that enables creation of download groups, in accordance with a representative embodiment of the present invention.

FIG. 9 shows an illustration of an exemplary user interface screen 900 that enables creation of download groups, in accordance with a representative embodiment of the present invention. As shown in FIG. 9, Some representative embodiments of the present invention permit the definition of a named download group of subscribers identified by, for example, the telephone number of each member of the download group. Such downloads groups may permit a subset of the subscriber base to be provided with particular versions of software/firmware that is not made available for distribution to the remaining subscribers of a system operator. This may, for example, permit special versions of firmware and software applications to be provided to special subscriber groups that have use for the features of such special versions, or to provide pre-release or "beta" versions of electronic device applications to be tested by controlled groups of users. Some representative embodiments of the present invention support the creation, deletion, and modification of special groups of subscribers. Some representative embodiments of the present invention also support the generation and exporting of statistics and reports related to special groups of subscribers.

Some representative embodiments of the present invention provide support for the distribution of multiple update packages in a single session of communication of an update server with an electronic device. During a rendezvous with the device, an update server in accordance with the present invention may determine that multiple updates are involved, and may accordingly fetch the relevant update packages and initiate multiple downloads to the affected electronic device. In a representative embodiment of the downloads may be initiated in the same device management session.

In some representative embodiments of the present invention, an update server may check whether further update packages are available for download, and if so, may initiate an OMA DM Replace/Exec command for a remaining update package, immediately. This may result in a daisy chain of updates, where the electronic device is updated until brought to the latest firmware/software version. Some representative embodiments of the present invention employ device-specific adapters that enable customization such as update with multiple update packages.

Some representative embodiments of the present invention support text prompting before a download of update package information. The language of such text prompts may be selected based upon the MSISDN of the electronic device to be updated. For example, one of English, German, French and Spanish may be selected depending upon the MSISDN of the electronic device to be updated. This may be supported for text prompting before both individual updates and bulk updates.

Some representative embodiments of the present invention support text prompting after a download of update package information. The language of such text prompts may be selected based upon the MSISDN of the electronic device to be updated. For example, one of English, German, French and Spanish may be selected depending upon the MSISDN of the electronic device to be updated. This may be supported for text prompting after both individual updates and bulk updates.

In a representative embodiment of the present invention, such text prompts may be picked out of a download descriptor associated with the update package to be downloaded to the electronic device. The electronic device may receive the download descriptor, extract the text prompt information, and display it to the user of the electronic device. The download descriptor may be, for example, a download descriptor such as the OMA download descriptor. The text prompt in the download descriptor may, for example, be automatically populated from release notes maintained in an update server system.

Some representative embodiments of the present invention support text prompting after download and before proceeding with an update of an electronic device. The language of such text prompts may be selected based upon the MSISDN of the electronic device to be updated. For example, one of English, German, French and Spanish may be selected depending upon the MSISDN of the electronic device to be updated. Such text prompts may be specified by a customer care representative. This feature may be supported for text prompting before updating of an electronic device for both individual updates and bulk updates.

Some representative embodiments of the present invention support text prompting after an update of an electronic device. The language of such text prompts may be selected based upon the MSISDN of the electronic device to be updated. For example, one of English, German, French and Spanish may be selected depending upon the MSISDN of the electronic device to be updated. Such text prompts may be specified by a customer care representative. This feature may be supported for text prompting after updating of an electronic device for both individual updates and bulk updates.

Some representative embodiments of the present invention support administrator creation and configuration of roles of different users of an update server. This configuration may include the setting of functional restrictions and user interface configuration for each user role. Configuration of the user interface for a particular user role may include the selection of the information fields available on the user interface for that role, and read/write access permissions to the information available for the role. This permits the update server administrator to streamline processes and minimize the chances of overloading a user of the system with excessive and/or meaningless information.

An update server in accordance with one representative embodiment of the present invention supports the generation of reports for specific device target groups. This report may be generated based upon, for example, MSISDN. Reports showing historical transactions for a single electronic device may be provided. Such a report may, for example, be generated for a specific electronic device, and may be viewed and exported.

Figure 10:
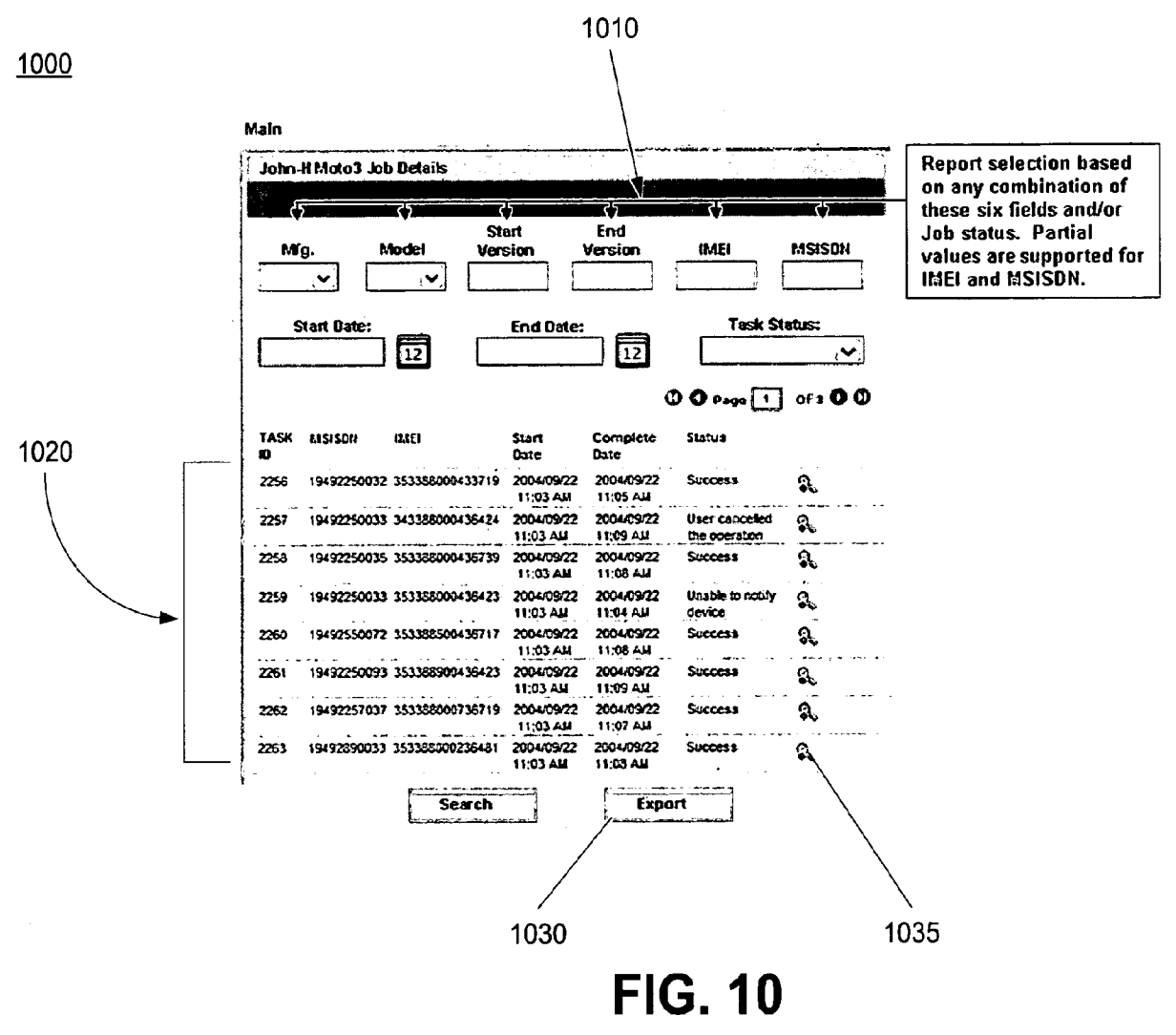

FIG. 10 illustrates a exemplary job details screen 1000 that may be employed by a user of an update server during management of updates to multiple electronic devices that may correspond to, for example, the electronic device 107 of FIG. 1, in accordance with a representative embodiment of the present invention. As shown in the example illustrated in FIG. 10, query controls 1010 allow a user to filter the report by manufacturer, model, version, IMEI (or partial IMEI), MSISDN (or partial MSISDN), start date, end date, and task status. An export button 1030 allows the filtered report to be exported to a command separated values (CSV) file. Clicking on a view icon 1035 may bring up a task detail report, showing events that have occurred for the selected electronic device.

Further detail may be provided for each job indicating each electronic device and the state for that electronic device. These results may be filtered by a number of parameters to provide results for a specific group of electronic devices (e.g., handsets). For example, one might specify all failed updates for an electronic device such as a Nokia 3560. These reports may be exportable for offline analysis or for re-submission after problem resolution.

FIG. 11 illustrates an exemplary event level details screen 1100, in accordance with a representative embodiment of the present invention.

To help with troubleshooting for specific devices, an update server/download server may provide event level detail for each step of the update process. An internal state machine design may enable an operator to understand where in the process a problem is occurring to pinpoint the exact point of failure.

Some representative embodiments of the present invention support listing of available update packages, including those that may require special handling such as those that have been "created", "rejected", "tested" and "deactivated". Filters may be provided that permit filtering list contents by manufacturer and model, for example. Filtering by update package state may also be provided.

Some representative embodiments of the present invention support a monitoring mechanism to provide warning conditions when a configurable failure threshold is met. One representative embodiment of the present invention may use SNMP traps programmatically. Another representative embodiment of the present invention may employ monitoring threads that watch for failed jobs and send email or an SNMP trap when a threshold level is read. A representative embodiment of the present invention allows a user to allocate monitoring parameters (e.g., for warning conditions). An update task may be given a threshold level for minimum successful updates within a given time period (e.g., set manually by appropriate user role). This threshold level may be modified at any time. The update task may also be given a threshold level for a maximum number of failed updates within a given time period (e.g., set manually by appropriate user role). This threshold level may also be modified at any time. Some representative embodiments of the present invention also automatically suspend an update task if special conditions are met.

Some representative embodiments of the present invention permit update task (re-)scheduling at any time. For example, such an embodiment may allow an authorized user to allocate and/or modify the (re-)start week, day and time; to allocate and/or modify the authorized week, day and time periods; to allocate and/or modify the non-authorized week, day and time periods; to allocate and/or modify the priority level. Such an embodiment may also allow an authorized user to allocate and/or modify the maximum number of download attempts with a device; to allocate and/or modify the restrictions on network(s) that can be used for the electronic device update; to allocate and/or modify the threshold level for minimum successful updates within a given time period; and to allocate and/or modify the threshold level for maximum failed updates within a given time period. Restart parameters and priority levels may involve stopping of a job, exporting outstanding records, re-importing of records and restarting under a new job. A warning that a minimum threshold level has not been met may also be provided. A warning that maximum thresholds are surpassed may be provided. A means of determining the meaning or description of standard and/or manufacturer-specific result/error codes may be provided, and details of the meanings/descriptions of such result/error codes may be placed on exported reports.

Some representative embodiments of the present invention comprise an update server for the generation and distribution of update packages. Update packages generated by such an update server may include the FOTA credentials (verification string/validation string/signature data) discussed previously, or the FOTA credentials (verification string/validation string/signature data) may be added to an update package using a post-processing tool, discussed earlier in this document.

Aspects of the present invention may be seen in a system supporting access via a communication network to device management information for a plurality of electronic devices. Such a system may comprise at least one database containing the device management information, the at least one database enabling access to the device management information using a first object-type software interface mechanism. Such a system may also comprise at least one device management server communicatively coupled to the plurality of electronic devices and to the at least one database, the at least one device management server employing a second object-type software interface mechanism to access the at least one database. In addition, such a system may comprise a plurality of application servers, each of the plurality of application servers employing the second object-type software interface mechanism to access the at least one database in parallel with access by the at least one device management server.

In a representative embodiment of the present invention, the at least one database may comprise one or more management objects specified by an Open Mobile Alliance (OMA) version 1.2 or earlier specification. The first object-type software interface mechanism may comprise a java data objects interface, and the second object-type software interface mechanism may comprise a data access object (DAO) interface. The second object-type software interface mechanism may support one or more of a device capability object, a device instance object, and an object for managing information identifying one or more of a make, a model and/or a version of each of the plurality of electronic devices. The communication network may comprise a public wireless network, and the plurality of electronic devices may comprise a cellular handset. The plurality of application servers may comprise one or both of a server providing customer care services to users of the plurality of electronic devices and/or a server that provides firmware and/or software updates to the plurality of electronic devices. The at least one device management server may access memory of the plurality of electronic devices using device management commands compatible with an Open Mobile Alliance (OMA) device management (DM) version 1.2 or earlier protocol specification.

Further aspects of the present invention may be observed in an electronic device comprising at least one processor operable to communicate over a network, and non-volatile memory operably coupled to the at least one processor. The non-volatile memory may comprise code executable by the at least one processor to receive and process information for updating firmware and/or software in the electronic device. Such an electronic device may also comprise interface circuitry for operably coupling the at least one processor to a user interchangeable circuit card. The executable code may cause at least a portion of the information for updating firmware and/or software to be compared to a corresponding portion of information in the user interchangeable circuit card to determine whether processing of information for updating firmware and/or software stored in the non-volatile memory of the electronic device is allowed.

In a representative embodiment of the present invention, the network comprises a public wireless network, and the electronic device may comprise a cellular handset. The information for updating firmware and/or software in the electronic device may comprise a set of instructions executable by the code to transform a first version of firmware and/or software to an updated version, and the user interchangeable circuit card may comprise a subscriber identity module (SIM) card.

Additional aspects of the present invention may be found in a system supporting device management via a communication network for a plurality of electronic devices. Such a system may comprise at least one database comprising information for updating the plurality of electronic devices, and information identifying each of the plurality of electronic devices, and at least one server communicatively coupled to the plurality of electronic devices and to the at least one database. In such a system, the at least one server may automatically determine a language for use in communicating at least one prompt message to a user of one of the plurality of electronic devices based upon the information identifying the one of the plurality of electronic devices. The at least one prompt message may be displayed upon receipt of a download descriptor compatible with an Open Mobile Alliance (OMA) version 1.2 or earlier protocol specification. The communication network may comprise a wireless network, and the information identifying each of the plurality of electronic devices may comprise one of a mobile station integrated services digital network (MSISDN) number, information identifying a public land mobile network (PLMN), a device identifier, or a phone number. The plurality of electronic devices may comprise a cellular handset, and the at least one server may communicate the information for updating the plurality of electronic devices using device management commands compatible with an Open Mobile Alliance (OMA) device management (DM) version 1.2 or earlier protocol specification.

Still other aspects of the present invention may be seen in a method supporting device management for a plurality of electronic devices, via a communication network. Such a method may comprise accessing at least one database comprising information for updating the plurality of electronic devices, and information identifying each of the plurality of electronic devices, and automatically determining a language for use in communicating at least one prompt message to a user of one of the plurality of electronic devices, based upon the information identifying the one of the plurality of electronic devices. The method may also communicate the at least one prompt message to the user of the one of the plurality of electronic devices, wherein the communicating may comprise expressing the at least one prompt in the determined language.

In a representative embodiment of the present invention, the at least one prompt message may be displayed upon receipt of a download descriptor compatible with an Open Mobile Alliance (OMA) version 1.2 or earlier protocol specification, and the communication network comprises a wireless network. The information identifying each of the plurality of electronic devices may comprise one of a mobile station integrated services digital network (MSISDN) number, information identifying a public land mobile network (PLMN), a device identifier, or a phone number, and the plurality of electronic devices may comprise a handset. The information for updating the plurality of electronic devices may be communicated to the plurality of electronic devices using device management commands compatible with an Open Mobile Alliance (OMA) device management (DM) version 1.2 or earlier protocol specification.

Although a system and method according to the present invention has been described in connection with the preferred embodiment, it is not intended to be limited to the specific form set forth herein, but on the contrary, it is intended to cover such alternative, modifications, and equivalents, as can be reasonably included within the scope of the invention as defined by this disclosure and appended diagrams.

Accordingly, a representative embodiment of the present invention may be realized in hardware, software, or a combination of hardware and software. Representative embodiments of the present invention may be realized in a centralized fashion in at least one computer system, or in a distributed fashion where different elements are spread across several interconnected computer systems. Any kind of computer system or other apparatus adapted for carrying out the methods described herein is suited. A combination of hardware and software may be a general-purpose computer system with a computer program that, when being loaded and executed, controls the computer system such that it carries out the methods described herein.

A representative embodiment of the present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While aspects of the present invention have been described with reference to certain embodiments, it will be understood by those skilled in the art that various changes may be made and equivalents may be substituted without departing from the scope of the representative embodiments of the present invention. In addition, many modifications may be made to adapt a particular situation or material to the teachings of a representative embodiment of the present invention without departing from its scope. Therefore, it is intended that embodiments of the present invention not be limited to the particular embodiments disclosed herein, but that representative embodiments of the present invention include all embodiments falling within the scope of the appended claims.

What is claimed is:

1. A method for updating an electronic device over a network comprising:
    sending information for updating the electronic device over the network;
    retrieving information from an interchangeable circuit card in the electronic device; and
    determining whether processing of information for updating the electronic device is allowed based on a comparison between a portion of the information for updating the electronic device and a corresponding portion of the information from the interchangeable circuit card, wherein the portion of the information for updating the electronic device includes a set of Firmware-Over-the-Air (FOTA) credentials and wherein the corresponding portion of the information from the interchangeable circuit card includes the set of FOTA credentials, and updating the electronic device if a condition flag in the set of FOTA credentials is set to allow.

2. The method of claim 1, wherein retrieving information from the interchangeable circuit card in the electronic device includes retrieving information from a subscriber identity module (SIM) card.

3. The method of claim 2, wherein the information from the SIM card includes an Firmware-Over-the-Air (FOTA) file and wherein the sending is allowed to begin if the FOTA update allowed bit is set.

4. The method of claim 1, wherein the FOTA credentials in the information for updating an electronic device is located in a header of the information for updating an electronic device.

5. A non-transitory computer-readable medium storing instructions for updating an electronic device over a network executable by a computer to cause the computer to:
    develop an update package for the electronic device;
    place a signature into the update package wherein the signature in the update package corresponds to a signature in an interchangeable circuit card in the electronic device, wherein the signature is unique to a system operator that operates the system on which the electronic device functions;
    store the update package in an update server; and
    send the update package to the electronic device over the network, wherein the signature in the update package and the signature in the interchangeable circuit card are used to permit a secure update of the electronic device using the update package, wherein the signature in the update package and the signature in the interchangeable circuit card is validated by the system operator and the update packages is rejected if the validation fails.

6. The medium of claim 5, wherein the signature in the update package and the signature in the interchangeable circuit card provide the system operator a control point for rejecting update packages that are not explicitly authorized by the system operator.

7. The medium of claim 5, wherein the signature in the interchangeable circuit card is placed in the interchangeable circuit card during a manufacturing process and wherein the system operator provides the interchangeable circuit card.

8. The medium of claim 5, wherein the signature is placed in the update packages in a post processing activity.

9. An electronic device comprising:
    at least one processor operable to communicate over a network;
    non-volatile memory operably coupled to the at least one processor, wherein the non-volatile memory comprises code executable by the at least one processor to receive and process information for updating firmware and/or software in the electronic device;
    interface circuitry for operably coupling the at least one processor to a user interchangeable circuit card; and
    wherein the executable code causes at least a portion of the information for updating the firmware and/or software in the electronic device to be compared to a corresponding portion of information in the user interchangeable circuit card to determine whether processing of information for updating the firmware and/or software in the electronic device is allowed, wherein the at least a portion of the information for updating the firmware and/or software in the electronic device includes a set of Firmware-Over-the-Air (FOTA) credentials and wherein the corresponding portion of the information from the user interchangeable circuit card includes the set of FOTA credentials, and updating the firmware and/or software in the electronic device if a condition flag in the set of FOTA credentials is set to allow.

10. The electronic device according to claim 9, wherein the network comprises a public wireless network.

11. The electronic device according to claim 9, wherein the electronic device comprises a cellular handset.

12. The electronic device according to claim 9, wherein the information for updating firmware and/or software in the electronic device comprises a set of instructions executable by the code to transform an first version of firmware and/or software to an updated version.

13. The electronic device according to claim 9, wherein the user interchangeable circuit card comprises a subscriber identity module (SIM) card.

* * * * *